(12) United States Patent
Yano et al.

(10) Patent No.: US 7,826,101 B2
(45) Date of Patent: Nov. 2, 2010

(54) DOCUMENT MANAGEMENT METHOD, DOCUMENT MANAGEMENT PROGRAM, RECORDING MEDIUM, AND DOCUMENT MANAGEMENT APPARATUS

(75) Inventors: Takashi Yano, Tokyo (JP); Satosi Imago, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1899 days.

(21) Appl. No.: 10/871,731

(22) Filed: Jun. 21, 2004

(65) Prior Publication Data

US 2004/0264811 A1 Dec. 30, 2004

(30) Foreign Application Priority Data

| Jun. 25, 2003 | (JP) | ............................. 2003-181541 |
| Jun. 27, 2003 | (JP) | ............................. 2003-185135 |
| Jul. 30, 2003 | (JP) | ............................. 2003-203810 |
| Jul. 31, 2003 | (JP) | ............................. 2003-204422 |
| Jul. 31, 2003 | (JP) | ............................. 2003-204423 |

(51) Int. Cl.
 G06F 7/00 (2006.01)
(52) U.S. Cl. ........................ 358/403; 358/505; 358/474; 715/229; 715/230; 707/638; 707/695
(58) Field of Classification Search ................. 358/403, 358/1.15, 1.16, 1.18; 382/306; 715/511, 715/512, 229; 707/695, 638
 See application file for complete search history.

(56) References Cited

U.S. PATENT DOCUMENTS

| 3,893,360 A | 7/1975 | Yano et al. |
| 3,893,765 A | 7/1975 | Yano et al. |
| 4,035,069 A | 7/1977 | Yano |
| 4,080,059 A | 3/1978 | Tani et al. |
| 4,087,171 A | 5/1978 | Yano |
| 4,142,165 A | 2/1979 | Miyakawa et al. |
| 4,167,322 A | 9/1979 | Yano et al. |
| 4,197,813 A | 4/1980 | Yano et al. |
| 4,251,152 A | 2/1981 | Miyakawa et al. |
| 4,277,163 A | 7/1981 | Ikesue et al. |
| 4,335,420 A | 6/1982 | Mitsuo et al. |
| 4,439,781 A | 3/1984 | Yano |
| 4,446,471 A | 5/1984 | Yano |
| 4,466,004 A | 8/1984 | Kobayashi et al. |
| 4,470,154 A | 9/1984 | Yano |
| 4,511,236 A | 4/1985 | Yano |
| 4,516,272 A | 5/1985 | Yano |

(Continued)

FOREIGN PATENT DOCUMENTS

JP 6-284144 10/1994

(Continued)

*Primary Examiner*—Twyler L Haskins
*Assistant Examiner*—Kent Yip
(74) *Attorney, Agent, or Firm*—Oblon, Spivak, McClelland, Maier & Neustadt, L.L.P.

(57) ABSTRACT

In a document management method and apparatus of the invention, data of a paper document to which revision data are added are acquired, and data of a document file corresponding to the paper document are acquired based on document-file identification information that identifies the document file. Difference data indicating differences between the data of the paper document and the data of the document file are extracted. The revision data contained in the difference data, revision attribute information concerning the revision data, and the document file are associated so that the document file is managed with the association.

4 Claims, 56 Drawing Sheets

U.S. PATENT DOCUMENTS

| | | | |
|---|---|---|---|
| 4,553,149 A | 11/1985 | Yano | |
| 4,583,834 A | 4/1986 | Seko et al. | |
| 4,794,590 A | 12/1988 | Yano | |
| 4,839,887 A | 6/1989 | Yano | |
| 4,885,742 A | 12/1989 | Yano | |
| 4,965,792 A | 10/1990 | Yano | |
| 5,267,238 A | 11/1993 | Yano et al. | |
| 5,298,476 A | 3/1994 | Hotta et al. | |
| 5,521,371 A | 5/1996 | Hotta et al. | |
| 5,535,211 A | 7/1996 | Yano | |
| 5,631,905 A | 5/1997 | Yano | |
| 6,014,668 A | 1/2000 | Tabata et al. | |
| 6,035,308 A | 3/2000 | Yano et al. | |
| 6,229,529 B1 | 5/2001 | Yano et al. | |
| 6,256,023 B1 | 7/2001 | Yano et al. | |
| 6,286,004 B1 | 9/2001 | Yoshiura et al. | |
| 6,356,923 B1 * | 3/2002 | Yano et al. | 717/127 |
| 6,381,593 B1 | 4/2002 | Yano et al. | |
| 6,518,960 B2 | 2/2003 | Omura et al. | |
| 6,537,324 B1 * | 3/2003 | Tabata et al. | 715/205 |
| 6,658,408 B2 | 12/2003 | Yano et al. | |
| 6,909,805 B2 * | 6/2005 | Ma et al. | 382/170 |
| 6,950,982 B1 * | 9/2005 | Dourish | 715/234 |
| 7,346,841 B2 * | 3/2008 | Kuruoglu et al. | 715/751 |
| 2002/0078088 A1 * | 6/2002 | Kuruoglu et al. | 707/512 |
| 2002/0138476 A1 * | 9/2002 | Suwa et al. | 707/3 |
| 2003/0018742 A1 | 1/2003 | Imago | |

FOREIGN PATENT DOCUMENTS

| | | |
|---|---|---|
| JP | 7-95232 | 4/1995 |
| JP | 10-4462 | 1/1998 |
| JP | 10-260989 | 9/1998 |
| JP | 11-25077 | 1/1999 |
| JP | 2000-315228 | 11/2000 |
| JP | 2002-312649 | 10/2002 |
| JP | 2002-318799 | 10/2002 |
| JP | 2003-67363 | 3/2003 |
| WO | WO 01/71475 A1 | 9/2001 |

* cited by examiner

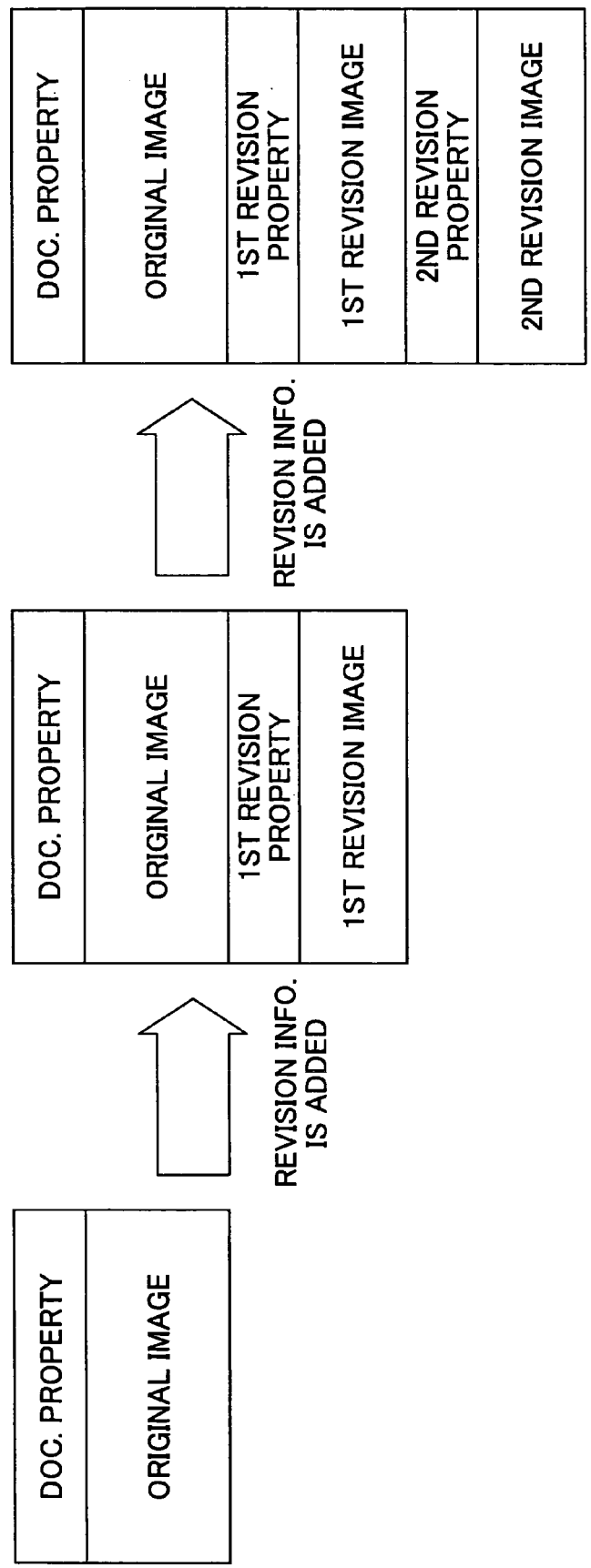

FIG.15A

PUI DOC. PROPERTY TABLE

| DOC. ID | TITLE | DATE | PERSON | ACCESS | FILE NAME |
|---|---|---|---|---|---|
| D1 | ORDER INTAKE | 2003/4/2 | YAMAMOTO | YAMAMOTO | /db/d1.txt |
| D2 | NEW PRODUCT | 2003/5/1 | MATSUNO | ALL | /db/d2.html |
| D3 | MINUTES | 2003/5/20 | KAWADA | KAWADA | /db/d3.txt |
| . . | . . | . . | . . | . . | . . |

FIG.15B

PUI DOC. ORIGINAL IMAGE TABLE

| DOC. ID | PAGE NO. | FILE NAME |
|---|---|---|
| D1 | 1 | /img/d1-1 |
| D1 | 2 | /img/d1-2 |
| D2 | 1 | /img/d2-1 |
| . . | . . | . . |

PUI REVISION PROPERTY TABLE

| DOC. ID | REV. ID | PRIOR REV. ID | REV. DATE | REV. PERSON |
|---|---|---|---|---|
| D1 | A1 | - | 2003/4/3 | YAMADA |
| D1 | A2 | A1 | 2003/4/4 | MATSUDA |
| D1 | A3 | A2 | 2003/4/6 | MATSUDA |
| D1 | A4 | A1 | 2003/5/5 | SUGITA |
| D2 | A1 | - | 2003/5/21 | KAWAMOTO |
| .. | .. | .. | .. | .. |

PUI REVISION IMAGE TABLE

| DOC. ID | REV. ID | PAGE NO. | FILE NAME |
|---|---|---|---|
| D1 | A1 | 1 | /add/d1-a1-1 |
| D1 | A1 | 2 | /add/d1-a1-2 |
| D1 | A2 | 1 | /add/d1-a2-1 |
| D1 | A2 | 2 | /add/d1-a2-2 |
| .. | .. | .. | .. |

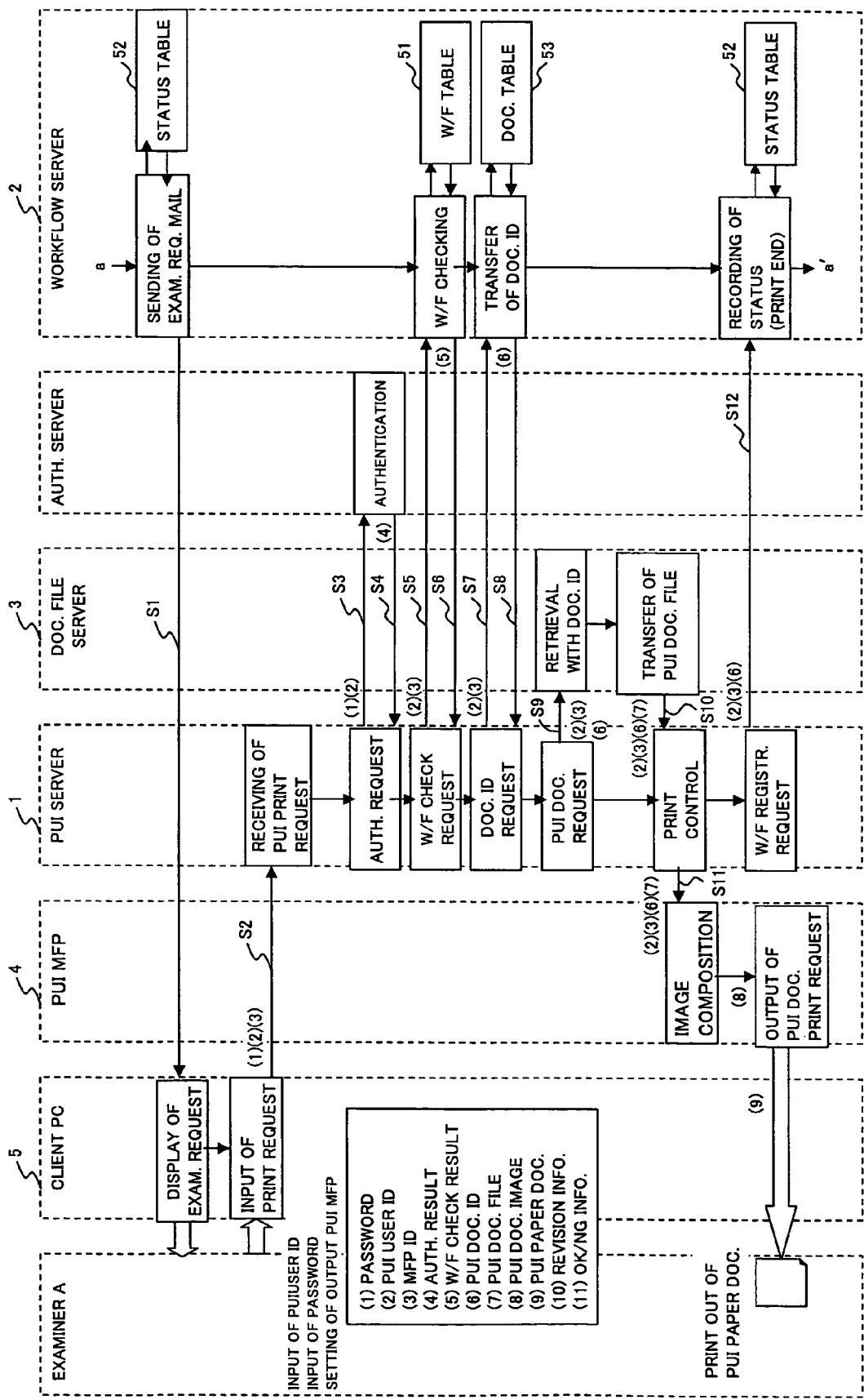

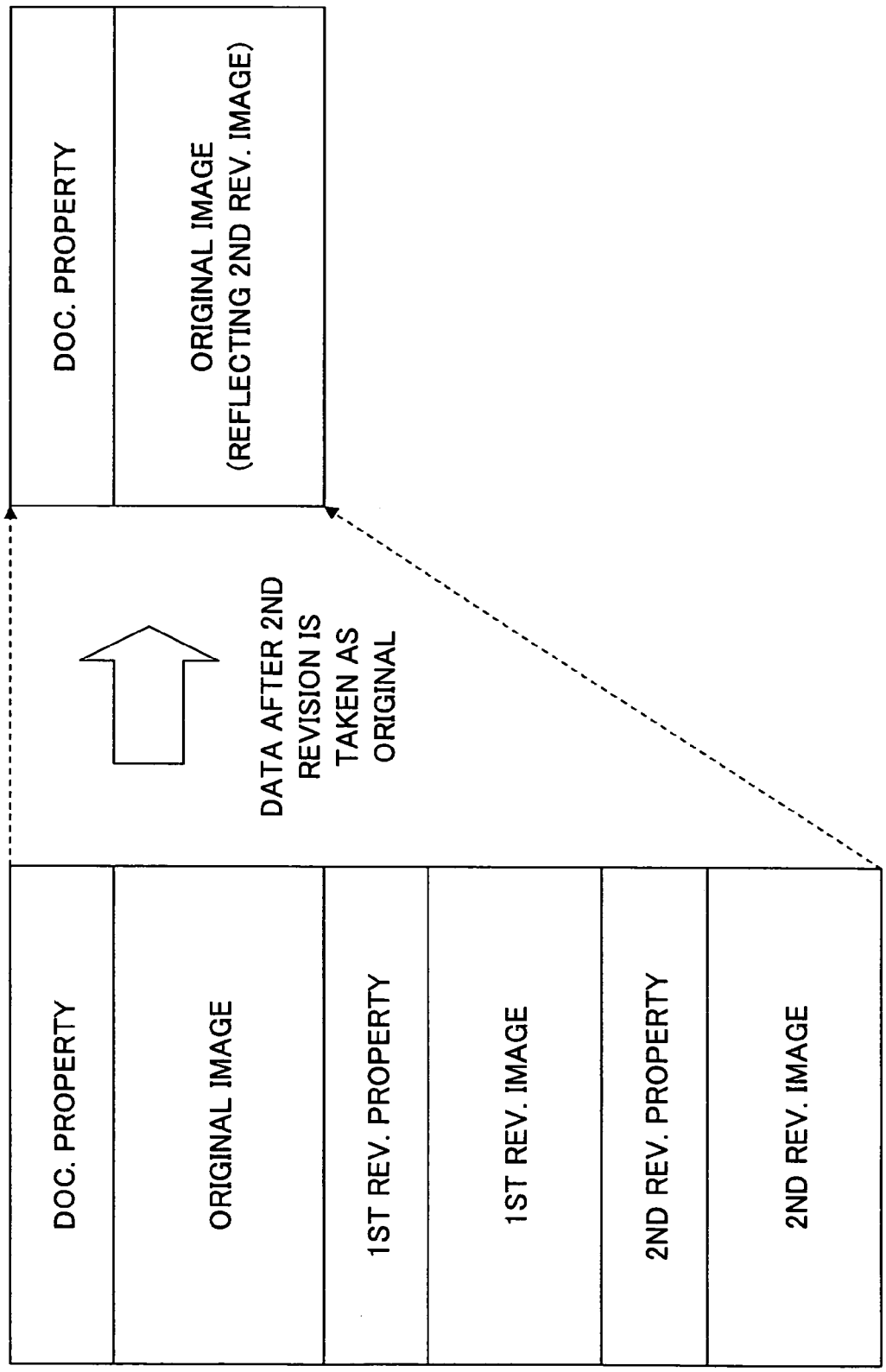

PUI DOC. PROPERTY TABLE

| DOC. ID | TITLE | DATE | PERSON | ACCESS | FILE NAME |
|---|---|---|---|---|---|
| D1 | ORDER INTAKE | 2003/4/2 | YAMAMOTO | YAMAMOTO | /db/d1.txt |
| D2 | NEW PRODUCT | 2003/5/1 | MATSUNO | ALL | /db/d2.html |
| D3 | MINUTES | 2003/5/20 | KAWADA | KAWADA | /db/d3.txt |
| .. | .. | .. | .. | .. | .. |

FIG.43A

PUI DOC. ORIGINAL IMAGE TABLE

| DOC. ID | PAGE NO. | FILE NAME |
|---|---|---|
| D1 | 1 | /img/d1-1 |
| D1 | 2 | /img/d1-2 |
| D2 | 1 | /img/d2-1 |
| .. | .. | .. |

PUI REVISION PROPERTY TABLE

| DOC. ID | REV. ID | PRIOR REV. ID | REV. DATE | REV. PERSON |
|---|---|---|---|---|
| D1 | A1 | – | 2003/4/3 | YAMADA |
| D1 | A2 | A1 | 2003/4/4 | MATSUDA |
| D1 | A3 | A2 | 2003/4/6 | MATSUDA |
| D1 | A4 | A1 | 2003/5/5 | SUGITA |
| D2 | A1 | – | 2003/5/21 | KAWAMOTO |
| .. | .. | .. | .. | .. |

FIG.44B

PUI REVISION IMAGE TABLE

| DOC. ID | REV. ID | PAGE NO. | FILE NAME |
|---|---|---|---|
| D1 | A1 | 1 | /add/d1-a1-1 |
| D1 | A1 | 2 | /add/d1-a1-2 |
| D1 | A2 | 1 | /add/d1-a2-1 |
| D1 | A2 | 2 | /add/d1-a2-2 |
| .. | .. | .. | .. |

FIG.46

PUI DOC. TABLE

| DOC. ID | TITLE | DATE | PERSON | ACCESS | URL |
|---|---|---|---|---|---|
| D1 | ORDER INTAKE | 2003/4/2 | YAMAMOTO | YAMAMOTO | http://foo1/pui/d1 |
| D2 | NEW PRODUCT | 2003/5/1 | MATSUNO | ALL | http://foo2/d2 |
| D3 | MINUTES | 2003/5/20 | KAWADA | KAWADA | http://foo3/doc/d3 |
| ... | ... | ... | ... | ... | ... |

FIG.47

```
<package>
 <original>
  <propList>
   <docId>D1</docId>
   <title>ORDER INTAKE</title>
   <date>2003-04-02</date>
   ...
  </propList>
  <image>ENCODED ORIGINAL IMAGE</image>
 </original>
 <layer>
  <propList>
   <layerId>A1</layerId>
   <date>2003-04-03</date>
   ...
  </propList>
  <image>ENCODED 1ST REVISION IMAGE</image>
 </layer>
 <layer>
  <propList>
   <layerId>A2</layerId>
   <parentId>A1</parentId>
   <date>2003-04-04</date>
   ...
  </propList>
  <image>ENCODED 2ND REVISION IMAGE</image>
 </layer>
</package>
```

FIG.49A addImage(binary imageData, string userName)

FIG.49B update(string docId, string layerId, binary imageData, string userName)

FIG.49C extract(binary originalImageData, binary targetImageData)

FIG.49D getFile(string docId, string layerId)
putFile(string docId, string layerId, binary puiFile)

DOCUMENT MANAGEMENT METHOD, DOCUMENT MANAGEMENT PROGRAM, RECORDING MEDIUM, AND DOCUMENT MANAGEMENT APPARATUS

BACKGROUND OF THE INVENTION

1. Field of the Invention

The present invention relates to a document management method, a document management program, a recording medium, and a document management apparatus.

2. Description of the Related Art

In recent years, some proposals regarding management of the PUI (paper user interaction) paper documents which are printed by adding the document ID (for example, URL (uniform resource locator)) indicating the source location where the original electronic document is retained have been made. Japanese Laid-Open Patent Application No. 2003-067363 discloses the technique of such document management.

For example, in a conventional system, if the user carries out a predetermined marking (which is, for example, the surrounding with a circle) to the words and phrases or the images of the PUI paper document, such information is read by the system. The system specifies the marked words and phrases or the marked images on the original electronic document by taking the differences between the read PUI paper document and the bitmap expansion of the original electronic document.

Moreover, in another conventional system, if the original electronic document is the hypertext and a specific marking (the surrounding with a circle) is affixed to the words and phrases or the image (the words and phrases are usually underlined) of the PUI paper document to which the tag is added, such information is read by the system. The system specifies the marked words and phrases or the marked images on the original electronic document by taking the differences between the read PUI paper document and the bitmap expansion of the original electronic document, and acquires the link place information (usually URL) from the tag.

Moreover, in another conventional system, if a predetermined marking (for example, underline) is performed to the words or phrases which are used as the keywords in the PUI paper document, such information is read by the system. The system specifies the marked words and phrases on the original electronic document by taking the differences between the read PUI paper document and the bitmap expansion of the original electronic document, and starts the retrieval of the search engine by taking them as the keywords.

However, as for the conventional systems, there is the problem that they are not provided with the mechanism for effectively managing the revision information and the original document with the association of the user ID, the revision information and the original electronic document.

Moreover, as for the conventional PUI paper document management system, there is the problem which the system does not manage the revision data concerning the revisions on the original document and the attribute information concerning the attributes of the revision data with the association to the original PUI paper document. Hence, it is difficult that the workflow management system in which several workflow operators perform several revisions onto the same document, and the PUI paper document related system are operated with the association of the systems.

SUMMARY OF THE INVENTION

An object of the present invention is to provide an improved document management method and apparatus in which the above-described problems are eliminated.

Another object of the present invention is to provide a document management method and apparatus in which the document file containing the original document and the revision information added thereto is effectively managed with the association of the user ID, the revision information and the original document.

Another object of the present invention is to provide a computer program product embodied therein for causing a computer to execute a document management method in which in which the document file containing the original document and the revision information added thereto is effectively managed with the association of the user ID, the revision information and the original document.

Another object of the present invention is to provide a document file management device which allows the paper document related system and the workflow management system to be effectively operated with the association thereof.

Another object of the present invention is to provide a data structure for use in a document file management device with which the paper document related system and the workflow management system can be effectively operated with the association thereof.

The above-mentioned objects of the present invention are achieved by a document management method comprising steps of: acquiring data of a paper document to which revision data are added; acquiring data of a document file corresponding to the paper document, based on document-file identification information that identifies the document file; extracting difference data indicating differences between the data of the paper document and the data of the document file; and associating the revision data contained in the difference data, revision attribute information concerning the revision data, and the document file, so that the document file is managed with the association.

The above-mentioned objects of the present invention are achieved by a document management method comprising steps of: associating revision data added to a paper document, revision attribute information concerning the revision data, and a document file, so that the document file is managed with the association; and adding the revision attribute information and document-file identification information that identifies the document file, to data of the document file.

The above-mentioned objects of the present invention are achieved by a computer program product embodied therein for causing a computer to execute a document management method, the document management method comprising steps of: acquiring data of a paper document to which revision data are added; acquiring data of a document file corresponding to the paper document, based on document-file identification information that identifies the document file; extracting difference data indicating differences between the data of the paper document and the data of the document file; and associating the revision data contained in the difference data, revision attribute information concerning the revision data, and the document file, so that the document file is managed with the association.

The above-mentioned objects of the present invention are achieved by a computer program product embodied therein for causing a computer to execute a document management method, the document management method comprising steps of: associating revision data added to a paper document, revision attribute information concerning the revision data, and a document file, so that the document file is managed with the association; and adding the revision attribute information and document-file identification information that identifies the document file, to data of the document file.

The above-mentioned objects of the present invention are achieved by a document management apparatus comprising: a paper-document-data acquisition unit acquiring data of a paper document to which revision data are added; a document-file-data acquisition unit acquiring data of a document file corresponding to the paper document, based on document-file identification information that identifies the document file; a difference-data extraction unit extracting difference data indicating differences between the data of the paper document and the data of the document file; and a management unit associating the revision data contained in the difference data, revision attribute information concerning the revision data, and the document file, so that the document file is managed with the association.

The above-mentioned objects of the present invention are achieved by a document management apparatus comprising: a management unit associating revision data added to a paper document, revision attribute information concerning the revision data, and a document file, so that the document file is managed with the association; and an information addition unit adding the revision attribute information and document-file identification information that identifies the document file, to data of the document file.

The above-mentioned objects of the present invention are achieved by a document file management device which manages a document file concerning a process by using an object-oriented model, the object-oriented model being configured to include: a document-file management class managing the document file concerning the process; a revision-data extraction class extracting revision data; and a document-file update class updating the document file concerning the process.

The above-mentioned objects of the present invention are achieved by a data structure which is adapted to inputs and outputs of a document file concerning a process for use in a document file management device, comprising: original data indicating an original image of the document file; original attribute information concerning the original data; and revision data indicating revisions which are added to the original data in steps which constitute the process.

According to the present invention, it is possible to establish association of the user ID, the revision information and the original electronic document, and the document data can be effectively managed with the association.

Moreover, the present invention may be embodied as the document-management program, the recording medium, and the document-management apparatus in order to achieve the above-mentioned objects of the invention.

According to the present invention, the association of the user ID, the revision information and the original electronic document can be established, and the electronic document can be managed effectively with the association.

BRIEF DESCRIPTION OF THE DRAWINGS

Other objects, features and advantages of the present invention will be apparent from the following detailed description when reading in conjunction with the accompanying drawings.

FIG. 14 is a diagram for explaining an example of the structure of the PUI document file.

FIG. 15A and FIG. 15B are diagrams for explaining examples of the tables concerning the PUI document file.

FIG. 17 is a sequence diagram for explaining the procedure of the outputting of the PUI paper document.

FIG. 42 is a diagram for explaining an example of the compression of the PUI document file.

FIG. 43A and FIG. 43B are diagrams for explaining examples of the tables concerning the original image of the PUI document file.

FIG. 44A and FIG. 44B are diagrams for explaining examples of the tables concerning the revision information.

FIG. 46 is a diagram for explaining another example of the table concerning the PUI document file.

FIG. 47 is a diagram for explaining an example of the external expression of the PUI document file.

FIG. 49 is a diagram for explaining examples of the methods of the respective classes.

DETAILED DESCRIPTION OF PREFERRED EMBODIMENTS

A description will now be given of the preferred embodiments of the invention with reference to the accompanying drawings.

Figure 1:
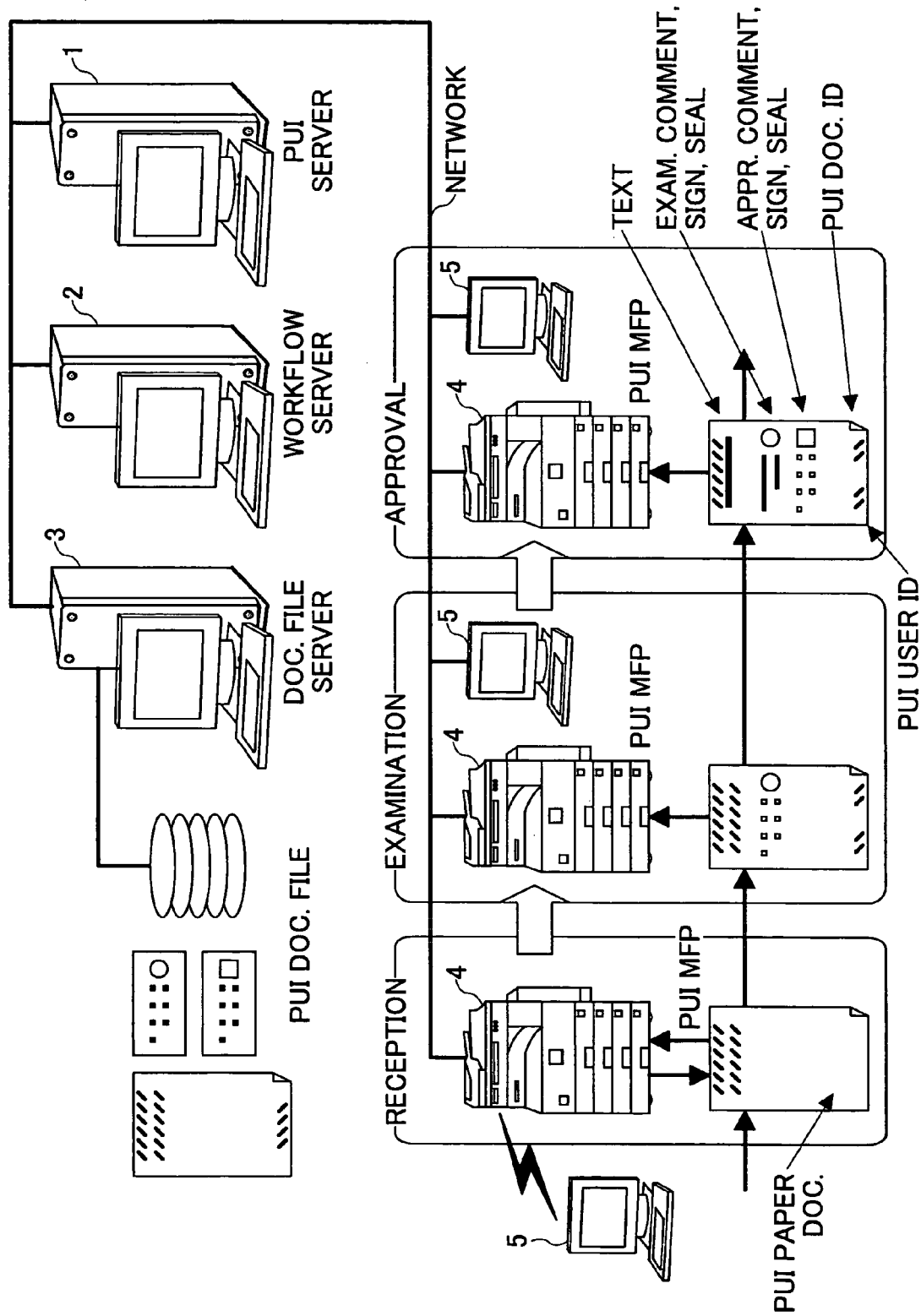
FIG. 1 is a diagram showing the concept of the procedure of examination and approval performed by an embodiment of the PUI electronic workflow system of the invention.

FIG. 1 is a diagram showing the concept of the procedure of examination and approval performed by the PUI-electronic workflow system in which the document management apparatus of the invention is embodied.

As shown in FIG. 1, the PUI-electronic workflow system comprises the PUI server 1, the workflow server 2, the document file server 3, at least one PUI MFP (multi-function peripheral) 4, and at least one client PC 5, which are connected through the network.

In the system shown in FIG. 1, the PUI paper document to which the PUI user ID that identifies the user and the PUI document ID that identifies the PUI paper document are added is circulated to (or passed around) the next examination/approval persons.

In the PUI server 1, new revision information, such as the comment, the sign and the sealing, is separated from the image information of the PUI paper document read by PUI MFP 4.

The PUI server 1 separates the new revision information by extracting the differences between the image information of the PUI paper document read by PUI MFP 4 and the original information of the electronic document before the revision information of examination/approval person is added.

The revision information, containing the PUI user ID that identifies the user who has corrected the document and the PUI document ID, is associated with the original electronic document, and the electronic document is managed with the association in the document file server 3 as a PUI document file.

As shown in FIG. 1, the PUI paper document is circulated and the examination and approval are performed. Hence, the time and effort needed to print the PUI paper document repeatedly as in the conventional method can be eliminated.

Moreover, the PUI paper document is processed electronically at the time of examination and approval, and the revision information is managed in the document file server 3. Thus, even if the PUI paper document is lost in the middle of circulation, there is little trouble. The workflow shown in FIG. 1 will be called Type-A.

In addition, the PUI server 1, the workflow server 2, the document file server 3, and PUI MFP 4 may be different devices, and they may be mounted in the same device. Moreover, it is possible that the document file server 3 and the PUI server 1 are provided within the same device and other servers are separate devices. The same discussion is applicable to the description of the following embodiments.

Moreover, although not illustrated in FIG. 1, the authentication server may be connected to the PUI-electronic workflow system, and it is possible to make it use for the user's authentication etc.

Next, another example of the procedure of examination and approval performed by the PUI-electronic workflow system will be explained using FIG. 2.

Figure 2:
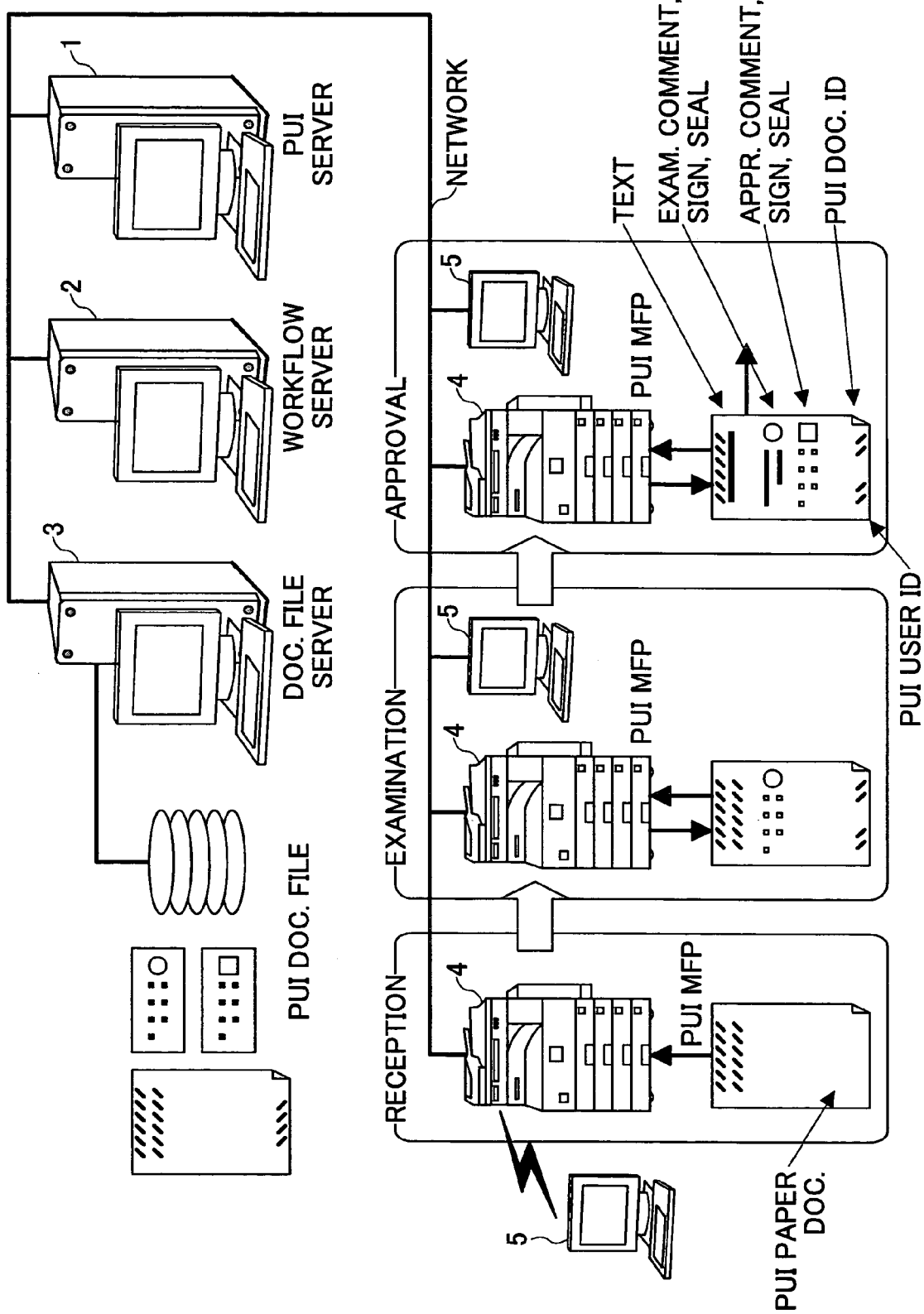
FIG. 2 is a diagram showing the concept of another procedure of the examination and approval performed by the PUI electronic workflow system of the present embodiment.

FIG. 2 is a diagram showing the concept of the procedure of examination and approval performed by the PUI-electronic workflow system.

Similar to the system of FIG. 1, the PUI-electronic workflow system shown in FIG. 2 comprises the PUI server 1, the workflow server 2, the document file server 3, at least one PUI MFP 4, and at least one client PC 5, which are connected through the network.

In the system shown in FIG. 2, the PUI paper document to which the PUI user ID that identifies the user and the PUI document ID which identifies the PUI paper document are added, is read by PUI MFP 4, and thereafter it is printed out by PUI MFP 4 as a new PUI paper document in response to the request from the next examination/approval person.

As described above, in the PUI server 1, new revision information, such as the comment, the sign and the sealing, is separated from the image information of the PUI paper document read by PUI MFP 4.

The PUI server 1 separates the new revision information by extracting the differences between the image information of the PUI paper document read by PUI MFP 4 and the original information of the electronic document before the revision information of examination/approval person is added.

The revision information, containing the PUI user ID that identifies the user who has corrected the document and the PUI document ID, is associated with the original electronic document, and the electronic document is managed with the association in the document file server 3 as a PUI document file.

When compared with the method shown in FIG. 1, in the method shown in FIG. 2, the PUI paper document is not circulated, but in order to carry out the printing output of the PUI paper document from PUI MFP 4 connected through the network and to perform examination, approval, etc. Although it is the workflow using the paper document, there is little loss of the circulation time and the workflow extended to the remote places will be realized. The workflow shown in FIG. 2 will be called Type-B.

Next, another example of the procedure of examination and approval performed by the PUI-electronic workflow system will be explained using FIG. 3.

Figure 3:
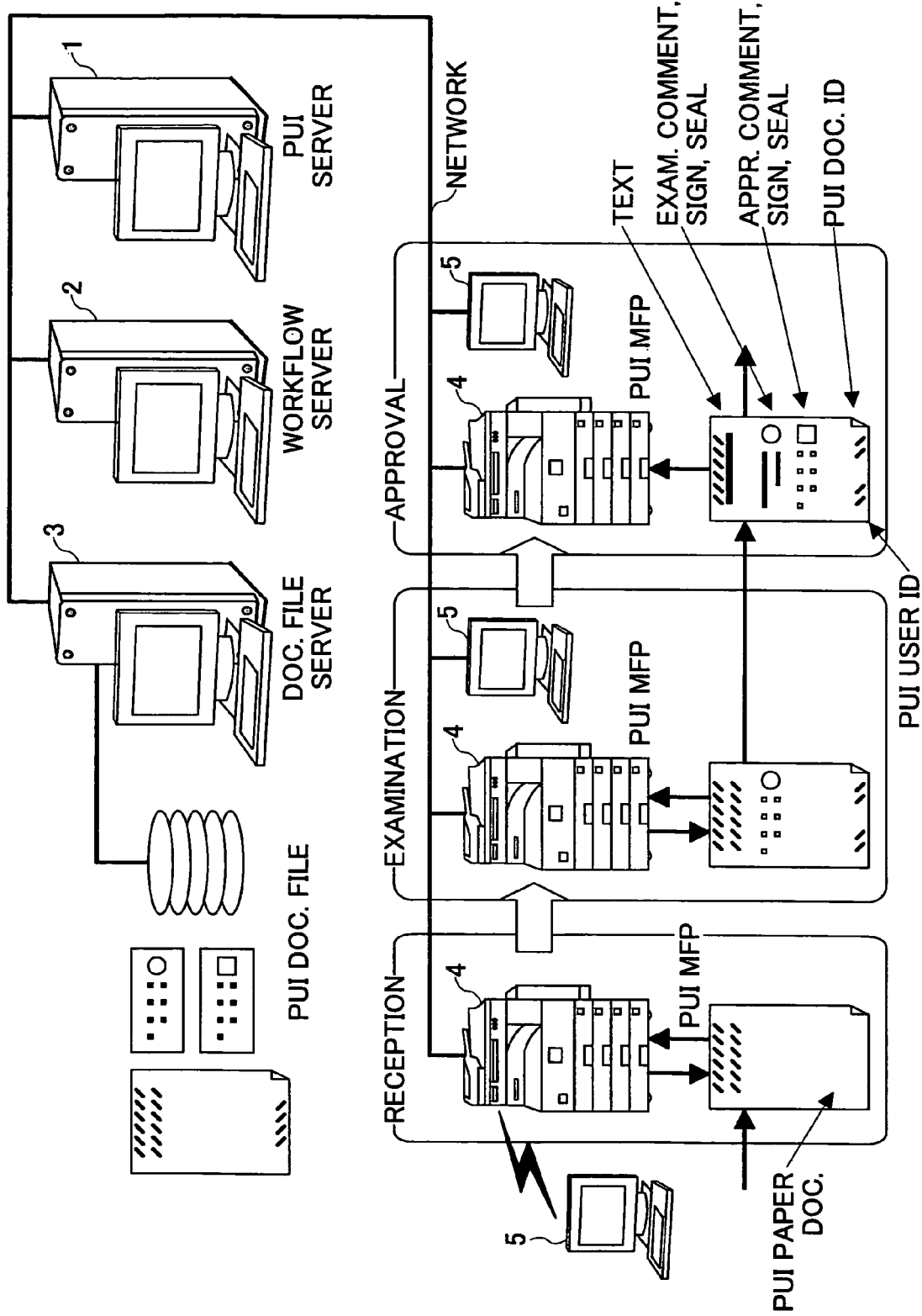
FIG. 3 is a diagram showing the concept of another procedure of the examination and approval performed by the PUI electronic workflow system of the present embodiment.

FIG. 3 is a diagram showing the concept of the procedure of examination and approval performed by the PUI-electronic workflow system.

Similar to the system shown in FIG. 1 or FIG. 2, the PUI-electronic workflow system shown in FIG. 3 comprises the PUI server 1, the workflow server 2, the document file server 3, at least one PUI MFP 4, and at least one client PC 5, which are connected through the network.

In the system shown in FIG. 3, the PUI paper document to which the PUI user ID that identifies the user and the PUI document ID which identifies the PUI paper document are added, is read by the PUI MFP 4. After this, it may be circulated to the next examination/approval person. Alternatively, when the next examination/approval person is in the remote place, the PUI paper document after read by PUI MFP 4 may be printed out by PUI MFP 4 as a new PUI paper document in response to the request from the next examination/approval person.

As described above, in the PUI server 1, new revision information, such as the comment, the sign and the sealing, is separated from the image information on the PUI paper document read by PUI MFP 4.

The PUI server 1 separates the new revision information by extracting the differences between the image information of the PUI paper document read by PUI MFP 4 and the original information of the electronic document before the revision information of examination/approval person is added.

The revision information, containing the PUI user ID that identifies the user who has corrected the document and the PUI document ID, is associated with the original electronic document, and the electronic document is managed with the association in the document file server 3 as a PUI document file.

By selecting the method as shown in FIG. 3, it is possible that the paper document itself is circulated and examination and approval are performed in the same place of business. When performing examination and approval in other places of business is required, it is also possible that the PUI paper document is read by PUI MFP 4, and the printing output of the same document from PUI MFP 4 at the other places of business connected through the network so that the examination and approval of the print-out document can be requested.

In addition, the user who performs examination/approval makes revisions concerning examination/approval to the PUI paper document which is printed out by PUI MFP 4 or hand-delivered from the other user, after the E-mail of the request for the examination/approval from the workflow server 2 is received by the client PC 5, and makes the PUI paper document to which the revision information is added read by PUI MFP 4.

Alternatively, the user who performs examination/approval may use the client PC 5 to perform the electronic sealing etc. on the display of the client PC 5 so that the examination/approval of the PUI paper document is carried out.

Next, the hardware composition of PUI server 1 will be explained using FIG. 4.

Figure 4:
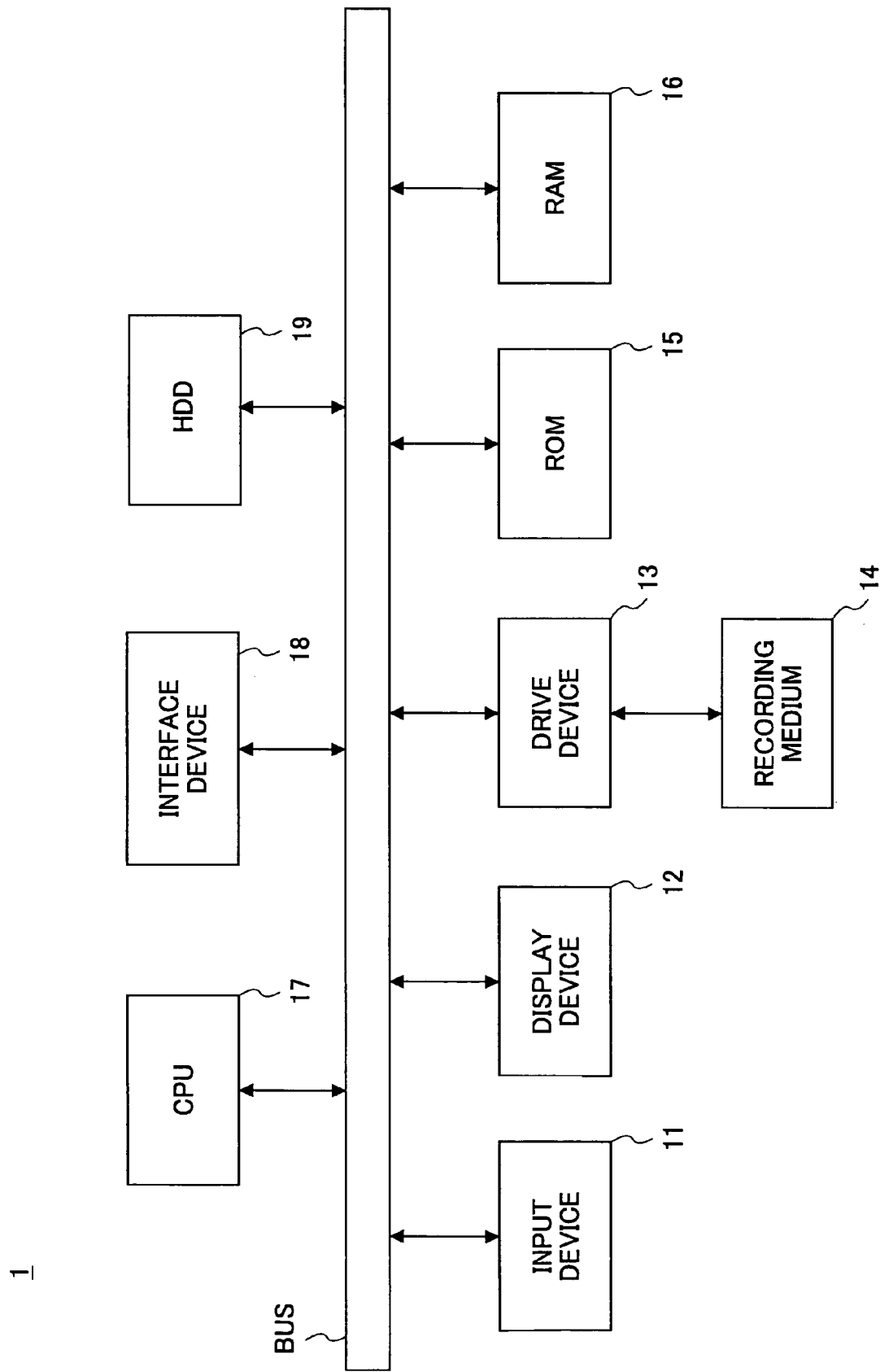
FIG. 4 is a block diagram showing the hardware composition of the PUI server in the PUI electronic workflow system of the present embodiment.

FIG. 4 is a block diagram showing an example of the hardware composition of PUI server 1.

As shown in FIG. 4, the PUI server 1 comprises the input device 11, the display device 12, the drive device 13, the recording medium 14, the ROM (read-only memory) 15, the RAM (random access memory) 16, the CPU (central processing unit) 17, the interface device 18, and the HDD (hard disk drive) 19, which are interconnected by the bus.

The input device 11 includes the keyboard, the mouse, etc. operated by the user of the PUI server 1, and is provided for inputting various operational signals into the PUI server 1.

The display device 12 includes the displays used by the user of the PUI server 1, and is provided to display various items of information.

The interface device 18 is the interface which connects the PUI server 1 to the network etc.

The PUI server 1 is provided with the server program which performs the procedure of each processing (which will be described later). The server program may be installed to the PUI server 1 by the recording medium 14, such as CD-ROM, or may be downloaded through the network.

The recording medium 14 is placed in the drive device 13, and the server program is installed into the ROM 15 through the drive device 13 from the recording medium 14.

The ROM 15 stores data, the server program, etc. The RAM 16 reads and stores the server program etc. from the ROM 15 at the time of starting of the PUI server 1.

The server program is read to and stored in the RAM 16, and the CPU 17 performs processing according to the stored server program. The HDD 19 stores data and the files.

In addition, the hardware composition of the client PC 5, the workflow server 2, the document file server 3, the authentication server (which will be described later), and the PUI document-management server 7 is essentially the same as the hardware composition of the PUI server 1 shown in FIG. 4, and a description thereof will be omitted for the sake of simplicity of description.

Next, the functional composition and hardware composition of PUI MFP 4 will be explained using FIG. 5 and FIG. 6, respectively.

Figure 5:
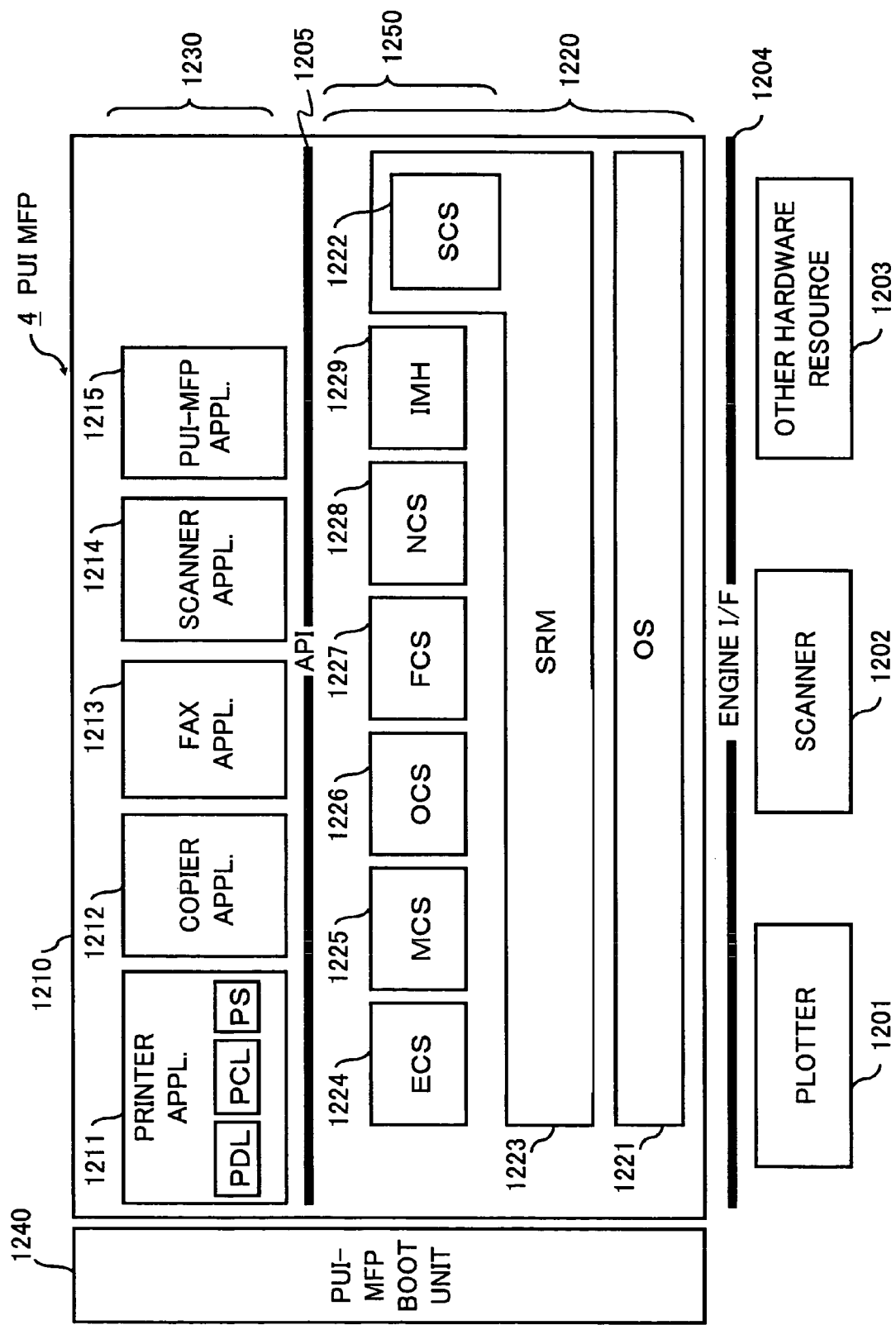
FIG. 5 is a block diagram showing the functional composition of the PUI MFP.

FIG. 5 is a block diagram showing an example of the functional composition of PUI MFP 4.

As shown in FIG. 5, the functional composition of PUI MFP 4 comprises the software group 1210 (which includes the platform layer 1220 and the application layer 1230), the PUI MFP boot unit 1240, the plotter 1201, the scanner 1202, and other hardware resources 1203 (such as the facsimile).

The PUI MFP boot unit 1240 is caused to start execution of the platform layer 1220 and the application layer 1230 when the PUI MFP 4 is powered up.

The platform layer 1220 includes the control services 1250 (which will be described below) which interpret the processing request from the application layer 1230 and generate the acquisition requests of the hardware resources, the system resource manager (SRM) 1223 which arbitrates the acquisition requests from the control services 1250 and performs management of one or a plurality of the hardware resources, and the operating system (OS) 1221.

The control services 1250 include two or more service modules. Specifically, there are SCS (system control service) 1222, ECS (engine control service) 1224, MCS (memory control service) 1225, OCS (operation-panel control service) 1226, FCS (facsimile control service) 1227, NCS (network control service) 1228, and IMH (imaging memory handler) 1229.

In addition, the platform layer 1220 includes the application-program interface which makes it possible to receive the processing request from the application layer 1230 according to the pre-defined function.

The OS 1221 is the operating system, such as UNIX (trademark), and carries out parallel execution of each software of the platform layer 1220 and the application layer 1230 as a process, respectively.

The safety of the program can be secured by using the UNIX (trademark) of the open source code, and the network architecture is possible, and the acquisition of the source code is easily attained. Furthermore, the loyalty of the OS and TCP/IP is unnecessary and the outsourcing also becomes easy.

The process of SRM 1223 performs control of the system and management of the hardware resources with SCS 1222. The process of SRM 1223 arbitrates and carries out execution control of the hardware resource according to the request from the high-order layer using the hardware resources of the engine unit, such as the scanner, the plotter, the memory, the HDD file, and the host I/Os (Centronics I/F, network I/F, IEEE1394 I/F, RS232C I/F, etc).

Specifically, the process of SRM 1223 determines whether the demanded hardware resources can be used or not, and provides the indication that the hardware resources demanded when use is possible can be used to the high-order layer. Moreover, the use scheduling of hardware resources is performed to the request from the high-order layer, and it may be made to carry out the contents of the request (for example, paper conveyance with the printer engine, imaging operation, memory reservation, the file creation, etc.) directly.

The process of SCS 1222 performs the plural functions including the application management (function 1), the operation-panel control (function 2), the system screen displays (the job list screen, the counter display screen, etc.) (function 3), the LED display (function 4), the resource management (function 5), and the interruption-application control (function 6).

Specifically, in the application management (function 1), the processing of registration of the application and notification of such indication to other applications is performed.

In the operation-panel control (function 2), the exclusive access control of the application to use the operation panel is performed.

In the system screen display (function 3), the warning screen corresponding to the state of the engine unit is displayed according to the contents of the request from the application which uses the operation panel.

In the LED display (function 4), the display control of the warning LED and the system LED, such as the application keys, is performed.

In the resource management (function 5), when the application (ECS) performs the job, the service for the exclusive access control of the engine resources (the scanner, the staple, etc.) which must carry out the exclusive control is provided.

In the interruption application control (function 6), the control and service for carrying out preferential operation of the specific application is provided.

Moreover, the process of ECS 1224 controls the engine units including the plotter 1201, the scanner 1202, and the other hardware resource 1203, and performs the image reading, the printing operation, the notice of the state, the jam recovery, etc.

The process of MCS 1225 performs the memory control and, specifically, performs the acquisition and releasing of the imaging memory, the use of the hard disk drive unit (HDD), the compression and decompression of the image data, etc.

OCS 1226 is the module which controls the communications of information between the operator and PUI MFP 4. The process of OCS 1226 notifies the operator's key operation event to the main control, provides the library function for each application to build the GUI, manages the GUI information which is built for each application, and performs display reflection processing of the console panel, etc.

The process of FCS 1227 provides the API (application program interface) 1205 for performing the facsimile transmission and reception from the application layer of the system controller using the PSTN/ISDN network, the registration/quotation of the various facsimile data managed with the BKM (backup SRAM), the facsimile reading, the facsimile reception printing, and the integrated transmission and reception.

NCS 1228 is the module group for offering the service which can be used in common to the application which needs network I/O. The process of NCS 1228 distributes the data received by each protocol from the network to each application, or performs the relaying function agency at the time of transmitting data to the network from the application.

The process of IMH 1229 carries out the mapping of the image data from the virtual-memory region (user virtual space) to the physical memory. Upon starting of the process, the system call is performed, the mapping of the virtual-memory region for the process is carried out, and the processing to release the virtual-memory region at the end of the process is performed.

The application layer 1230 includes the printer application 1211 which is the application programs for the printers which have page description language (PDL), PCL, and PostScript (PS), the copier application 1212 which is the application program for the copier, the fax application 1213 which is the application program for the facsimile, the scanner application 1214 which is the application program for the scanner, and the PUI MFP application 1215 which is the application program for PUI MFP 4.

The respective applications 1211-1215 can carry out execution of operation using each process on the platform 1220, and the screen display control program which performs screen control, the key operation control, the job creation, etc. serves as the subject.

In addition, a new application can also be downloaded to PUI MFP 4 through the network connected via NCS 1228. Moreover, each application can be added or deleted for every application.

The process of the PUI-MFP application 1215 performs, for example, the acquisition of the PUI document ID, the PUI user ID, and/or the MFP ID which identifies PUI MFP 4 (these IDs are also called the PUI mark collectively) from the read PUI paper document, the transmission of the ID information to the PUI server 1, or the composition of the PUI document file and the PUI mark which are acquired from the PUI server 1.

In addition, it is possible to implement the functions of the PUI server 1, the document file server 3, the workflow server 2, and/or the meeting schedule server 6 into the functional composition of PUI MFP 4 although this is not illustrated in the drawings.

In such composition, the applications which offer the respective functions are mounted in the application layer 1230.

In the composition of PUI MFP 4, the processing which is needed in common by the respective applications is performed unitarily on the platform layer 1220.

Figure 6:
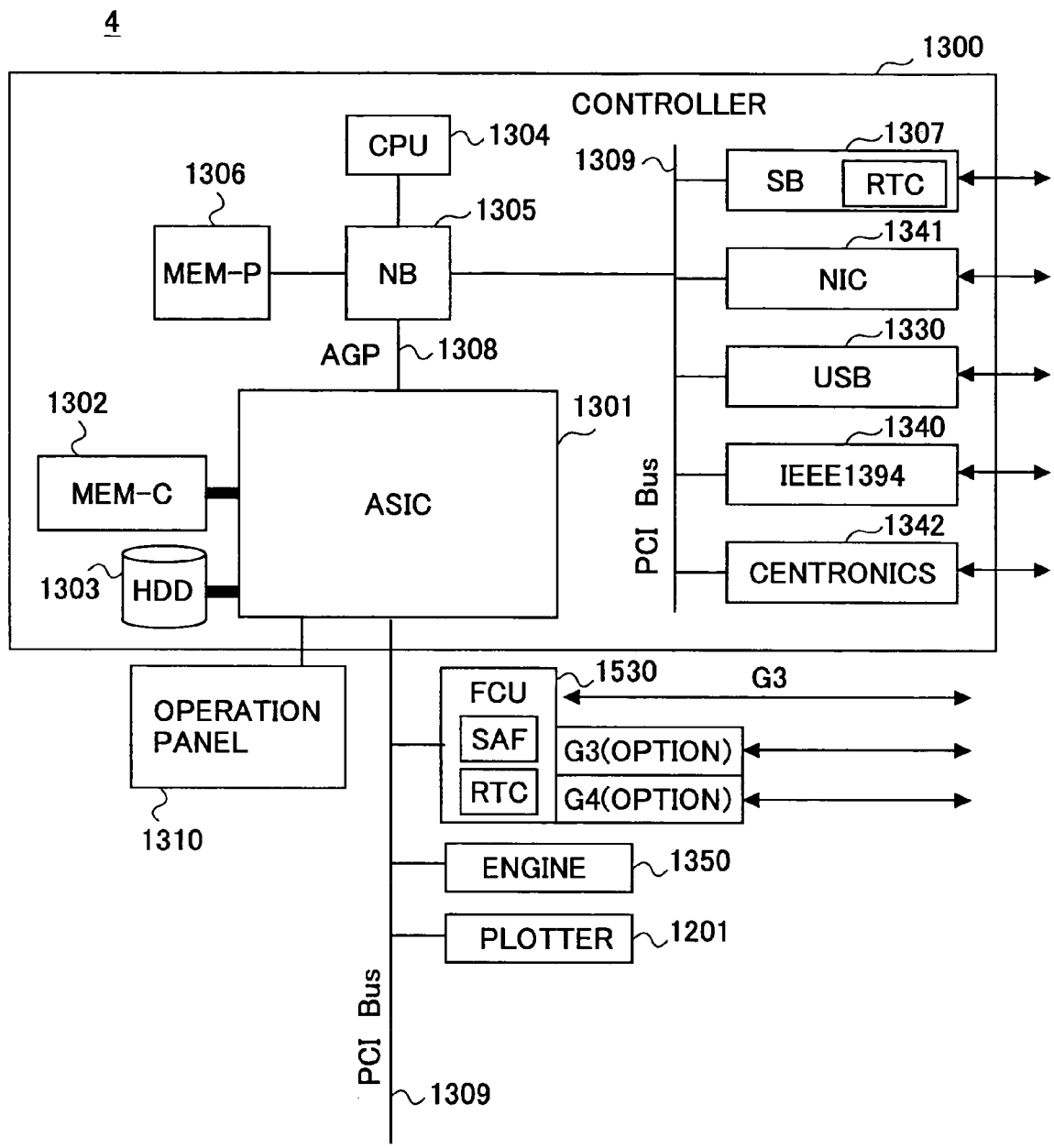
FIG. 6 is a block diagram showing the hardware composition of the PUI MFP.

FIG. 6 is a block diagram showing an example of the hardware composition of PUI MFP 4.

As shown in FIG. 6, the hardware composition of PUI MFP 4 includes the controller 1300, the operation panel 1310, the facsimile control unit (FCU) 1530, the engine unit 1350 (to which the scanner 1202 is connected), the plotter 1201, and the ASIC 1301 of the controller 1300, which are interconnected by the PCI (peripheral component interconnect) bus 1309.

The controller 1300 includes the ASIC 1301, and MEM-C (local memory) 1302, HDD (hard disk drive) 1303, etc. connected to the ASIC 1301. The ASIC 1301 and the CPU 1304 are connected through the north bridge (NB) 1305 of the CPU-chip set. The reason why they are connected through NB 1305 is that the interface of CPU 1304 is not exhibited to the public, and the ASIC 1301 and the CPU 1304 are connected through NB 1305 in order to avoid any problem.

The ASIC 1301 and NB 1305 are not connected only through the PCI bus, and the ASIC 1301 and NB 1305 are connected through AGP (accelerated graphics port) 1308. The reason why they are connected through AGP 1308 is that the lowering of the performance due to the direct connection to the low-speed PCI should be avoided. The PUI MFP 4 of FIG. 5 carries out execution control of a plurality of processes that constitute the platform layer 1220 and the application layer 1230 in the PUI MFP 4. For this purpose, the direct connection to the low-speed PCI is avoided and the ASIC 1301 and NB 1305 are connected through AGP 1308. Thus, it is possible to prevent the lowering of the performance.

The CPU 1304 performs control of the whole PUI MFP 4. Specifically, CPU 1304 starts and performs execution of SCS 1222, SRM 1223, ECS 1224, MCS 1225, OCS 1226, FCS 1227, and NCS 1228, which form the platform layer 1220 on the OS 1221, as a process, respectively, and starts and performs execution of the printer application 1211, the copier application 1212, the fax application 1213, the scanner application 1214, and the PUI MFP application 1215, which form the application layer 1230.

NB 1305 is the bridge for connecting CPU 1304, and MEM-P (system memory) 1306, SB (south bridge) 1307, NIC (network interface card) 1341, USB (universal serial bus) interface 1330, IEEE1394 interface 1340, Centronics interface 1342, and ASIC 1301.

MEM-P 1306 is the system memory used as the memory for the PUI MFP 4, and SB 1307 is the bridge for connecting NB 1305, ROM, PCI devices and the peripheral devices.

MEM-C 1302 is the local memory used as the image buffer for the copying, and the encoding buffer. ASIC 1301 is the application-specific IC for the image-processing applications which have the hardware component for image processing.

HDD 1303 is the storage device which accumulates or stores the image data, the program, the font data, the forms and the documents. The operation panel 1310 is provided to display the operational messages to the operator and receive the input operations from the operator.

ASIC 1301 is provided with the RAM interface for connecting MEM-C1302 and the hard disk interface for connecting HDD 1303. When outputting or inputting the image data to the memory units of the ASIC 1301, the I/O port is changed to the RAM interface or the hard disk interface.

AGP 1308 is the bus interface for the graphics accelerator card proposed in order to accelerate graphic processing. AGP 1308 serves to make operation of the graphics accelerator card at high speed by performing the random access to the system memory with high throughput.

Next, an example of the PUI mark added to the PUI paper document will be explained using FIG. 7.

Figure 7:
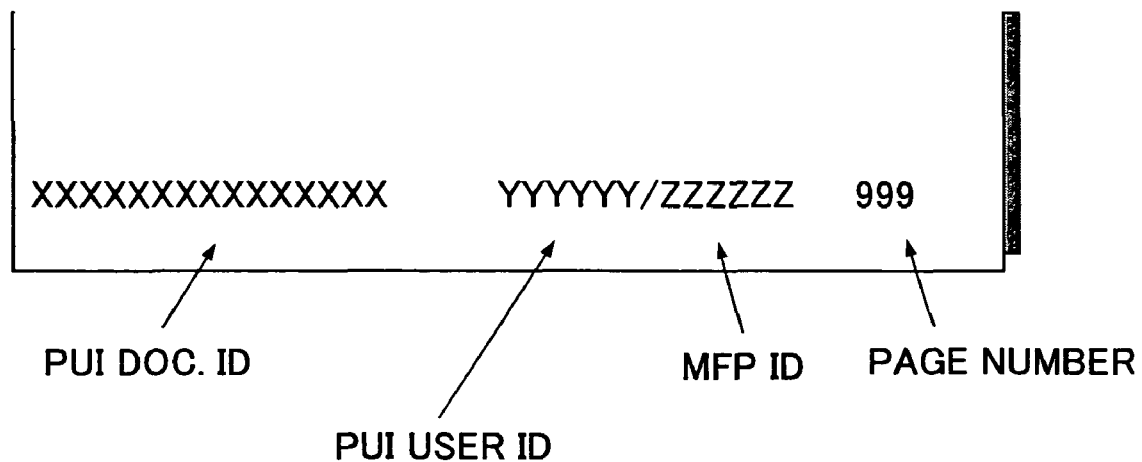
FIG. 7 is a diagram for explaining an example of the PUI mark.

FIG. 7 is a diagram for explaining an example of the PUI mark.

As shown in FIG. 7, the PUI mark added to the PUI paper document comprises the code (PUI document ID) specific to the document which identifies the original PUI document file, the code (PUI user ID) specific to the user which identifies the user, the code (MFP-ID) specific to PUI MFP 4 which identifies the PUI MFP 4 permitting and/or performing the reading and/or printing of the PUI paper document, and the page number.

In addition, the association of the PUI user ID and the MFP-ID may be used as the user ID, such as YYYYYY/ZZZZZZ shown in FIG. 7. In this manner, it is possible to specify the user who is permitted to read and/or print the PUI paper document by the predetermined PUI MFP 4.

Moreover, by adding the page number, it is possible to specify which page of the PUI document file, even if it is the same PUI document file.

Next, some examples of the revision information concerning the propriety of examination and approval will be explained using FIG. 8 and FIG. 9.

Figure 8:
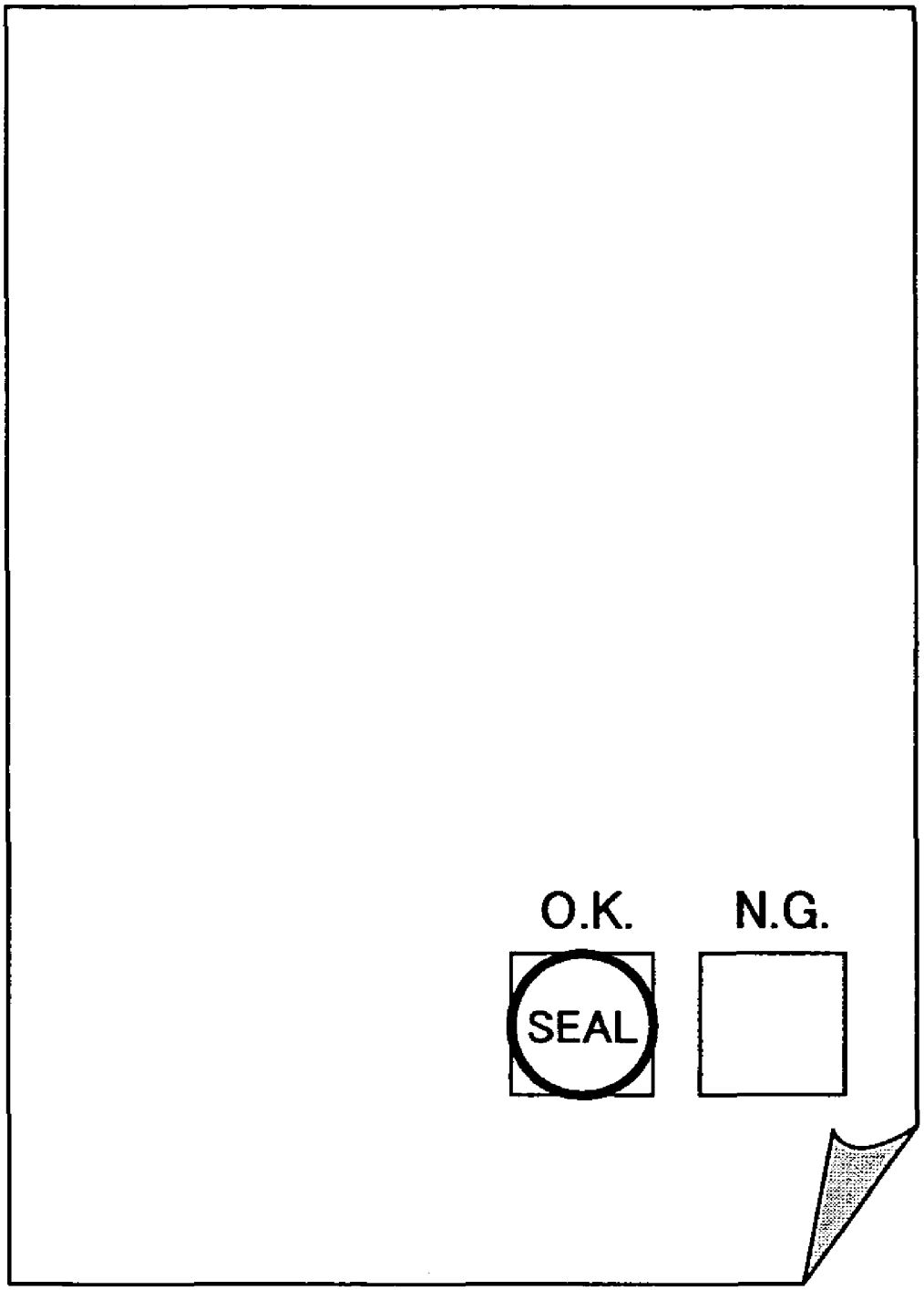
FIG. 8 is a diagram for explaining the revision information concerning the propriety of examination and approval.

FIG. 8 is a diagram for explaining the revision information concerning the propriety of examination and approval.

By providing the sealing block "OK" and the sealing block "NG" in the PUI paper document, as shown in FIG. 8, the PUI server 1 and/or PUI MFP 4 can determine the propriety of examination and approval based on the position of the sealing image in the extracted difference data.

Figure 9:
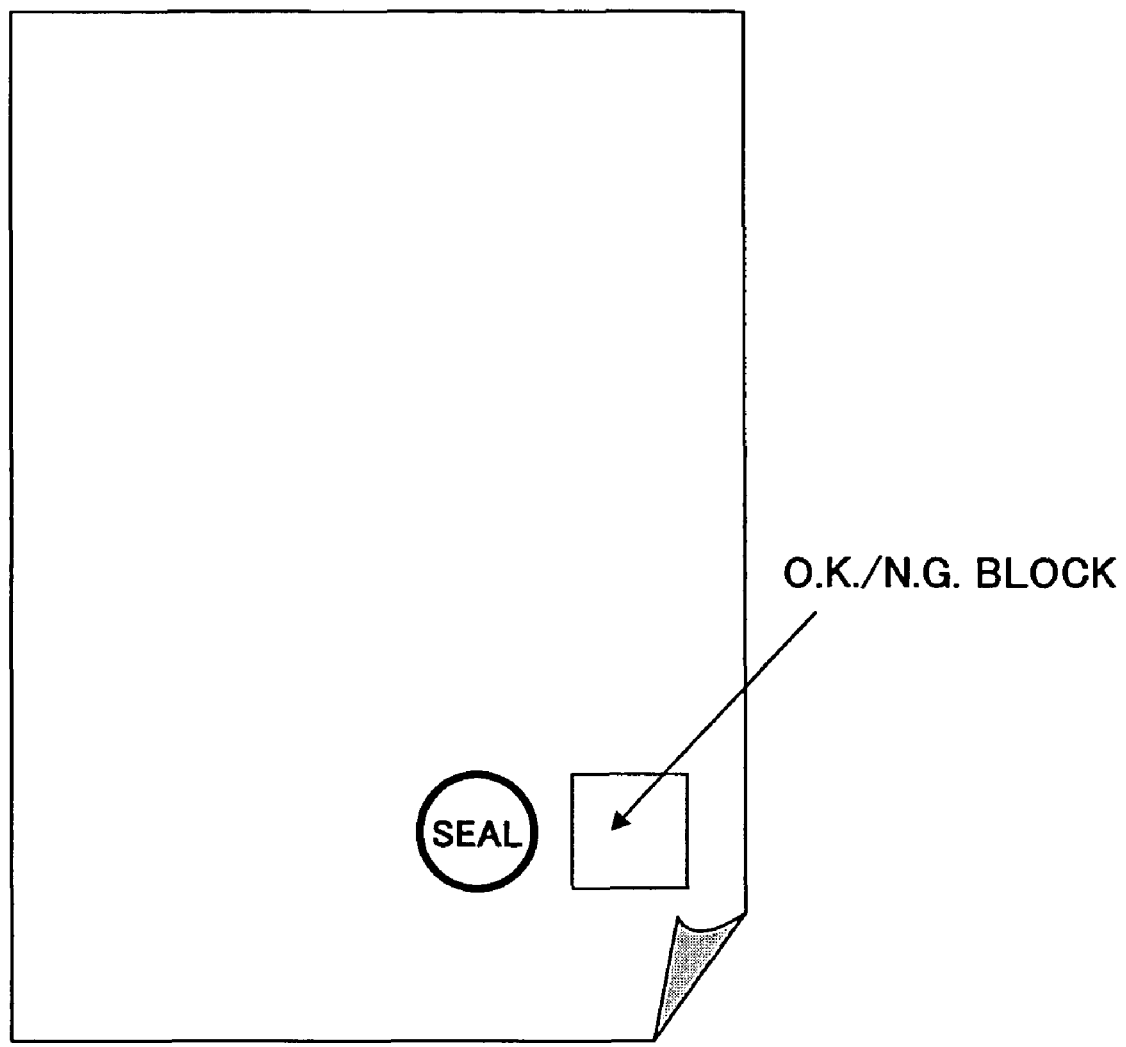
FIG. 9 is a diagram for explaining the revision information concerning the propriety of examination and approval.

Next, FIG. 9 is a diagram for explaining the revision information concerning the propriety of examination and approval.

By providing the sealing block "OK/NG" in the PUI paper document, as shown in FIG. 9, the PUI server 1 and/or PUI MFP 4 performs the OCR processing to the revision image of the extracted difference data, and determines whether the result is approval of "OK" or rejection of "NG", so that the propriety of examination and approval can be determined.

Next, the functional composition of each device which constitutes the system described above with FIG. 1 through FIG. 3 will be explained using FIG. 10 through FIG. 14.

Figure 10:
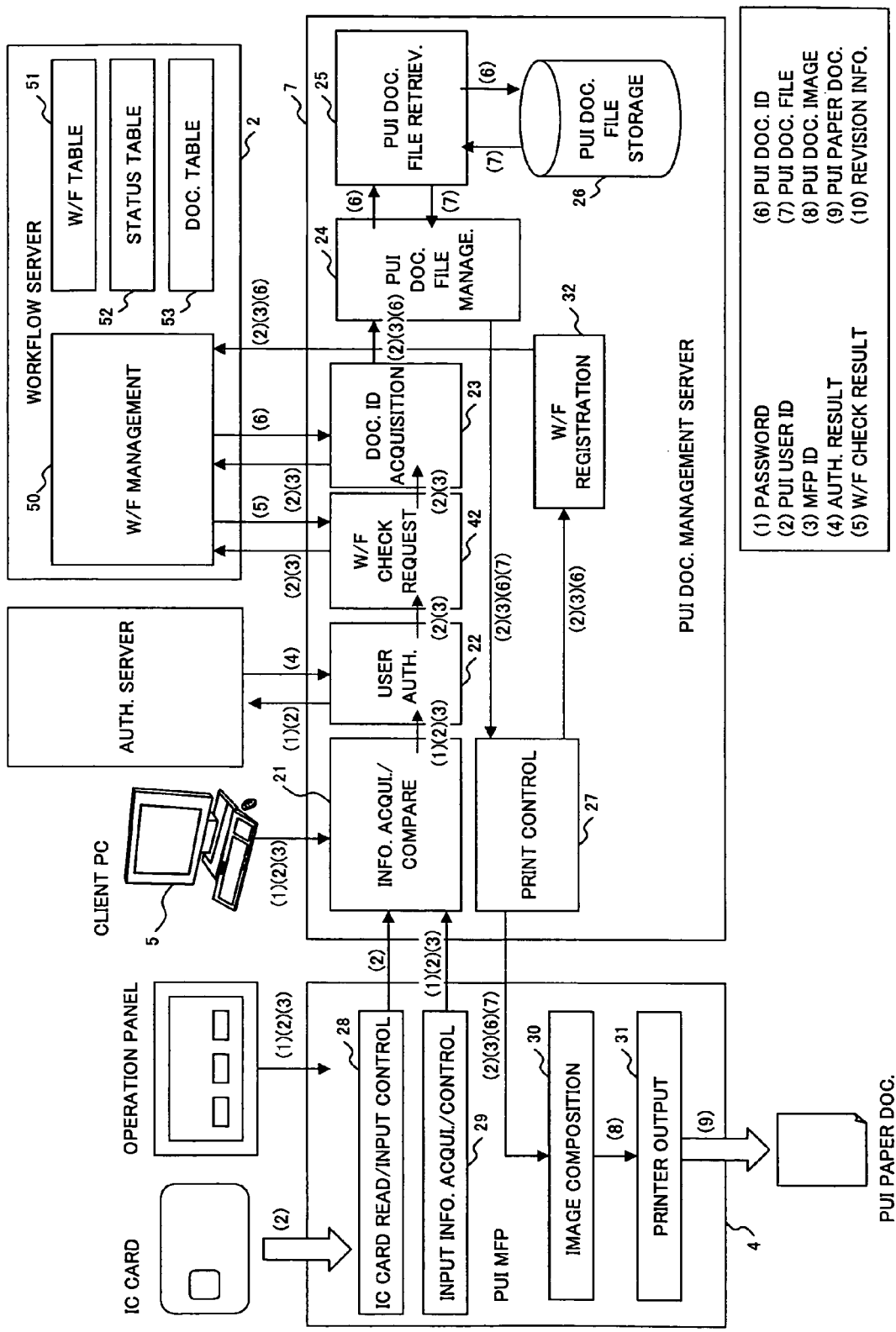
FIG. 10 is a diagram for explaining the functional composition concerning the outputting of the PUI paper document.
Figure 11:
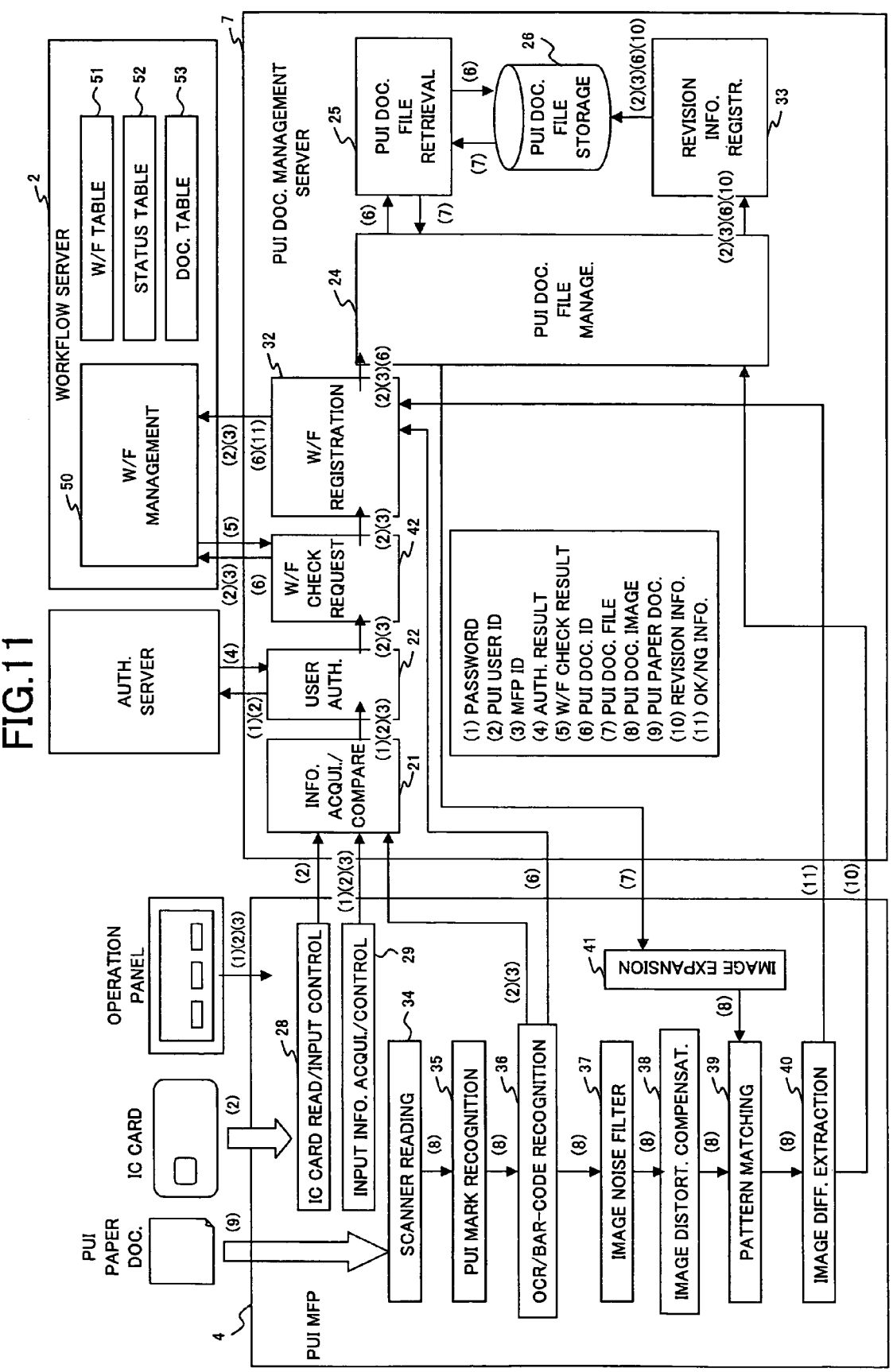
FIG. 11 is a diagram for explaining the functional composition concerning the inputting of the PUI paper document.

FIG. 10 and FIG. 11 show examples in which the main PUI related functions are incorporated in the PUI MFP 4 and the remaining functions are incorporated in the PUI document-management server 7 which combines the PUI server 1 and the document file server 3. On the other hand, FIG. 12 and FIG. 13 show examples in which the main PUI related functions are incorporated in the PUI server 1 and separated from the document file server 3.

Figure 12:
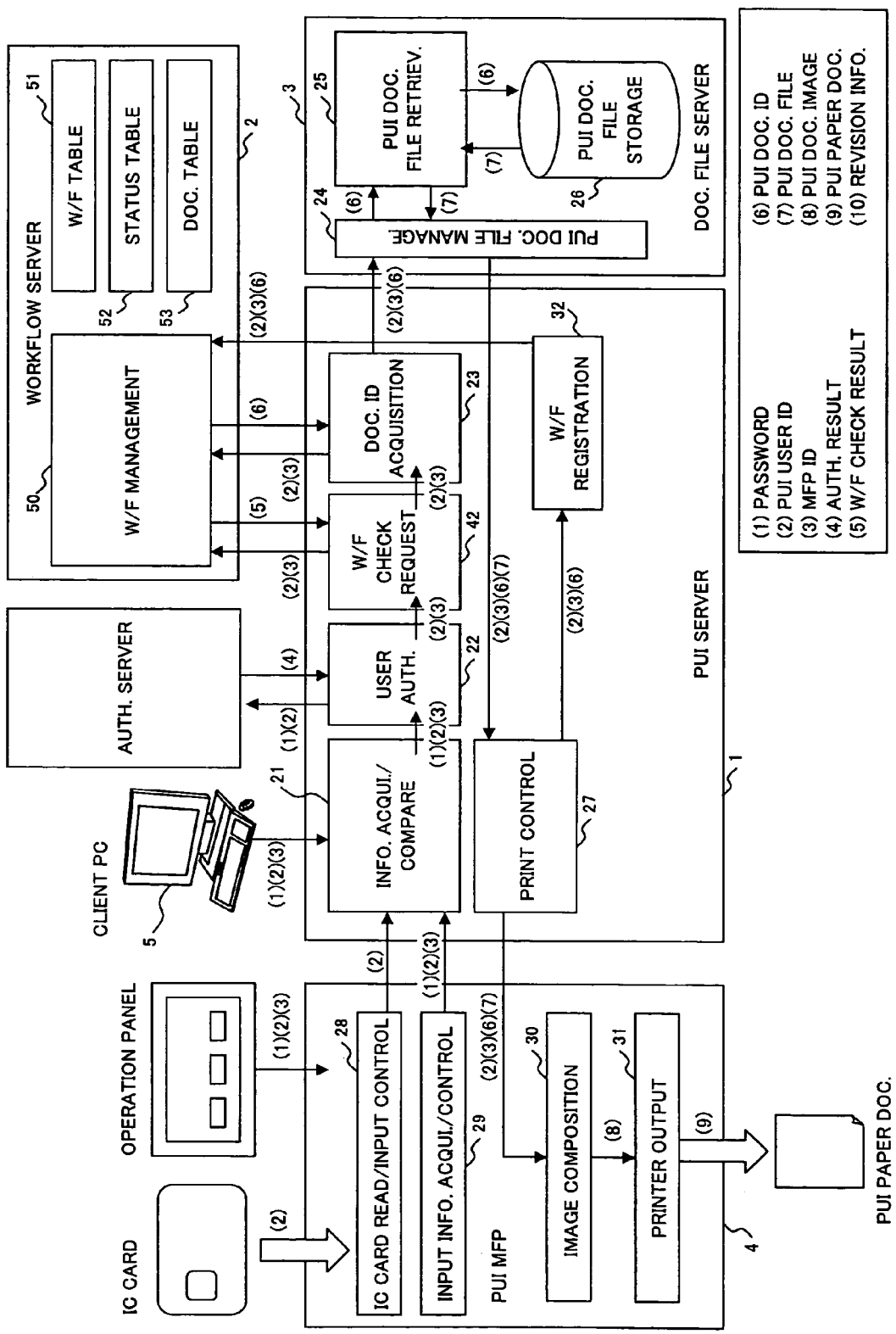
FIG. 12 is a diagram for explaining the functional composition concerning the outputting of the PUI paper document.
Figure 13:
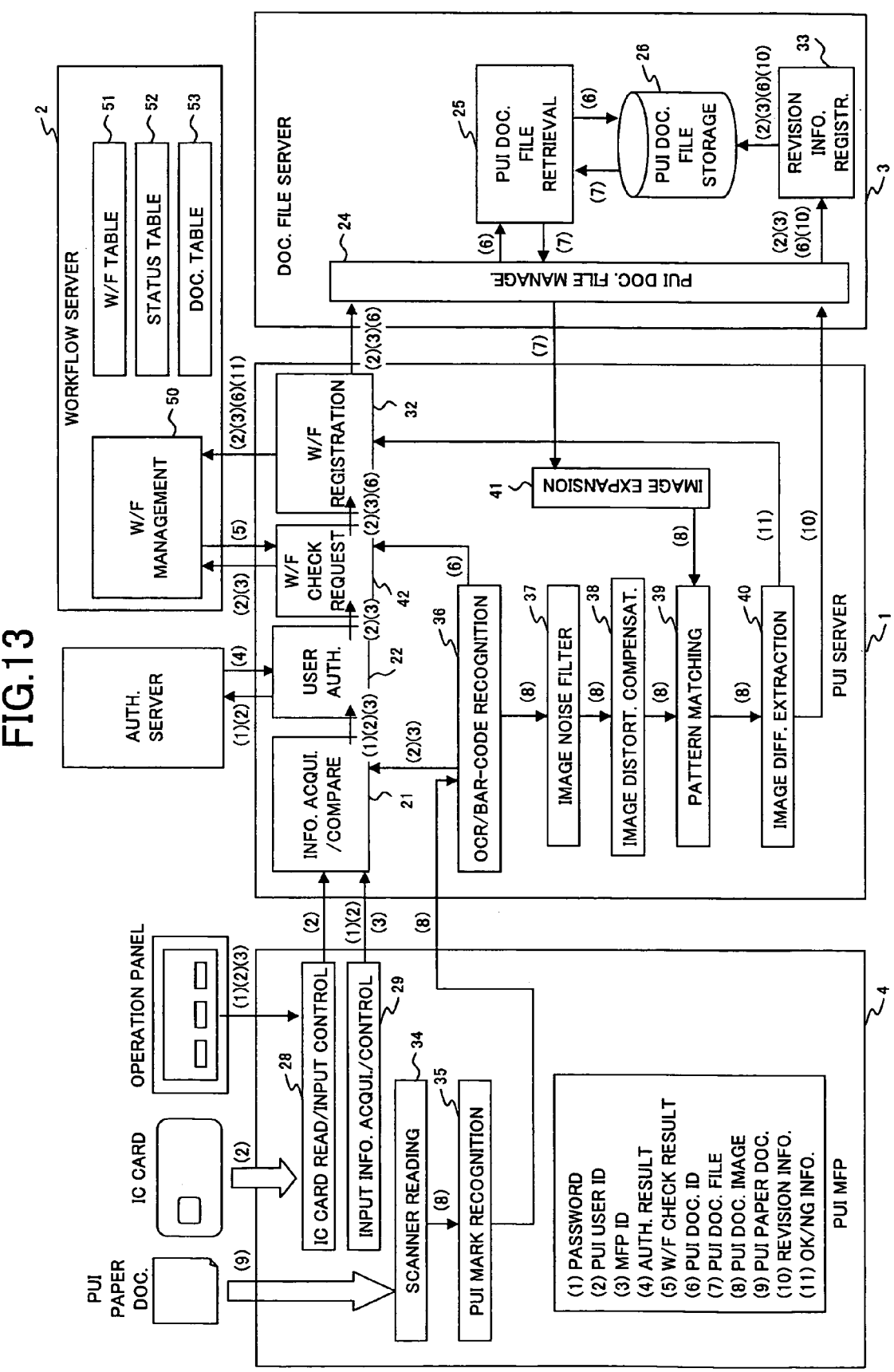
FIG. 13 is a diagram for explaining the functional composition concerning the inputting of the PUI paper document.

Moreover, FIG. 10 and FIG. 12 show the functional composition concerning the output of the PUI paper document, and FIG. 11 and FIG. 13 show the functional composition concerning the input (reading) of the PUI paper document.

FIG. 10 is a diagram for explaining the functional composition concerning the output of the PUI paper document.

As shown in FIG. 10, the PUI MFP 4 comprises the IC card reader/input-control unit 28, the input information acquisition/control unit 29, the image composition unit 30, and the printer output unit 31.

The IC card reader/input-control unit 28 is the control unit which controls reading of the IC card and/or the read information. For example, reads the PUI user ID from the integrated circuit card inputted by the user, and transmits to PUI document-management server 7.

The input acquisition/control unit 29 acquires MFP-ID as which the PUI user ID, and the password and user that are the acquisition control unit which acquires and/or controls the input inputted through the console panel, for example, are inputted through the console panel demand the output of the PUI paper document, for example, transmits to the PUI document-management server 7.

Based on the PUI user ID that is the synthetic unit which compounds the image, for example, received from the PUI document-management server 7, MFP-ID, the PUI document ID, and the PUI document file, the image composition unit 30 adds the PUI user ID, MFP-ID, and the PUI document ID to the PUI document file, and compounds the PUI paper document image.

The printer output unit 31 makes the PUI paper document image which is the printing output unit which carries out the printing output, for example, is compounded in the image composition unit 30 by making the image into the document the PUI paper document, and prints and outputs it.

Moreover, as shown in FIG. 10, the PUI document-management server 7 has information acquisition and the comparator 21, the user authentication unit 22, the document ID acquisition unit 23, the PUI document file management unit 24, the PUI document file reference unit 25, the PUI document file accumulation unit 26, the printer control unit 27, the workflow registration unit 32, and the workflow collation request unit 42.

The information acquisition/comparison unit 21 acquires the identification information (for example, the PUI user ID and/or MFP-ID) and the password from PUI MFP 4 and/or the client PC 5, or compares the acquired identification information.

The user authentication unit 22 transmits the authentication request of the user including the PUI user ID acquired by the information acquisition/comparison unit 21, to the authentication server, and receives the authentication result from the authentication server.

In addition, it is possible to make it include the password in the authentication request.

The workflow collation request unit 42 transmits the collation request of the workflow including the PUI user ID that is the request unit which requires collation of the workflow of the workflow server 2, acquired by the information acquisition/comparison unit 21, to the workflow server 2, and receives the collation result.

In addition, it is possible to make it include MFP-ID in the collation request of the workflow.

The document ID acquisition unit 23 transmits the acquisition request of the PUI document ID including the PUI user ID that is the acquisition unit which acquires the PUI document ID from the workflow server 2, which is acquired by the information acquisition/comparison unit 21, to the workflow server 2, and receives the PUI document ID.

In addition, it is possible to make it include MFP-ID in the acquisition request of the PUI document ID.

The PUI document file management unit 24 is the management unit which manages the PUI document file accumulated in the PUI document file accumulation unit 26, holds the PUI user ID received from the document ID acquisition unit 23, MFP-ID, and the PUI document ID temporarily, and gives reference/acquisition demand of the PUI document containing the PUI document ID to the PUI document file reference unit 25.

Moreover, the PUI document file management unit 24 hands the PUI document ID to the print control unit 27, and demands the print as the PUI document file received from the PUI document file reference unit 25, and the PUI user ID and MFP-ID which are held temporarily.

Based on the PUI document ID, based on the PUI document ID which is the reference unit which searches the PUI document file accumulation unit 26, for example, is contained in the reference/acquisition request from the PUI document file management unit 24, the PUI document file reference unit 25 searches the PUI document file accumulation unit 26, and provides the PUI document file management unit 24 with the corresponding PUI document file.

The PUI document file accumulation unit 26 is storage which accumulates the PUI document file.

Next, the structure of the PUI document file accumulated in the PUI document file accumulation unit 26 will be explained using FIG. 14.

The print control unit 27 transmits the PUI user ID and MFP-ID which are the control unit which controls the print request to PUI MFP 4, for example, are provided from the PUI document file management unit 24, the PUI document ID, and the PUI document file to PUI MFP 4, and requires printing of the PUI paper document.

The workflow registration unit 32 is the registration unit which registers the status concerning examination and approval into the workflow server 2, for example, registers the status, such as the print end, into the workflow server 2.

Moreover, as shown in FIG. 10, the workflow server 2 has the workflow management unit 50, the workflow table 51, the status table 52, and the document table 53.

The workflow management unit 50 is the management unit which manages the status concerning the workflow, the document, etc.

For example, the collation request of the workflow including the PUI user ID received from the PUI document-management server 7 is accepted.

It compares, transmit the collation result to the PUI document-management server 7. The PUI document ID which corresponds according to the acquisition request of the PUI document ID including the PUI user ID received from the PUI document-management server 7 is acquired, and this PUI document ID is transmitted to the PUI document-management server 7.

Here, the workflow table 51 is the table which determines of which workflow the PUI paper document is used.

Moreover, the status table 52 is the table which manages the progress state of each workflow.

Moreover, the document table 53 is the table which manages the PUI document ID set as the object of the workflow.

As mentioned above, in the case of the workflow of Type-A, the 1st examination person generates the PUI paper document for circulation.

Moreover, in the case of the workflow of Type-B, all examination person and approval persons output the PUI paper document each time.

In addition, it is possible to make the workflow server 2 notify the request of examination and approval to the user's client PC 5 by the E-mail etc. in Type-B.

In such composition, the user specifies PUI MFP 4 which outputs the PUI user ID, the password, and/or the PUI paper document using the client PC 5, outputs the PUI paper document, and needs to make it read the integrated circuit card in the PUI MFP the PUI user ID may be inputted, or the console panel of PUI MFP 4 is operated and it is possible to make it input the PUI user ID and/or the password.

In the following, an example of the functional composition concerning the input of the PUI paper document is explained using FIG. 11.

FIG. 11 is a diagram for explaining the functional composition concerning the input of the PUI paper document.

As shown in FIG. 11, the PUI MFP 4 comprises the IC card reader/input-control unit 28, the input acquisition/control unit 29, the scanner reading unit 34, the PUI mark approval unit 35, the OCR/bar-code approval unit 36, the image noise-filter unit 37, the image distorted compensation unit 38, the pattern-matching unit 39, and the image difference extraction unit 40 and the image expansion unit 41.

In addition, the IC card reader/input-control unit 28, and input acquisition/control unit 29 are the same with having explained in FIG. 10.

The scanner reading unit 34 reads the PUI paper document, and passes the PUI paper document image to the PUI mark approval unit 35.

The PUI mark approval unit 35 recognizes the PUI document ID and/or the PUI user ID as showed FIG. 7 based on position information, font information, mode information, etc. which are beforehand defined from the PUI paper document image passed from the scanner reading unit 34, MFP-ID, etc. to be PUI marks, and passes the PUI paper document image to OCR/bar-code approval unit 36.

The OCR/bar-code approval unit 36 reads the PUI mark recognized in the PUI mark approval unit 35, transmits the PUI mark which read, for example, the PUI user ID and MFP-ID, and the PUI document ID to for example, PUI document-management server 7, and passes the PUI paper document image to the image noise-filter unit 37.

The image noise-filter unit 37 passes the PUI paper document image which removed the image noise and removed the noise from the PUI paper document image to the image distorted compensation unit 38.

The image distorted compensation unit 38 rectifies distortion of the PUI paper document image, and passes the PUI paper document image to the pattern-matching unit 39.

On the other hand, the image expansion unit 41 expands in the PUI paper document image, and passes the PUI document file received for example, from the PUI document-management server 7 to the pattern-matching unit 39.

In the pattern-matching unit 39, pattern matching of the PUI paper document image which is passed from the image distorted compensation unit 38 and to which revision information is added, and the PUI paper document image handed by the PUI document-management server 7 is performed.

The image difference extraction unit 40 transmits the difference of the image which extracted and extracted the difference of the image to the PUI document-management server 7 based on the result which carried out pattern matching in the pattern-matching unit 39.

Moreover, based on the result which carried out pattern matching in the pattern-matching unit 39, the image difference extraction unit 40 extracts the propriety information concerning examination and approval of the workflow, and transmits the extracted propriety information to the PUI document-management server 7.

Moreover, as shown in FIG. 11, the PUI document-management server 7 has information acquisition and the comparator 21, the user authentication unit 22, the PUI document file management unit 24, the PUI document file reference unit 25, the PUI document file accumulation unit 26, the workflow registration unit 32, the revision information registration unit 33, and the workflow collation request unit 42.

In addition, the user authentication unit 22, the PUI document file reference unit 25, and the PUI document file accumulation unit 26 are the same with having explained in FIG. 10.

Information acquisition and the comparator 21 acquire the PUI user ID from IC card reader/input-control unit 28 of PUI MFP 4, or acquires the PUI user ID, the password, MFP-ID, etc. from input acquisition/control unit 29 of PUI MFP 4.

Moreover, information acquisition and the comparator 21 acquire the PUI user ID and/or MFP-ID which OCR/bar-code approval unit 36 read from the PUI paper document image from OCR/bar-code approval unit 36 of PUI MFP 4.

Information acquisition and the comparator 21 compare the PUI user ID acquired from the PUI user ID, and the OCR/bar-code approval unit 36 acquired from IC card reader/input-control unit 28, and compares whether you are the same PUI user ID.

Moreover, information acquisition and the comparator 21 compare MFP-ID acquired from input acquisition/control unit 29 with MFP-ID acquired from OCR/bar-code approval unit 36, and compares that it is the same MFP-ID.

The system with increased security can be provided by performing collation of the PUI user ID and MFP-ID.

The workflow collation request unit 42 transmits the collation request of the workflow including the PUI user ID that is the request unit which requires collation of the workflow of the workflow server 2 as mentioned above, for example, information acquisition and the comparator 21 acquired to the workflow server 2, and receives the collation result.

Moreover, the workflow collation request unit 42 which received the collation result indicating which is the right workflow passes the PUI document ID thought to be the PUI user ID and MFP-ID from PUI MFP 4 to the workflow registration unit 32.

The registration unit to which the workflow registration unit 32 registers the status concerning examination and approval into the workflow server 2 it is for example, the image difference if propriety information is received from the extraction unit 40, the registration request of this propriety information, the PUI user ID and MFP-ID, and the workflow containing the PUI document ID will be transmitted to the workflow server 2.

Moreover, the workflow registration unit 32 requires the acquisition of the PUI document file which passes the PUI document file management unit 24 the PUI document ID, and corresponds as the PUI user ID and MFP-ID which are passed from the workflow collation request unit 42.

The registration unit into which the revision information registration unit 33 registers revision information it is for example, the image difference of the extracted image of the extraction unit 40, the PUI document file management unit 24 registers into the PUI document file accumulation unit 26 the revision information included in the difference with the PUI user ID and MFP-ID which are held temporarily based on the PUI document ID.

Moreover, as shown in FIG. 11, the workflow server 2 has the workflow management unit 50, the workflow table 51, the status table 52, and the document table 53.

In addition, the workflow table 51, the status table 52, and the document table 53 are the same with having explained in FIG. 10.

Moreover, as shown in FIG. 10, the workflow management unit 50 is the management unit which manages the status concerning the workflow, the document, etc., for example, registers the propriety information concerning examination and approval into the status table 52 according to the registration request of the workflow which contains the PUI document ID with the propriety information from the PUI document-management server 7, and the PUI user ID and MFP-ID.

As mentioned above, after the examination person and approval person of Type-A and Type-B correct the PUI paper document, he reads the PUI paper document in PUI MFP 4, and registers by extracting revision information in PUI MFP 4 and/or PUI document-management server 7.

In addition, in Type-A, after making the PUI paper document read into PUI MFP 4, it circulates to the next examination person and approval person.

The main PUI related functions described with FIG. 10 are included in the PUI server 1, and an example of the functional composition of each device at the time of making the PUI server 1 and the document file server 3 become independent is explained using FIG. 12.

FIG. 12 is a diagram for explaining the functional composition concerning the output of the PUI paper document.

As shown in FIG. 12, the PUI server 1 has information acquisition and the comparator 21, the user authentication unit 22, the document ID acquisition unit 23, the print control unit 27, the workflow registration unit 32, and the workflow collation request unit 42.

Moreover, the document file server 3 shown in FIG. 12 has the PUI document file management unit 24, the PUI document file reference unit 25, and the PUI document file accumulation unit 26.

In addition, each function is the same with having explained in FIG. 10.

As shown in FIG. 12, it is good also as composition which included the main functions concerning PUI in the PUI server 1, and is made to become independent of the document file server 3.

Similarly, the main PUI related functions described with FIG. 11 are included in the PUI server 1, and an example of the functional composition of each device at the time of making the PUI server 1 and the document file server 3 become independent is explained using FIG. 13.

FIG. 13 is a diagram for explaining the functional composition concerning the input of the PUI paper document.

As shown in FIG. 13, PUI MFP 4 has IC card reader/input-control unit 28, input acquisition/control unit 29, the scanner reading unit 34, and the PUI mark approval unit 35.

Moreover, as shown in FIG. 13, the PUI server 1 comprises the information acquisition/comparison unit 21, the user authentication unit 22, the workflow registration unit 32, the OCR/bar-code approval unit 36, the image noise filter unit 37, the image distorted compensation unit 38, the pattern-matching unit 39, the image difference extraction unit 40, the image expansion unit 41, and the workflow collation request unit 42.

Moreover, as shown in FIG. 13, the document file server 3 has the PUI document file management unit 24, the PUI document file reference unit 25, the PUI document file accumulation unit 26, and the revision information registration unit 33.

In addition, each function is the same with having explained in FIG. 11.

As shown in FIG. 13, it is good also as composition which included the main functions concerning PUI in the PUI server 1, and is made to become independent of the document file server 3.

Next, an example of the structure of the PUI document file is explained using FIG. 14.

FIG. 14 is a diagram for explaining an example of the structure of the PUI document file.

As shown in FIG. 14, the PUI document file comprises document property and the original image, and whenever revision information is added, revision property and the revision image are added.

In addition, the document ID (PUI document ID), the title, the implementer (PUI user ID), the creation date, and the right to access of this PUI document file are contained in document property.

Moreover, the document ID of the document for revision (PUI document ID), the revision ID, the revision ID of parents and the revision person (PUI user ID), and the revision date are contained in revision property.

For example, in the workflow, the first examination person's revision data are contained in the 1st revision image shown in FIG. 14, and the second examination person's revision data are contained in the 2nd revision image.

Moreover, in the meeting explained in the embodiment mentioned later, the meeting attendant's A revision data are contained in the 1st revision image shown in FIG. 14, and the revision data of the meeting attendant B who has attended the same meeting as the meeting attendant A are contained in the 2nd revision image.

In addition, as shown in FIG. 14, the PUI document file may be accumulated in the form of the compound statement document at the PUI document file accumulation unit 26, and may be accumulated and/or managed in the table of the database.

In the following, an example which accumulates and/or manages the PUI document file and/or revision information in the table is explained using FIG. 15A to FIG. 16B.

FIG. 15A and FIG. 15B are diagrams for explaining an example of the table concerning the PUI document file.

As shown in FIG. 15A, the PUI document property table includes the document ID, the title, the creation date, the implementer, the right to access, and the file name as an item.

The PUI document ID which identifies the PUI document file which corrected is stored in the document ID.

In addition, it is possible to make it store the document ID corresponding to the PUI document ID.

The title of the PUI document file concerned is stored in the title.

The creation date which created the PUI document file concerned is stored on the creation date.

The PUI user ID of the user who has created the PUI document file concerned is stored as the identification of the user.

In addition, in FIG. 15A, the user name is stored as it is for simplification of explanation.

The right to access to the PUI document file concerned is stored in the right to access.

The file name of the PUI document file concerned is stored in the file name.

Moreover, as shown in FIG. 15B, the PUI document original image table includes the document ID, the page number, and the file name as an item.

The PUI document ID which identifies the PUI document file concerned is stored in the document ID, for example.

In addition, it is possible to make it store the document ID corresponding to the PUI document ID.

The page number of the PUI document file concerned is stored in the page number.

The file name of the PUI document file concerned made to correspond to the page number is stored in the file name.

Figures 16A, 16B:
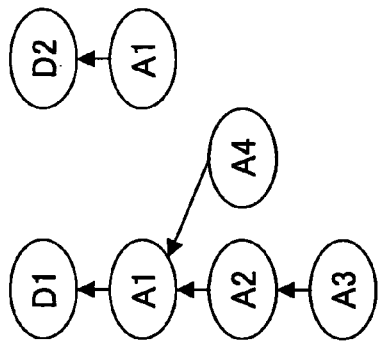
FIG. 16A and FIG. 16B are diagrams for explaining examples of the tables concerning the revision information.

FIG. 16A and FIG. 16B are diagrams for explaining an example of the table concerning revision information.

As shown in FIG. 16A, the PUI revision property table contains the document ID, the revision ID, the parent revision ID and the revision date, and the revision person as an item.

The PUI document ID which identifies the PUI document file concerned is stored in the document ID, for example.

In addition, it is possible to make it store the document ID corresponding to the PUI document ID.

The identifier which identifies revision information is stored in the revision ID.

The identification information which identifies parents' revision information is stored in the parent revision ID. The date which corrected is stored on the revision date. The PUI user ID of the revision person who has corrected the document is stored as the identification of the revision person.

In addition, in FIG. 16A, the revision person's name is stored as it is for simplification of explanation.

Moreover, as shown in FIG. 16B, the PUI revision image table includes the document ID, the revision ID and the page number, and the file name as an item.

The PUI document ID which identifies the PUI document file concerned is stored in the document ID, for example.

In addition, it is possible to make it store the document ID corresponding to the PUI document ID.

The identifier which identifies revision information is stored in the revision ID.

The page number of the PUI document file concerned is stored in the page number.

The file name of the PUI document file concerned made to correspond to the page number is stored in the file name.

As shown in FIG. 15A-FIG. 16B, the revision information over the original and/or this original of the PUI document file can also be accumulated and/or managed in the table of the database.

Next, an example of the output of the PUI paper document is explained using FIG. 17.

FIG. 17 is a sequence diagram for explaining the procedure of the output of the PUI paper document.

In addition, in FIG. 17, each device explains as what carries out functional composition as shown in FIG. 12.

In addition, this does not limit operation of the present invention.

The workflow management unit 50 of introduction and the workflow server 2 transmits to the client PC 5 of the examination person A who processes the workflow which corresponds mail concerning the request of examination with reference to status table 52 (step S1 of FIG. 17).

The client PC 5 of the examination person A provides, when receiving the mail which associates to the request of examination from the workflow server 2, the display indicating that the mail which associates to the request of examination is received.

If mail concerning the request of examination is checked, the examination person A will input MFP-ID which identifies PUI MFP which outputs the PUI user ID, the password, and the PUI paper document, for example, and will demand the output of the PUI paper document concerning examination which self performs.

The client PC 5 which received the request from the examination person A transmits the output request of the PUI paper document containing for example, the PUI user ID, the password, and MFP-ID to the PUI server 1 (step S2 of FIG. 17).

The information acquisition/comparison unit 21 of the PUI server 1 which received the request pass for example, the PUI user ID and the password to the user authentication unit 22.

The user authentication unit 22 transmits the authentication request containing the PUI user ID and the password to the authentication server (step S3 of FIG. 17).

Based on the password and the PUI user ID contained in the authentication request which received, the authentication server attests and transmits the authentication result to the PUI server 1 (step S4 of FIG. 17).

The user authentication unit 22 of the PUI server 1 which received the authentication result indicating that authentication is successful from the authentication server passes the PUI user ID and MFP-ID to the workflow collation request unit 42, and requires collation of the workflow.

The workflow collation request unit 42 transmits the collation request of the workflow which contains the PUI user ID and MFP-ID based on the request from the user authentication unit 22 to the workflow server 2 (step S5 of FIG. 17).

From the PUI server 1, with reference to the workflow table 51, the workflow management unit 50 of the workflow server 2 which received the collation request of the workflow compares the workflow, and transmits the collation result of the workflow to the PUI server 1 (step S6 of FIG. 17).

The workflow collation request unit 42 of the PUI server 1 which received the collation result indicating which is the right workflow passes the PUI user ID and MFP-ID to the document ID acquisition unit 23, and requires the acquisition of the PUI document ID.

The document ID acquisition unit 23 which received this request transmits the acquisition request of the PUI document ID concerning this workflow containing the PUI user ID and MFP-ID to the workflow server 2 (step S7 of FIG. 17).

The workflow management unit 50 of the workflow server 2 which received the acquisition request of the PUI document ID acquires the PUI document ID which corresponds with reference to document table 53 based on the PUI user ID and/or MFP-ID which are contained in the acquisition request of the PUI document ID, and transmits to the PUI server 1 (step S8 of FIG. 17).

The document ID acquisition unit 23 of the PUI server 1 which acquired the PUI document ID from the workflow server 2 transmits the acquisition request of the corresponding PUI document file containing this PUI document ID, and the PUI user ID and MFP-ID to the document file server 3 (step S9 of FIG. 17).

The PUI document file management unit 24 of the document file server 3 which received the acquisition request of the corresponding PUI document file containing the PUI document ID, and the PUI user ID and MFP-ID holds the PUI document ID temporarily, hands the PUI document ID to the PUI document file reference unit 25, and demands reference of the PUI document file as the PUI user ID and MFP-ID.

The PUI document file management unit 24 will transmit this PUI document file, the PUI user ID and MFP-ID which are held temporarily, and the PUI document ID to the PUI server 1, if the PUI document file corresponding to the PUI document ID is acquired from the PUI document file reference unit 25 (step S10 of FIG. 17).

The print control unit 27 of the PUI server 1 which received the PUI document ID, and the PUI user ID and MFP-ID from the document file server 3 transmits the request of the printing output of the PUI paper document containing the PUI document ID, and the PUI user ID and MFP-ID to PUI MFP 4 corresponding to MFP-ID (step S11 of FIG. 17).

The image composition unit 30 of PUI MFP 4 which received the request compounds the PUI paper document image which added the PUI user ID, MFP-ID, and the PUI document ID to the PUI document file based on the PUI user ID received from the PUI server 1, MFP-ID, the PUI document ID, and the PUI document file.

The printer output unit 31 of PUI MFP 4 makes the PUI paper document image compounded in the image composition unit 30 the PUI paper document, and carries out the printing output.

On the other hand, the PUI server's 1 workflow registration unit 32 will transmit the registration request of the PUI user ID, MFP-ID, and the status (for example, the print end) containing the PUI document ID to the workflow server 2, if the information indicating which the printing output of the PUI paper document completed is acquired from PUI MFP 4 (step S12 of FIG. 17).

The PUI user ID and MFP-ID which are contained in the registration request of the status which the workflow server's 2 workflow management unit 50 received from the PUI server 1, and the PUI document ID being based the status table 52 for example, the status indicating which the print output of the corresponding PUI document file completed is registered.

By performing processing as shown in FIG. 17, the examination person received the notice of examination can do the printing output in PUI MFP 4 which specified the corresponding PUI paper document concerning examination which the self concerned performs from the workflow server 2.

Figure 18:
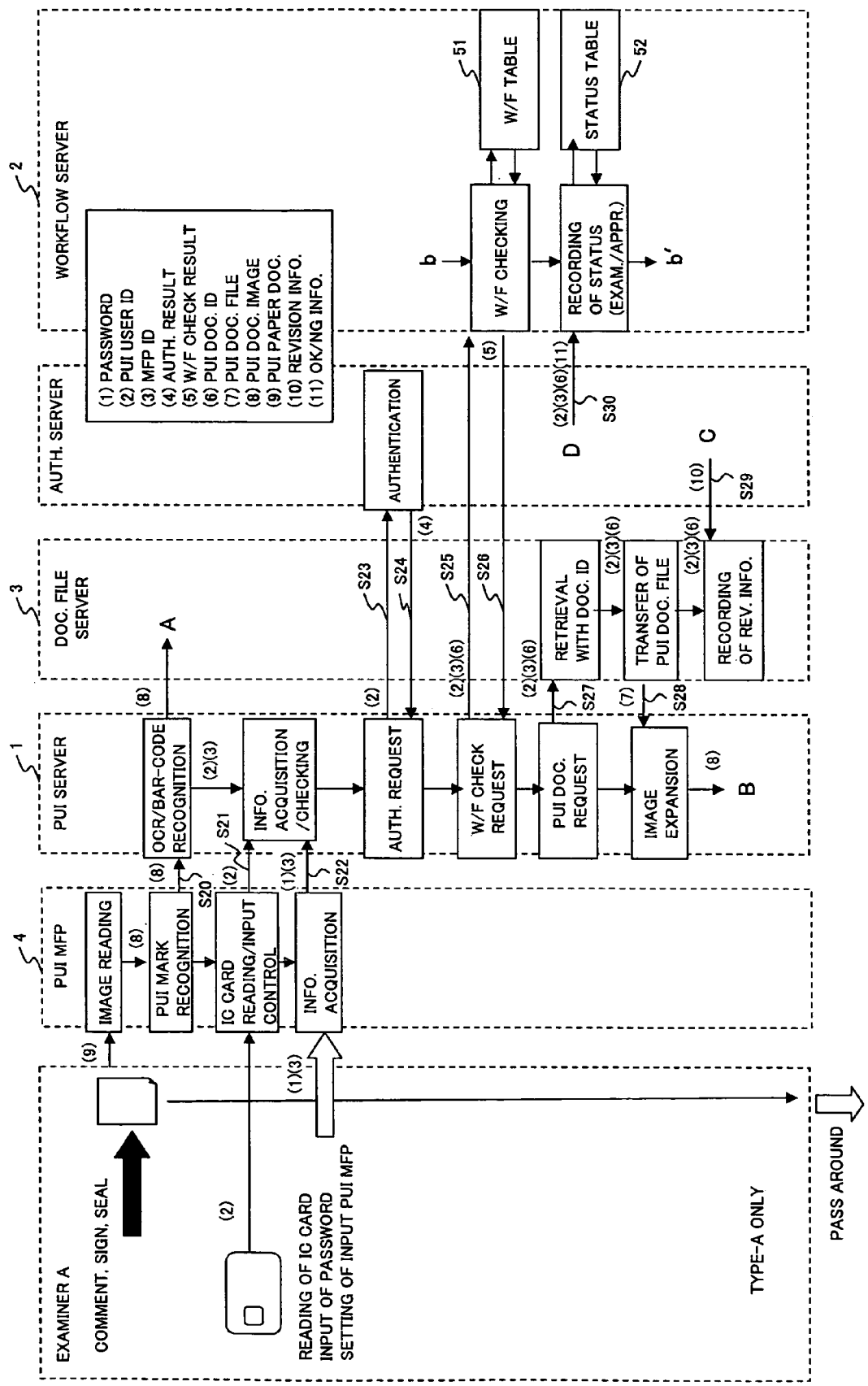
FIG. 18 is a sequence diagram for explaining the procedure of the reading of the PUI paper document.
Figure 19:
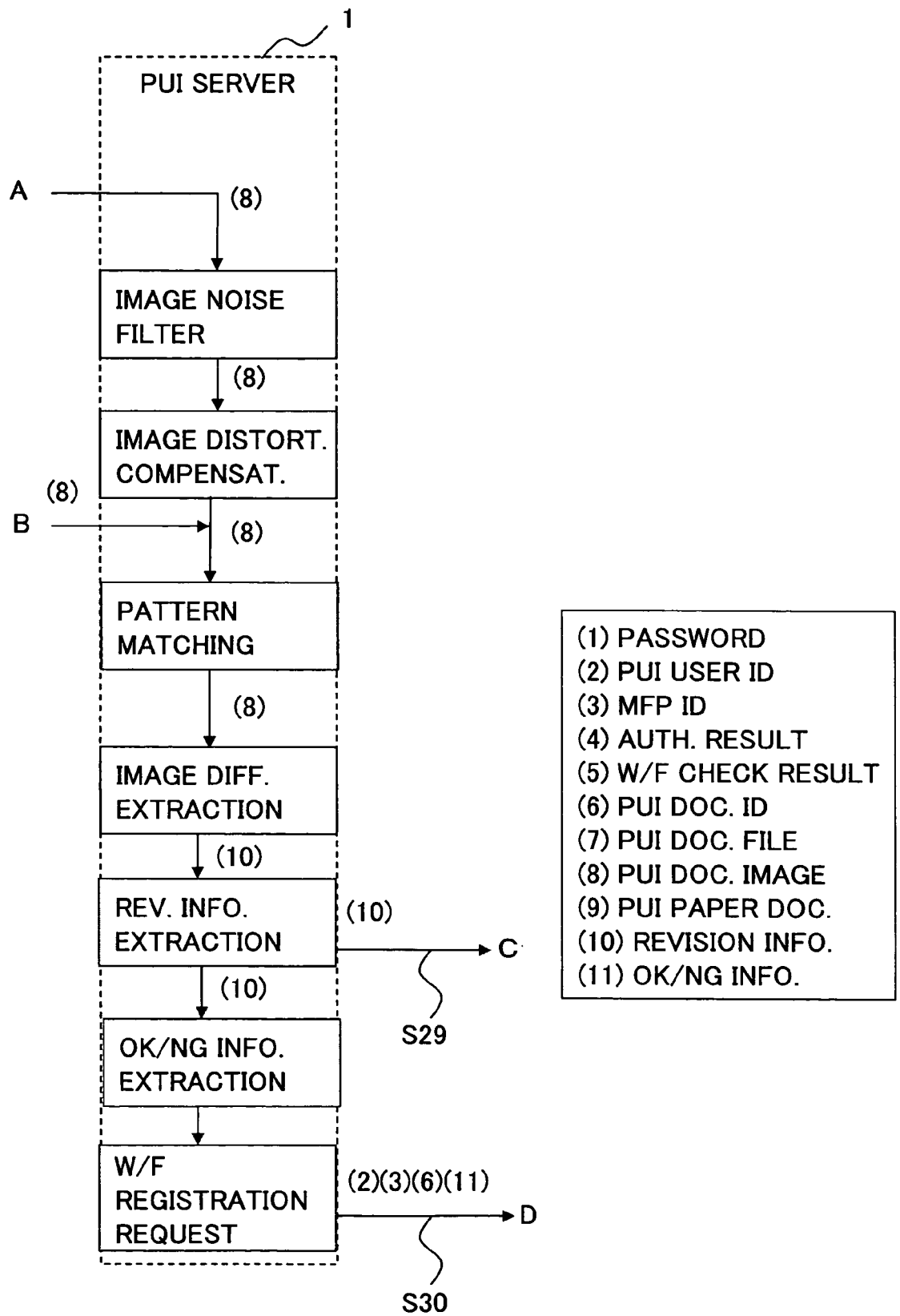
FIG. 19 is a sequence diagram for explaining the procedure of the reading of the PUI paper document.

Next, an example of reading of the PUI paper document is explained using FIG. 18 and FIG. 19.

FIG. 18 is a sequence diagram for explaining the procedure of the reading of the PUI paper document.

Moreover, FIG. 19 is a sequence diagram for explaining the procedure of the reading of the PUI paper document.

In addition, in FIG. 18 and FIG. 19, each device explains as what carries out functional composition as shown in FIG. 13. In addition, this does not limit operation of the present invention.

The examination person A who has corrected the introduction comment, the sign, the sealing, etc. makes the PUI paper document read into PUI MFP 4.

In this PUI MFP 4, the scanner reading unit 34 reads the PUI paper document, and passes the PUI paper document image to the PUI mark approval unit 35.

From the PUI paper document image provided from the scanner reading unit 34, the PUI mark approval unit 35 recognizes the PUI document ID and/or the PUI user ID as showed FIG. 7 based on position information, font information, mode information, etc. which are defined beforehand, MFP-ID, etc. to be PUI marks, and transmits the approval information and the PUI paper document image concerning approval of the PUI mark to the PUI server 1 (step S20 of FIG. 18).

The PUI server's 1 OCR/bar-code approval unit 36 read the PUI user ID, MFP-ID, and the PUI document ID from the PUI paper document image based on the approval information on the PUI mark and the PUI paper document image which are received.

Moreover, OCR/bar-code approval unit 36 passes the PUI user ID and MFP-ID which are read to information acquisition and the comparator 21, as shown in FIG. 13.

Moreover, OCR/bar-code approval unit 36 passes the read PUI document ID to the workflow collation request unit 42.

Moreover, OCR/bar-code approval unit 36 passes the PUI paper document image to the image noise-filter unit 37 (A of FIG. 18 and FIG. 19).

On the other hand, the examination person A inputs MFP-ID which identifies PUI MFP 4 into which the PUI user ID, the password, and the PUI paper document are made to read by making the integrated circuit card read into PUI MFP 4, or operating the console panel of PUI MFP 4.

The IC card reader/input-control unit 28 of PUI MFP 4 will transmit this PUI user ID to the PUI server 1, if the PUI user ID is acquired (step S21 of FIG. 18).

Moreover, input acquisition/control unit 29 of PUI MFP 4 will transmit this password and MFP-ID to the PUI server 1, if the password, MFP-ID, etc. which are inputted through the console panel are acquired (step S22 of FIG. 18).

The password, and the PUI user ID and MFP-ID/information acquisition and comparator 21 of the PUI server 1 which received from PUI MFP 4] in the step S21 and the step S22.

For example, by comparing the PUI user ID added to the PUI paper document image passed from OCR/bar-code approval unit 36 with the PUI user ID received in the step S21, and checking whether it is the same PUI user ID. The PUI user ID is compared.

Moreover, the PUI server's 1 information acquisition and comparator 21 compare MFP-ID by comparing MFP-ID which received in the step S22 with MFP-ID added to the PUI paper document image passed from OCR/bar-code approval unit 36, and checking whether it is the same MFP-ID.

If it determines with both being the same as a result of collation, the PUI server's 1 information acquisition and comparator 21 will pass the acquired password, and the PUI user ID and MFP-ID to the PUI server's 1 user authentication unit 22.

The PUI server's 1 user authentication unit 22 transmits the authentication request including the password and the PUI user ID to the authentication server (step S23 of FIG. 18).

Based on the password and the PUI user ID contained in the authentication request which received, the authentication server attests and transmits the authentication result to the PUI server 1 (step S24 of FIG. 18).

The user authentication unit 22 of the PUI server 1 which received the authentication result indicating that authentication is successful from the authentication server passes the PUI user ID and MFP-ID to the workflow collation request unit 42, and requires collation of the workflow.

The PUI server's 1 workflow collation request unit 42 transmits the collation request of the workflow which contains the PUI user ID, MFP-ID, and the PUI document ID based on the request from the user authentication unit 22 to the workflow server 2 (step S25 of FIG. 18).

From the PUI server 1, with reference to the workflow table 51, the workflow management unit 50 of the workflow server 2 which received the collation request of the workflow compares the workflow, and transmits the collation result of the workflow to the PUI server 1 (step S26 of FIG. 18).

The workflow collation request unit 42 of the PUI server 1 which received the collation result indicating which is the right workflow passes the PUI document ID to the workflow registration unit 32, and requires the acquisition of the PUI document file as the PUI user ID and MFP-ID.

The workflow registration unit 32 of the PUI server 1 which received this request transmits the PUI user ID, MFP-ID, and the acquisition request of the corresponding PUI document file which contains the PUI document ID with the PUI user ID and MFP-ID while copying the PUI document ID and holding temporarily to the document file server 3 (step S27 of FIG. 18).

The PUI document file management unit 24 of the document file server 3 which received the acquisition request of the corresponding PUI document file containing the PUI document ID, and the PUI user ID and MFP-ID holds the PUI document ID temporarily, hands the PUI document ID to the PUI document file reference unit 25, and demands reference of the corresponding PUI document file as the PUI user ID and MFP-ID.

The PUI document file management unit 24 will transmit this PUI document file to the PUI server 1, if the PUI document file corresponding to the PUI document ID is acquired from the PUI document file reference unit 25 (step S28 of FIG. 18).

The PUI server's 1 image expansion unit 41 expands the received PUI document file in the PUI paper document image, and passes this PUI paper document image to the PUI server's 1 pattern-matching unit 39 (B of FIG. 18 and FIG. 19).

In addition, when for example, the original image and the former examination/approval person exist in this PUI paper document image, the former examination/approval person's revision information is included.

Here, the image noise-filter unit 37 of the PUI server 1 to which the PUI paper document image is passed from OCR/bar-code approval unit 36 as shown in FIG. 19 passes the PUI paper document image which removed the image noise from the PUI paper document image, and removed the noise to the image distorted compensation unit 38.

The PUI server's 1 image distorted compensation unit 38 rectifies distortion of the PUI paper document image, and passes the PUI paper document image to the pattern-matching unit 39.

The PUI server's 1 pattern-matching unit 39 performs pattern matching of the PUI paper document image which is passed from the image distorted compensation unit 38 and to which revision information is added, and the PUI paper document image received from the document file server 3.

The image difference extraction unit 40 of the PUI server 1 extracts the difference of the image based on the result which carried out pattern matching in the pattern-matching unit 39.

Moreover, from the difference of the image extracted by the image difference extraction unit 40 of the PUI server 1, the revision information which the user corrected is extracted, and it is transmitted to the document file server 3 (C of FIG. 18 and FIG. 19) (step S29).

Moreover, the PUI server's 1 image the difference the image which the extraction unit 40 extracted the user as showed from the difference FIG. 8 and/or FIG. 9 extracts the propriety information concerning examination and approval which signed and/or sealed.

The image difference extraction unit 40 of the PUI server 1 passes the extracted propriety information to the PUI server's 1 workflow registration unit 32.

The PUI user ID and MFP-ID in which the workflow registration unit 32 carried out the copy, and the PUI document ID and the image difference registration request of the propriety information on examination and approval including the propriety information passed from the extraction unit 40 is transmitted to the workflow server 2 (D of FIG. 18 and FIG. 19) (step S30).

The PUI user ID and MFP-ID which are contained in the registration request of the workflow which the workflow management unit 50 of the workflow server 2 which received the registration request of the propriety information on examination and approval received from the PUI server 1 as shown in D (step S30) of FIG. 18, and the PUI document ID being based the status table 52 for example, the status indicating that examination of the corresponding PUI document file is O.K. is registered.

On the other hand, as shown in C (step S29) of FIG. 18, the PUI document file management unit 24 of the document file server 3 hands the PUI document ID to the revision information registration unit 33, and demands registration of revision information as the received revision information, and the PUI user ID and MFP-ID which are held temporarily.

The revision information registration unit 33 which received this request registers revision information, and the PUI user ID and MFP-ID into the PUI document file accumulation unit 26 based on the PUI document ID.

By performing processing as shown in FIG. 18 and FIG. 19, the examination person and/or the approval person who has performed examination and/or approval can associate revision information with their own PUI user ID, and they can manage the original image of the PUI document file with the association.

Figure 20:
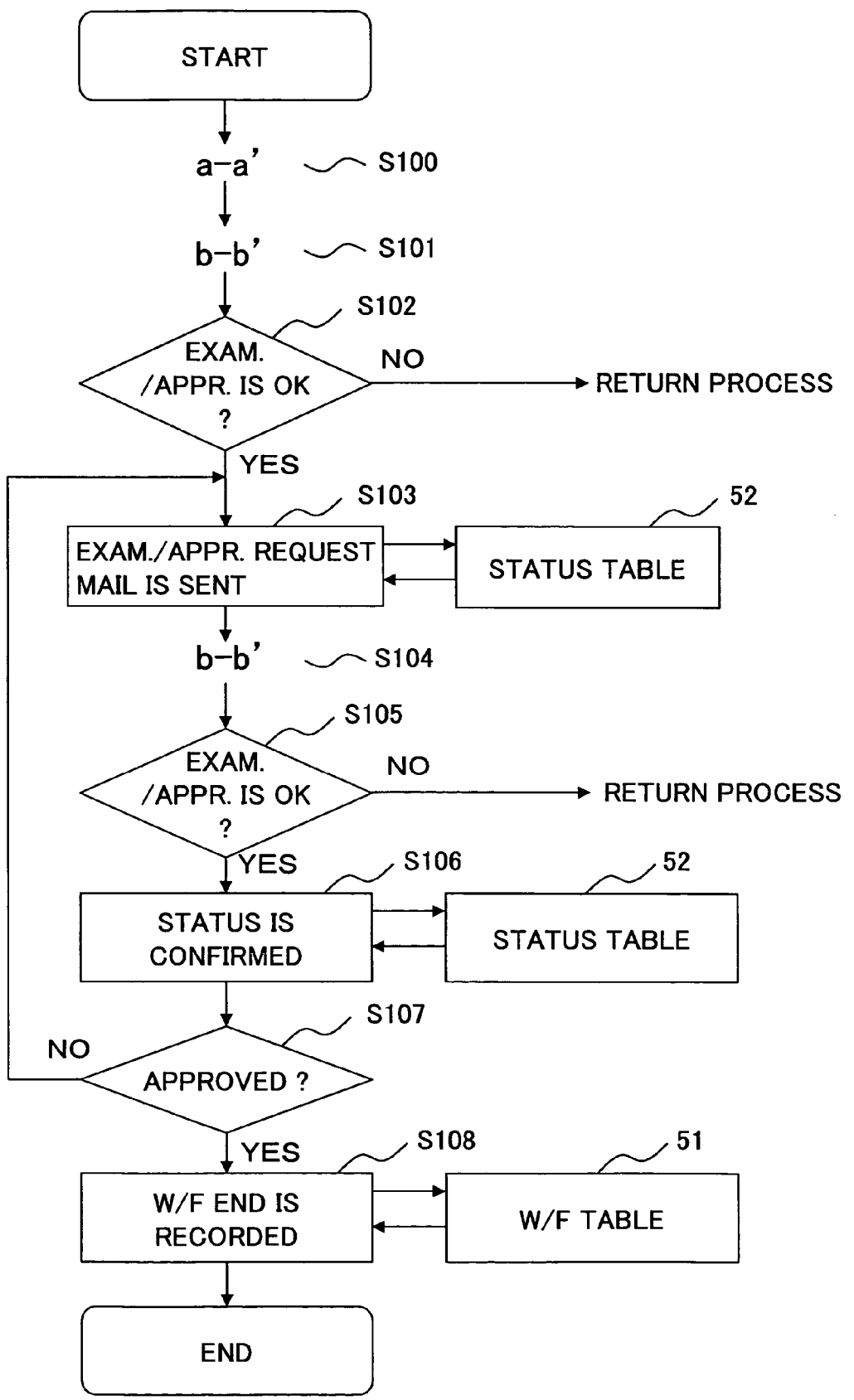
FIG. 20 is a flowchart for explaining the procedure of the processing of the workflow server in the case of Type-A.
Figure 21:
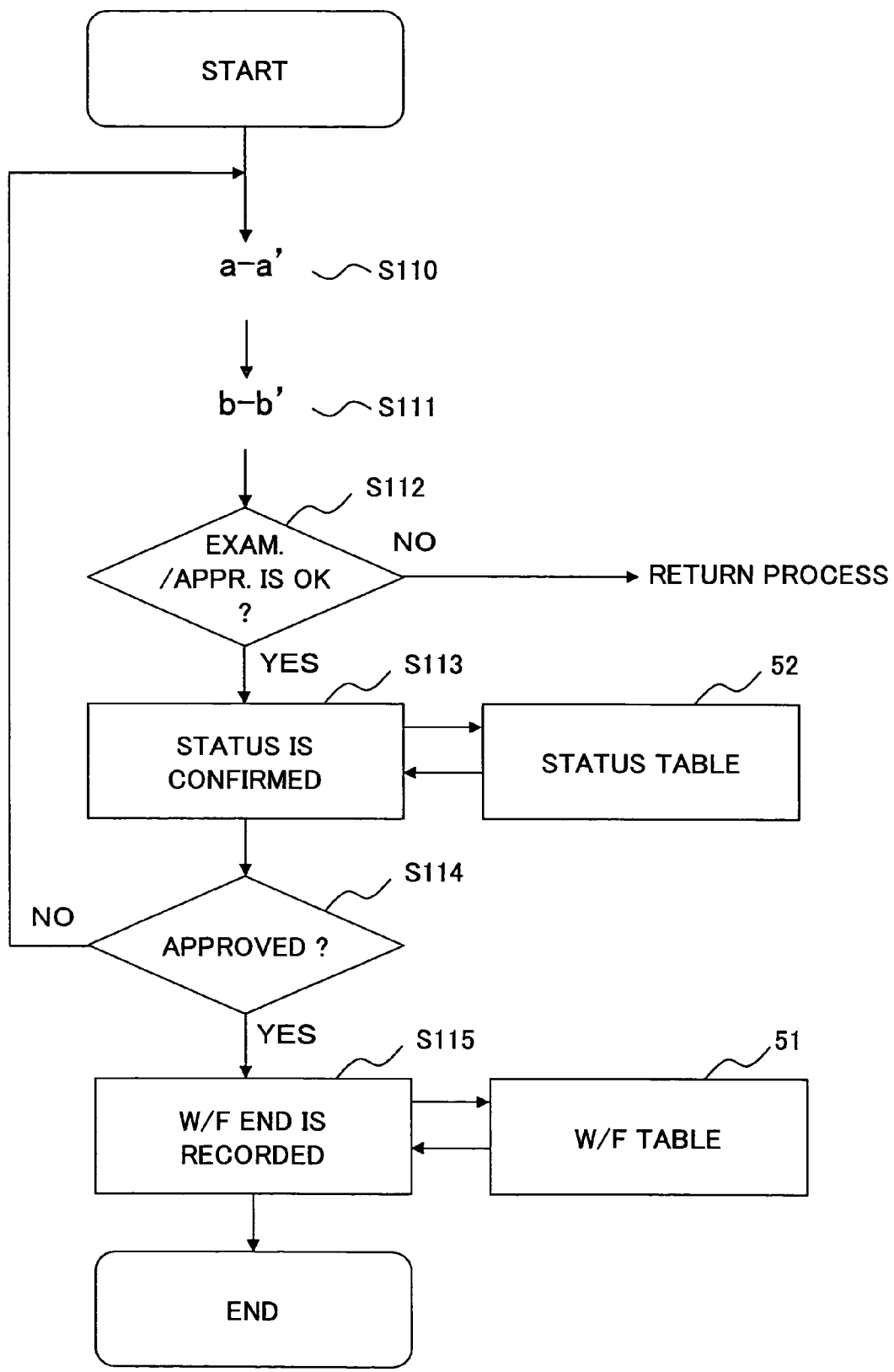
FIG. 21 is a flowchart for explaining the procedure of the processing of the workflow server in the case of Type-B.

Next, an example of the processing in the workflow server 2 is explained using FIG. 20 and FIG. 21.

FIG. 20 is a flowchart for explaining an example of processing of the workflow server in Type-A.

In step S100, the workflow management unit 50 performs processing from a to a' shown in FIG. 17.

Progressing to step S101 following step S100, the workflow management unit 50 performs processing from b to b' shown in FIG. 18.

Progressing to step S102 following step S101, the workflow management unit 50 determines whether examination and/or approval are approved and whether it is rejected based on the propriety information included in the registration request of propriety information which received from the PUI server 1.

If it is determined that the result of examination and/or approval is approval (the result at step S102 is YES), it will progress to step S103. If it is determined that the result of examination and/or approval is rejection (the result at step S102 is NO), sending-back processing will be performed.

At step S103, the workflow management unit 50 transmits examination and/or request mail of approval to the next examination and/or the next approval person with reference to the status table 52.

Progressing to step S104 following step S103, the workflow management unit 50 performs processing from b to b' shown in FIG. 18.

Progressing to step S105 following step S104, the workflow management unit 50 determines whether examination and/or approval are approved and whether it is rejected based on the propriety information included in the registration request of propriety information which received from the PUI server 1.

If it is determined that the result of examination and/or approval is approval (the result at step S105 is YES), it will progress to step S106. If it is determined that the result of examination and/or approval is rejection (the result at step S105 is NO), sending-back processing will be performed.

At step S106, the workflow management unit 50 checks the status of the workflow with reference to the status table 52.

Progressing to step S107 following step S106, the workflow management unit 50 determines whether final approval already ends based on the status checked with reference to the status table 52 in step S106.

If it determines with final approval already ending (the result at step S107 is YES), it will progress to step S108, and if it determines with final approval not being settled yet (the result at step S107 is NO), the processing from step S103 will be repeated.

At step S108, the workflow management unit 50 registers the indication that the workflow corresponding to workflow table 51 is completed.

When the workflow server 2 performs processing as shown in FIG. 20, the user can circulate the PUI paper document, as shown in FIG. 1, and can perform examination and approval.

FIG. 21 is the flowchart for explaining an example of processing of the workflow server in Type-B.

In step S110, the workflow management unit 50 performs processing from a to a' shown in FIG. 17.

Progressing to step S111 following step S110, the workflow management unit 50 performs processing from b to b' shown in FIG. 18.

Progressing to step S112 following step S111, the workflow management unit 50 determines whether examination and/or approval are approved and whether it is rejected based on the propriety information included in the registration request of propriety information which received from the PUI server 1.

If it determines with examination and/or approval being approved (the result at step S112 is YES), it will progress to step S113, and if it determines with examination and/or approval being rejected (the result at step S112 is NO), sending-back processing will be performed.

At step S113, the workflow management unit 50 checks the status of the workflow with reference to status table 52.

Progressing to step S114 following step S113, the workflow management unit 50 determines whether final approval already ends based on the status checked with reference to the status table 52 in step S113.

If it determines with final approval already ending (the result at step S114 is YES), it will progress to step S115, and if it determines with final approval not being settled yet (the result at step S114 is NO), the processing from step S110 will be repeated.

At step S115, the workflow management unit 50 registers the indication that the workflow corresponding to workflow table 51 is completed.

In order to carry out the printing output of the PUI paper document from PUI MFP 4 to which the user is connected through the network rather than circulated the PUI paper document as shown in FIG. 2 when the workflow server 2 performs processing as shown in FIG. 21, and to perform examination, approval, etc., in spite of being the workflow by the paper document, there are few losses of circulation time and they can realize the workflow crossed to the remote place.

Next, a description will be given of an example of the PUI-electronic meeting system of the invention using FIG. 22.

Figure 22:
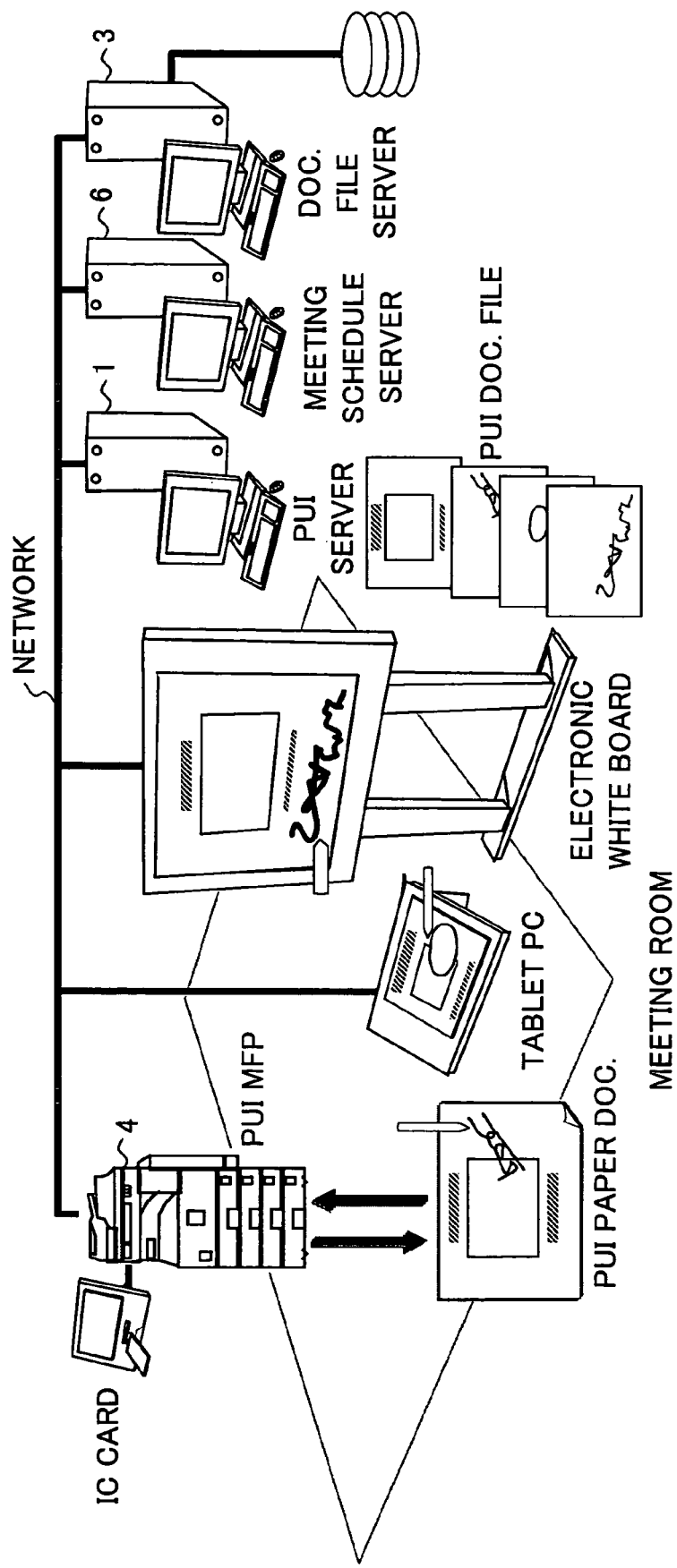
FIG. 22 is a diagram showing the concept of the procedure of meeting scheduling performed by an embodiment of the PUI electronic meeting system of the invention.

FIG. 22 is a conceptual view of the PUI-electronic meeting system in which the document management apparatus of the present invention is embodied.

As shown in FIG. 22, the PUI-electronic meeting system comprises the PUI server 1 connected through the network, the document file server 3, the PUI MFP 4, at least one tablet PC, the electronic whiteboard, and the meeting schedule server 6.

In addition, the tablet PC and the electronic whiteboard do not necessarily need to be contained in the system.

In the system shown in FIG. 22, the printing output is done in advance by each meeting attendant, and it is carried into the conference room, or the printing output of the PUI paper document to which each meeting attendant's PUI document ID etc. is added is done by each meeting attendant in PUI MFP 4 in the conference room.

The meeting attendant makes the PUI paper document to which he corrected PUI MFP 4 currently installed in the conference room read, after describing the comment etc. on the PUI paper document during the meeting and completing the meeting.

As for the image information on the PUI paper document read by PUI MFP 4, new revision information, such as the comment, is separated in PUI MFP 4 or the PUI server 1.

Here, PUI MFP 4 or the PUI server 1 separates new revision information by extracting the difference of the image information on the PUI paper document read by PUI MFP 4, and the original electronic document.

With the PUI user ID that identifies the user who has corrected the document, and the PUI document ID, the separated revision information is associated with the original electronic document, and is managed in document file server 3 as a PUI document file.

In addition, the comment written in the electronic whiteboard etc. is associated with the original electronic document, for example, the information which other meeting attendants corrected using the tablet PC with the revision information to which the meeting attendant corrected the PUI paper document, and the sponsor of the meeting may be made to manage in the document file server 3 in the electronic meeting system shown in FIG. 22.

In addition, since the revision information in Tablet PC and the electronic whiteboard is usually the vector image, it may be changed into bitmap in PUI server 1, and may be managed in document file server 3 in accordance with the same format as the PUI document file.

In the above-described system shown in FIG. 22, the original electronic document can be associated with the PUI user ID and the revision information, and the original electronic document can be managed with the association.

Only the comment which is followed, for example, a certain meeting attendant corrected can be extracted for every meeting, or the comment of all the meeting attendants that attended a certain meeting can be extracted.

In addition, the PUI server 1, the meeting schedule server 6, the document file server 3, and PUI MFP 4 may be the different devices, respectively, and may be mounted in the device with the same all.

Moreover, for example, other servers etc. are good also as a separate device within the device only with same document file server 3 and PUI server 1. It is the same as that of the following one.

Moreover, although not illustrated to FIG. 1, the authentication server etc. is connected to the PUI-electronic meeting system, and it is possible to make it use for the user's authentication etc.

In addition, the PUI server's 1 hardware composition is the same as that of the embodiment of FIG. 4.

Moreover, it is the same as that of the hardware composition of the PUI server 1 which also showed the meeting schedule server 6 and the document file server 3 to FIG. 4 of the embodiment.

Moreover, the function and hardware composition of PUI MFP 4 are also the same as that of what is explained in FIG. 5 and FIG. 6 of the embodiment.

Moreover, it is the same with the explanation in FIG. 7 of the embodiment also of the PUI mark.

Next, the functional composition of the system shown in FIG. 22 will be explained using FIG. 23 through FIG. 26.

Figure 23:
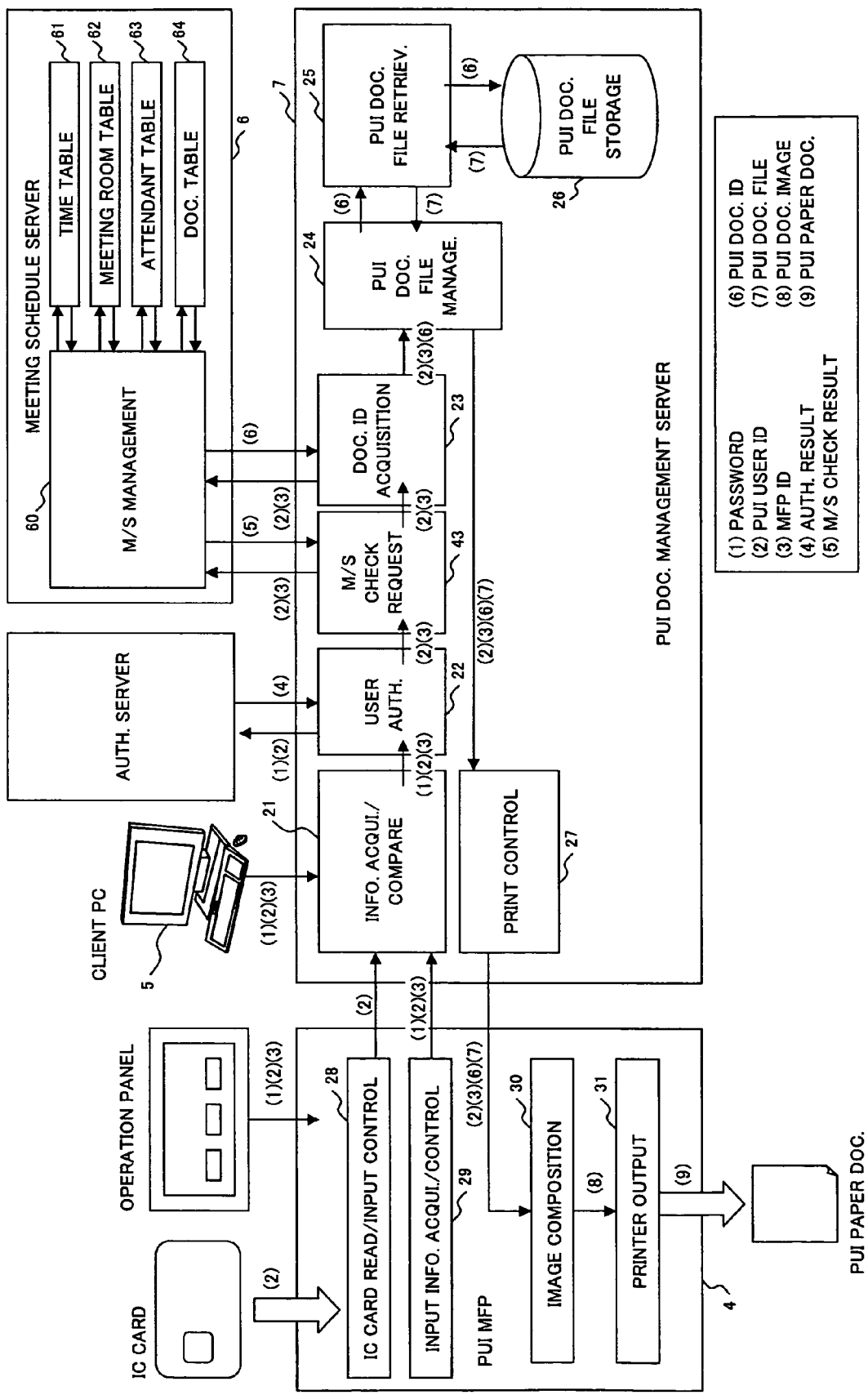
FIG. 23 is a diagram for explaining the functional composition concerning the outputting of the PUI paper document.
Figure 25:
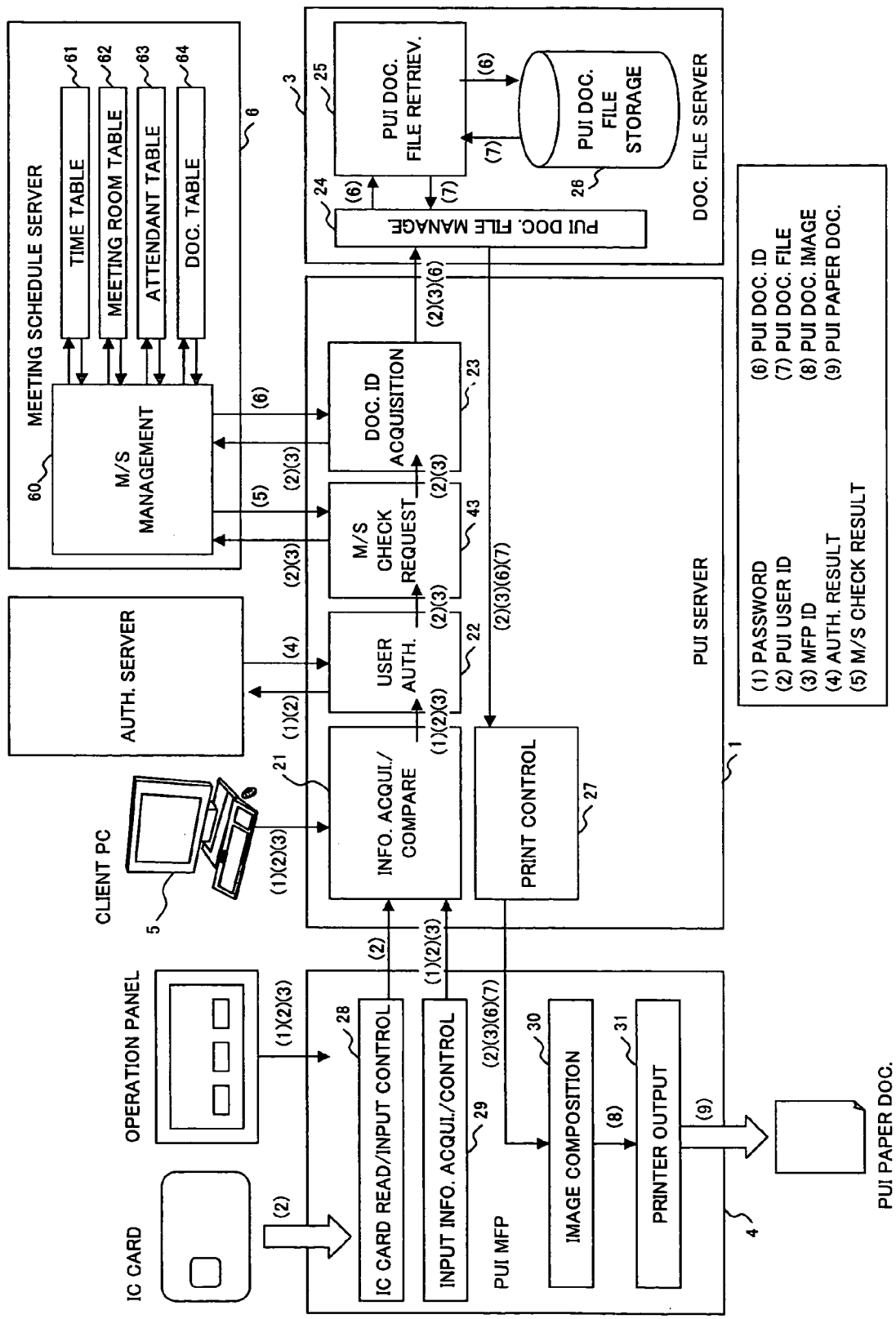
FIG. 25 is a diagram for explaining the functional composition concerning the outputting of the PUI paper document.

In addition, FIG. 23 and FIG. 25 show an example which included the main functions concerning PUI in PUI MFP 4, and included the remaining function in the PUI document-management server 7 which combined the PUI server 1 and the document file server 3.

Figure 24:
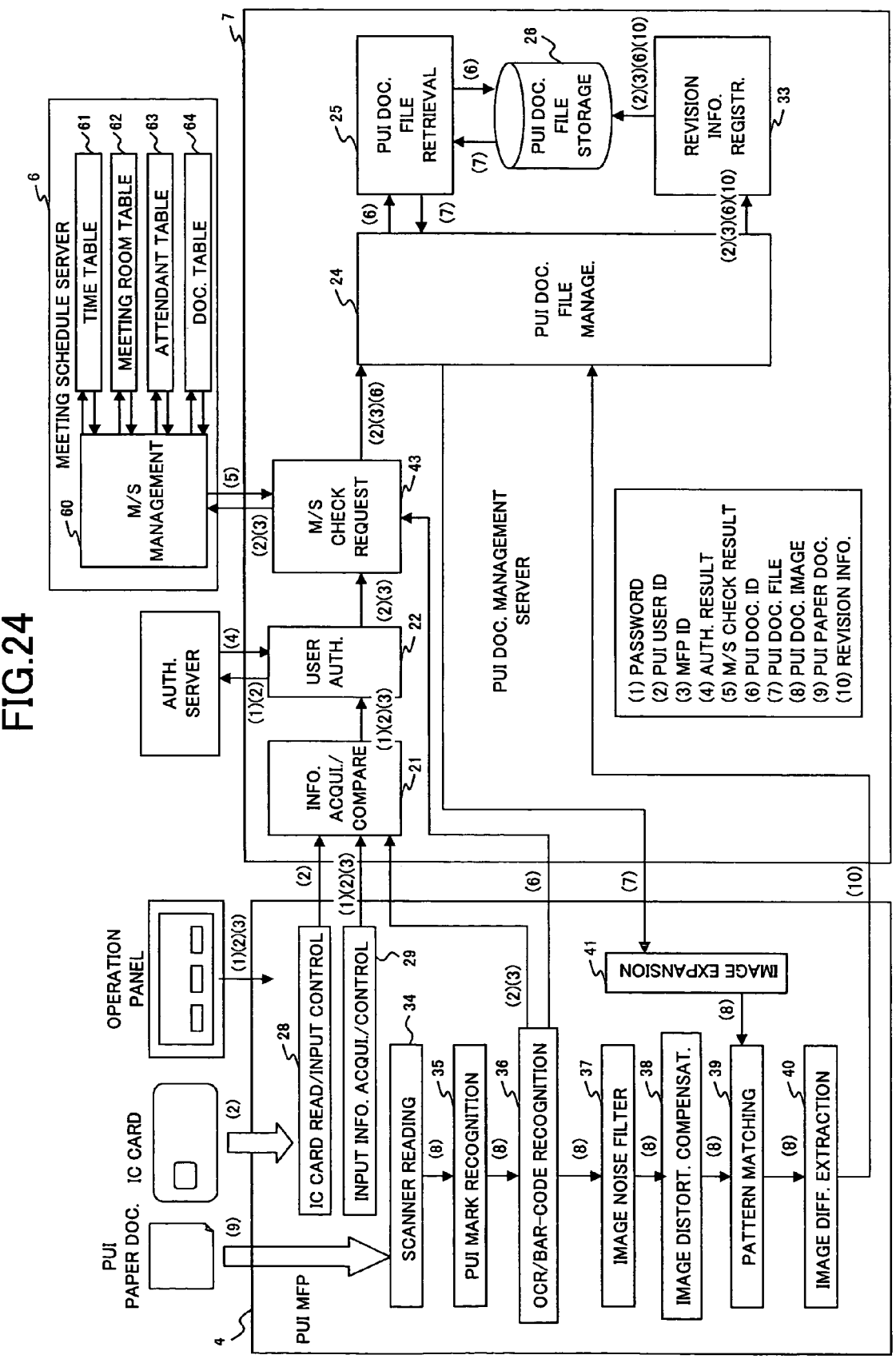
FIG. 24 is a diagram for explaining the functional composition concerning the inputting of the PUI paper document.
Figure 26:
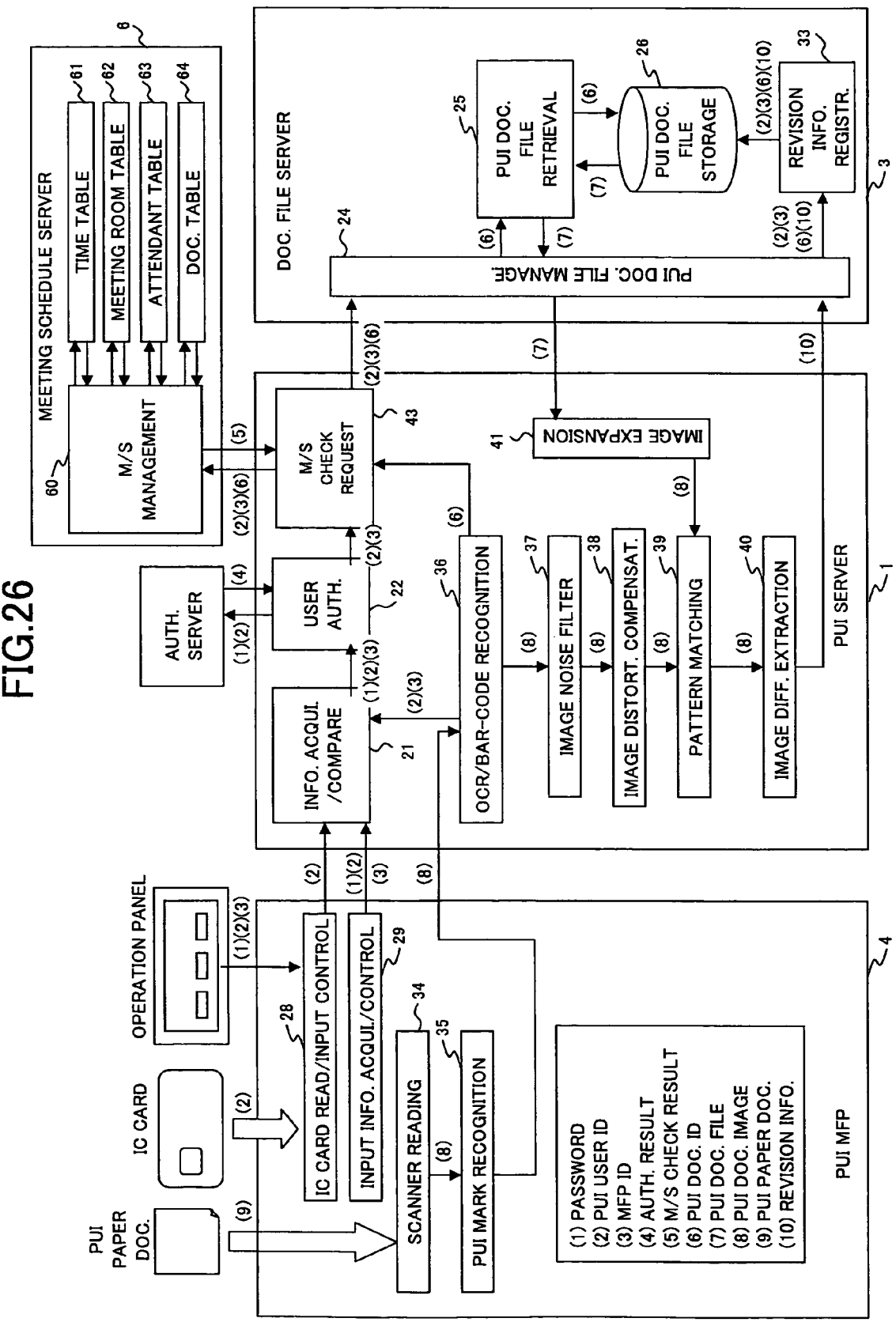
FIG. 26 is a diagram for explaining the functional composition concerning the inputting of the PUI paper document.

On the other hand, FIG. 24 and FIG. 26 include the main functions concerning PUI in the PUI server 1, and show an example made to become independent in the document file server 3.

Moreover, FIG. 23 and FIG. 25 show the functional composition concerning the output of the PUI paper document, and FIG. 24 and FIG. 26 have shown the functional composition concerning the input (reading) of the PUI paper document with them.

FIG. 23 is a diagram for explaining the functional composition concerning the output of the PUI paper document.

As shown in FIG. 23, the PUI MFP 4 comprises the IC card reader/input-control unit 28, the input acquisition/control unit 29, the image composition unit 30, and the printer output unit 31.

The IC card reader/input-control unit 28 is the control units which perform reading of the integrated circuit card and/or read informational control, for example, reads the PUI user ID from the integrated circuit card inputted by the user, and transmits to PUI document-management server 7.

The input acquisition/control unit 29 acquires MFP-ID and/or this MFP-ID as which the PUI user ID, and the password and user that are the acquisition control unit which acquires and/or controls the input inputted through the console panel, for example, are inputted through the console panel demand the output of the PUI paper document, ID of the conference room made to correspond, for example, transmits to PUI document-management server 7.

In addition, the ID of the conference room made to correspond to MFP-ID for simplification of explanation is also only called MFP-ID.

Based on the PUI user ID that is the synthetic unit which compounds the image, for example, received from the PUI document-management server 7, MFP-ID, the PUI document ID, and the PUI document file, the image composition unit 30 adds the PUI user ID, MFP-ID, and the PUI document ID to the PUI document file, and compounds the PUI paper document image.

The printer output unit 31 makes the PUI paper document image which is the printing output unit which carries out the printing output, for example, is compounded in the image composition unit 30 by making the image into the document the PUI paper document, and prints and outputs it.

Moreover, as shown in FIG. 23, the PUI document-management server 7 has information acquisition and the comparator 21, the user authentication unit 22, the document ID acquisition unit 23, the PUI document file management unit 24, the PUI document file reference unit 25, the PUI document file accumulation unit 26, the printer control unit 27, and the meeting schedule collation request unit 43.

The information acquisition and the comparator 21 acquire the identification information (for example, the PUI user ID and/or MFP-ID) and the password from PUI MFP 4 and/or the client PC 5, or compares the acquired identification information.

The user authentication unit 22 transmits the authentication request of the user including the PUI user ID whose information acquisition and the comparator 21 acquired to the authentication server, and receives the authentication result from the authentication server.

In addition, it is possible to make it include the password in the authentication request.

The meeting schedule collation request unit 43 transmits the collation request of the meeting schedule including the PUI user ID that is the request unit which requires collation of the meeting schedule of the meeting schedule server 6, for example, information acquisition and the comparator 21 acquired to the meeting schedule server 6, and receives the collation result of the meeting schedule.

In addition, it is possible to make it include MFP-ID in the collation request of the meeting schedule.

The document ID acquisition unit 23 transmits the acquisition request of the PUI document ID including the PUI user ID that is the acquisition unit which acquires the PUI document ID from the meeting schedule server 6, for example, information acquisition and the comparator 21 acquired to the meeting schedule server 6, and receives the PUI document ID.

In addition, it is possible to make it include MFP-ID in the acquisition request of the PUI document ID.

The PUI document file management unit 24 is the management unit which manages the PUI document file accumulated in the PUI document file accumulation unit 26, for example, holds the PUI user ID received from the document ID acquisition unit 23, MFP-ID, and the PUI document ID temporarily, and gives reference/acquisition demand of the PUI document containing the PUI document ID to the PUI document file reference unit 25.

Moreover, the PUI document file management unit 24 hands the PUI document ID to the print control unit 27, and demands the print as the PUI document file received from the PUI document file reference unit 25, and the PUI user ID and MFP-ID which are held temporarily.

Based on the PUI document ID, based on the PUI document ID which is the reference unit which searches the PUI document file accumulation unit 26, for example, is contained in reference/acquisition request from the PUI document file management unit 24, the PUI document file reference unit 25 searches the PUI document file accumulation unit 26, and provides the PUI document file management unit 24 with the corresponding PUI document file.

The PUI document file accumulation unit 26 is the storage device which accumulates the PUI document file.

In addition, the structure of the PUI document file accumulated in the PUI document file accumulation unit 26 is the same as that explained in the above embodiment.

The print control unit 27 transmits the PUI user ID and MFP-ID which are the control unit which controls the print request to PUI MFP 4, for example, are provided from the PUI document file management unit 24, the PUI document ID, and the PUI document file to PUI MFP 4, and requires printing of the PUI paper document.

Moreover, as shown in FIG. 23, the meeting schedule server 6 has the meeting schedule management unit 60, the timetable 61, the conference room table 62, the attendant table 63, and the document table 64.

The meeting schedule management unit 60 is the management unit which manages the information concerning the document used for the meeting schedule, and the attendants at the meeting.

For example, the collation request of the meeting schedule including the PUI user ID received from the PUI document-management server 7 is accepted. It compares and transmits the collation result to the PUI document-management server 7.

The PUI document ID which corresponds according to the acquisition request of the PUI document ID including the PUI user ID received from the PUI document-management server 7 is acquired, and this PUI document ID is transmitted to the PUI document-management server 7.

Here, the timetable 61 is the table which manages the schedule of the meeting in the conference room.

Moreover, the conference room table 62 is the table which identifies the conference room.

Moreover, the attendant table 63 is the table which manages the attendant for every meeting.

Moreover, the document table 64 is the table which manages the PUI document ID for every meeting.

As mentioned above, the attendant at the meeting prints and outputs the PUI paper document to which the PUI user ID of the self concerned is added using PUI MFP 4.

In the following, an example of the functional composition concerning the input of the PUI paper document is explained using FIG. 24.

FIG. 24 is a diagram for explaining the functional composition concerning the input of the PUI paper document.

For simplification of explanation, it is assumed that the attendant at the meeting makes the corrected PUI paper document be read out by using the PUI MFP 4 installed in the conference room. However, the present invention is not limit to the operation of the following embodiment.

As shown in FIG. 24, the PUI MFP 4 comprises the IC card reader/input-control unit 28, the input acquisition/control unit 29, the scanner reading unit 34, the PUI mark approval unit 35, the OCR/bar-code approval unit 36, the image noise-filter unit 37, the image distorted compensation unit 38, the pattern-matching unit 39, and the image difference extraction unit 40 and the image expansion unit 41.

In addition, the IC card reader/input-control unit 28 and the input acquisition/control unit 29 are the same as those of the embodiment shown in FIG. 23.

The scanner reading unit 34 reads the PUI paper document, and passes the PUI paper document image to the PUI mark approval unit 35.

The PUI mark approval unit 35 recognizes the PUI document ID and/or the PUI user ID as showed FIG. 7 based on position information, font information, mode information, etc. which are beforehand defined from the PUI paper document image passed from the scanner reading unit 34, MFP-ID, etc. to be PUI marks, and passes the PUI paper document image to OCR/bar-code approval unit 36.

The OCR/bar-code approval unit 36 reads the PUI mark recognized in the PUI mark approval unit 35, transmits the PUI mark which read, for example, the PUI user ID and MFP-ID, and the PUI document ID to for example, PUI document-management server 7, and passes the PUI paper document image to the image noise-filter unit 37.

The image noise-filter unit 37 passes the PUI paper document image which removed the image noise and removed the noise from the PUI paper document image to the image distorted compensation unit 38.

The image distorted compensation unit 38 rectifies distortion of the PUI paper document image, and passes the PUI paper document image to the pattern-matching unit 39.

On the other hand, the image expansion unit 41 expands in the PUI paper document image, and passes the PUI document file received for example, from the PUI document-management server 7 to the pattern-matching unit 39.

In the pattern-matching unit 39, pattern matching of the PUI paper document image which is passed from the image distorted compensation unit 38 and to which revision information is added, and the PUI paper document image handed by the PUI document-management server 7 is performed.

The image difference extraction unit 40 transmits the difference of the image which extracted and extracted the difference of the image to the PUI document-management server 7 based on the result which carried out pattern matching in the pattern-matching unit 39.

Moreover, as shown in FIG. 24, the PUI document-management server 7 has information acquisition and the comparator 21, the user authentication unit 22, the PUI document file management unit 24, the PUI document file reference unit 25, the PUI document file accumulation unit 26, the revision information registration unit 33, and the meeting schedule collation request 43.

In addition, the user authentication unit 22, the PUI document file reference unit 25, and the PUI document file accumulation unit 26 are the same with having explained in FIG. 23.

Information acquisition and the comparator 21 acquire the PUI user ID from IC card reader/input-control unit 28 of PUI MFP 4, or acquires the PUI user ID, the password, MFP-ID, etc. from input acquisition/control unit 29 of PUI MFP 4.

Moreover, information acquisition and the comparator 21 acquire the PUI user ID and/or MFP-ID which OCR/bar-code approval unit 36 read from the PUI paper document image from OCR/bar-code approval unit 36 of PUI MFP 4.

Information acquisition and the comparator 21 compare the PUI user ID acquired from the PUI user ID, and the OCR/bar-code approval unit 36 acquired from IC card reader/input-control unit 28, and compares whether you are the same PUI user ID.

Moreover, information acquisition and the comparator 21 compare MFP-ID acquired from input acquisition/control unit 29 with MFP-ID acquired from OCR/bar-code approval unit 36, and compares that it is the same MFP-ID.

The system with increased security can be provided by performing collation of the PUI user ID and MFP-ID.

The meeting schedule collation request unit 43 transmits the collation request of the meeting schedule including the PUI user ID that is the request unit which requires collation of the meeting schedule of the meeting schedule server 6, for example, information acquisition and the comparator 21 acquired to the meeting schedule server 6, and receives the collation result of the meeting schedule.

If the collation result indicating which is the meeting schedule righter than the meeting schedule server 6 is received, the meeting schedule collation request unit 43 will require the acquisition request of the corresponding PUI document file containing the PUI document ID, and the PUI user ID and MFP-ID of the PUI document file management unit 24.

The registration unit into which the revision information registration unit 33 registers revision information it is for example, the image difference of the extracted image of the extraction unit 40, the PUI document file management unit 24 registers into the PUI document file accumulation unit 26 the revision information included in the difference with the PUI user ID and MFP-ID which are held temporarily based on the PUI document ID.

The attendant at the meeting makes the PUI paper document which self corrected using PUI MFP 4 currently respectively installed in the conference room read, as mentioned above.

The main PUI related functions described with FIG. 23 are included in the PUI server 1, and an example of the functional composition of each device at the time of making the PUI server 1 and the document file server 3 become independent is explained using FIG. 25.

FIG. 25 is a diagram for explaining the functional composition concerning the output of the PUI paper document.

As shown in FIG. 25, the PUI server 1 has information acquisition and the comparator 21, the user authentication unit 22, the document ID acquisition unit 23, the print control unit 27, and the meeting schedule collation request unit 43.

Moreover, as shown in FIG. 25, the document file server 3 has the PUI document file management unit 24, the PUI document file reference unit 25, and the PUI document file accumulation unit 26.

In addition, each function is the same with having explained in FIG. 23.

As shown in FIG. 25, it is good also as composition which included the main functions concerning PUI in the PUI server 1, and is made to become independent of the document file server 3.

Moreover, the main PUI related functions described with FIG. 24 are included in the PUI server 1, and an example of the functional composition of each device at the time of making the PUI server 1 and the document file server 3 become independent is explained using FIG. 26.

FIG. 26 is a diagram for explaining the functional composition concerning the input of the PUI paper document.

As shown in FIG. 26, PUI MFP 4 has IC card reader/input-control unit 28, input acquisition/control unit 29, the scanner reading unit 34, and the PUI mark approval unit 35.

Moreover, as shown in FIG. 26, the PUI server 1 comprises the information acquisition/comparison unit 21, the user authentication unit 22, the OCR/bar-code approval unit 36, the image noise filter unit 37, the image distorted compensation unit 38, the pattern-matching unit 39, and the image difference extraction unit 40, the image expansion unit 41, and the meeting schedule collation request unit 43.

Moreover, as shown in FIG. 26, the document file server 3 has the PUI document file management unit 24, the PUI document file reference unit 25, the PUI document file accumulation unit 26, and the revision information registration unit 33.

In addition, each function is the same with having explained in FIG. 24.

As shown in FIG. 26, it is good also as composition which included the main functions concerning PUI in the PUI server 1, and is made to become independent of the document file server 3.

Figure 27:
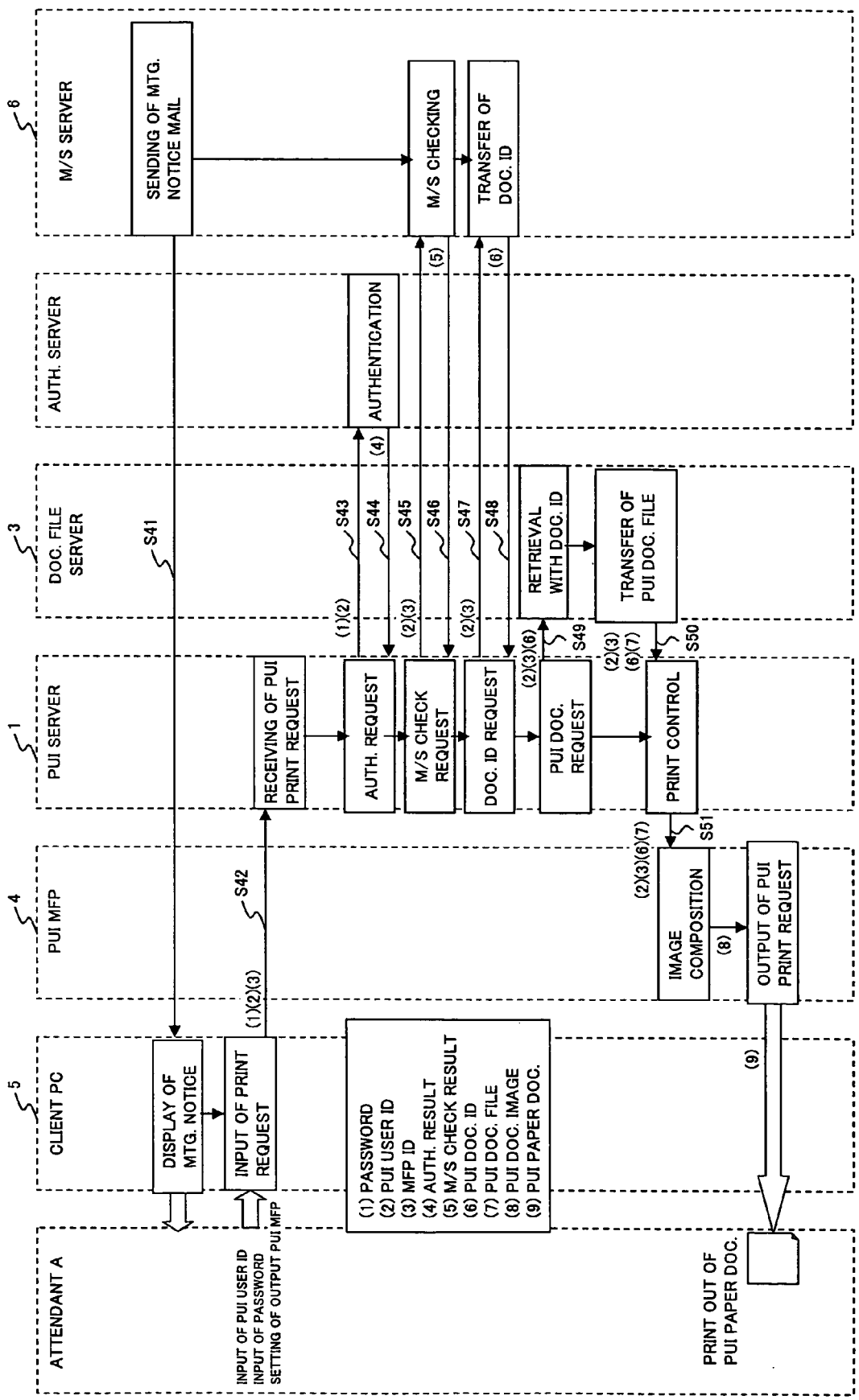
FIG. 27 is a sequence diagram for explaining the procedure of the outputting of the PUI paper document.

Next, the attendant at the meeting who has received the notice mail of meeting holding explains an example which outputs the PUI paper document in predetermined PUI MFP 4 using FIG. 27 from the meeting schedule server 6.

FIG. 27 is a sequence diagram for explaining the output of the PUI paper document.

In addition, in FIG. 27, each device explains as what carries out functional composition as shown in FIG. 25. However, the present invention is not limited to the operation of the following embodiment.

The meeting schedule management unit 60 of introduction and the meeting schedule server 6 transmits the notice mail of meeting holding indicating that the meeting is held to the corresponding meeting attendant's A client PC 5 with reference to the timetable 61 or attendant table 63 (step S41 of FIG. 27).

The client PC 5 of the meeting attendant A provides, when receiving the notice mail of meeting holding indicating that the meeting is held from the meeting schedule server 6, the display indicating that the notice mail of meeting holding is received.

If the notice mail of meeting holding is checked, the meeting attendant A will input MFP-ID which identifies PUI MFP which outputs the PUI user ID, the password, and the PUI paper document, for example, and will demand the output of the PUI paper document concerning the meeting where self participates.

The client PC 5 which received the request from the meeting attendant A transmits the output request of the PUI paper document containing the PUI user ID, the password, and MFP-ID to the PUI server 1 (step S42 of FIG. 27).

The information acquisition and comparator 21 of the PUI server 1 which received the request pass for example, the PUI user ID and the password to the user authentication unit 22.

The user authentication unit 22 transmits the authentication request containing the PUI user ID and the password to the authentication server (step S43 of FIG. 27).

Based on the password and the PUI user ID contained in the authentication request which received, the authentication server attests and transmits the authentication result to the PUI server 1 (step S44 of FIG. 27).

The user authentication unit 22 of the PUI server 1 which received the authentication result indicating that authentication is successful from the authentication server passes the PUI user ID and MFP-ID to the meeting schedule collation request unit 43, and requires collation of the meeting schedule.

The meeting schedule collation request unit 43 transmits the collation request of the meeting schedule which contains the PUI user ID and MFP-ID based on the request from the user authentication unit 22 to the meeting schedule server 6 (step S45 of FIG. 27).

From the PUI server 1, with reference to the timetable 61, the conference room table 62, and attendant table 63, the meeting schedule management unit 60 of the meeting schedule server 6 which received the collation request of the meeting schedule compares the meeting schedule, and transmits the collation result of the meeting schedule to the PUI server 1 (step S46 of FIG. 27).

The meeting schedule collation request unit 43 of the PUI server 1 which received the collation result indicating which is the right meeting schedule passes the PUI user ID and MFP-ID to the document ID acquisition unit 23, and requires the acquisition of the PUI document ID.

The document ID acquisition unit 23 which received this request transmits the acquisition request of the PUI document ID concerning the corresponding meeting containing the PUI user ID and MFP-ID to the meeting schedule server 6 (step S47 of FIG. 27).

The meeting schedule management unit 60 of the meeting schedule server 6 which received the acquisition request of the PUI document ID acquires the PUI document ID which corresponds with reference to document table 64 based on the PUI user ID and/or MFP-ID which are contained in the acquisition request of the PUI document ID, and transmits to the PUI server 1 (step S48 of FIG. 27).

The document ID acquisition unit 23 of the PUI server 1 which acquired the PUI document ID from the meeting schedule server 6 transmits the acquisition request of the corresponding PUI document file containing this PUI document ID, and the PUI user ID and MFP-ID to the document file server 3 (step S49 of FIG. 27).

The PUI document file management unit 24 of the document file server 3 which received the acquisition request of the corresponding PUI document file containing the PUI document ID, and the PUI user ID and MFP-ID holds the PUI document ID temporarily, hands the PUI document ID to the PUI document file reference unit 25, and demands reference of the PUI document file as the PUI user ID and MFP-ID.

The PUI document file management unit 24 will transmit this PUI document file, the PUI user ID and MFP-ID which are held temporarily, and the PUI document ID to the PUI server 1, if the PUI document file corresponding to the PUI document ID is acquired from the PUI document file reference unit 25 (step S50 of FIG. 27).

The print control unit 27 of the PUI server 1 which received the PUI document ID, and the PUI user ID and MFP-ID from the document file server 3 transmits the request of the printing output of the PUI paper document containing the PUI document ID, and the PUI user ID and MFP-ID to PUI MFP 4 corresponding to MFP-ID (step S51 of FIG. 27).

The image composition unit 30 of PUI MFP 4 which received the request compounds the PUI paper document image which added the PUI user ID, MFP-ID, and the PUI document ID to the PUI document file based on the PUI user ID received from the PUI server 1, MFP-ID, the PUI document ID, and the PUI document file.

The printer output unit 31 of PUI MFP 4 makes the PUI paper document image compounded in the image composition unit 30 the PUI paper document, and carries out the printing output.

By performing processing as shown in FIG. 27, the meeting attendant received notice mail of meeting holding can do the printing output in PUI MFP 4 which specified the corresponding PUI paper document concerning the meeting where the self concerned participates from the meeting schedule server 6.

The attendant at the meeting needs to make it read the integrated circuit card using the PUI MFP 4 currently installed in the conference room where the following, for example, the meeting, is held it is sufficient, MFP-ID of PUI MFP 4 which operates the console panel of PUI MFP 4 etc. and outputs the password and the paper document etc. is inputted.

Figure 28:
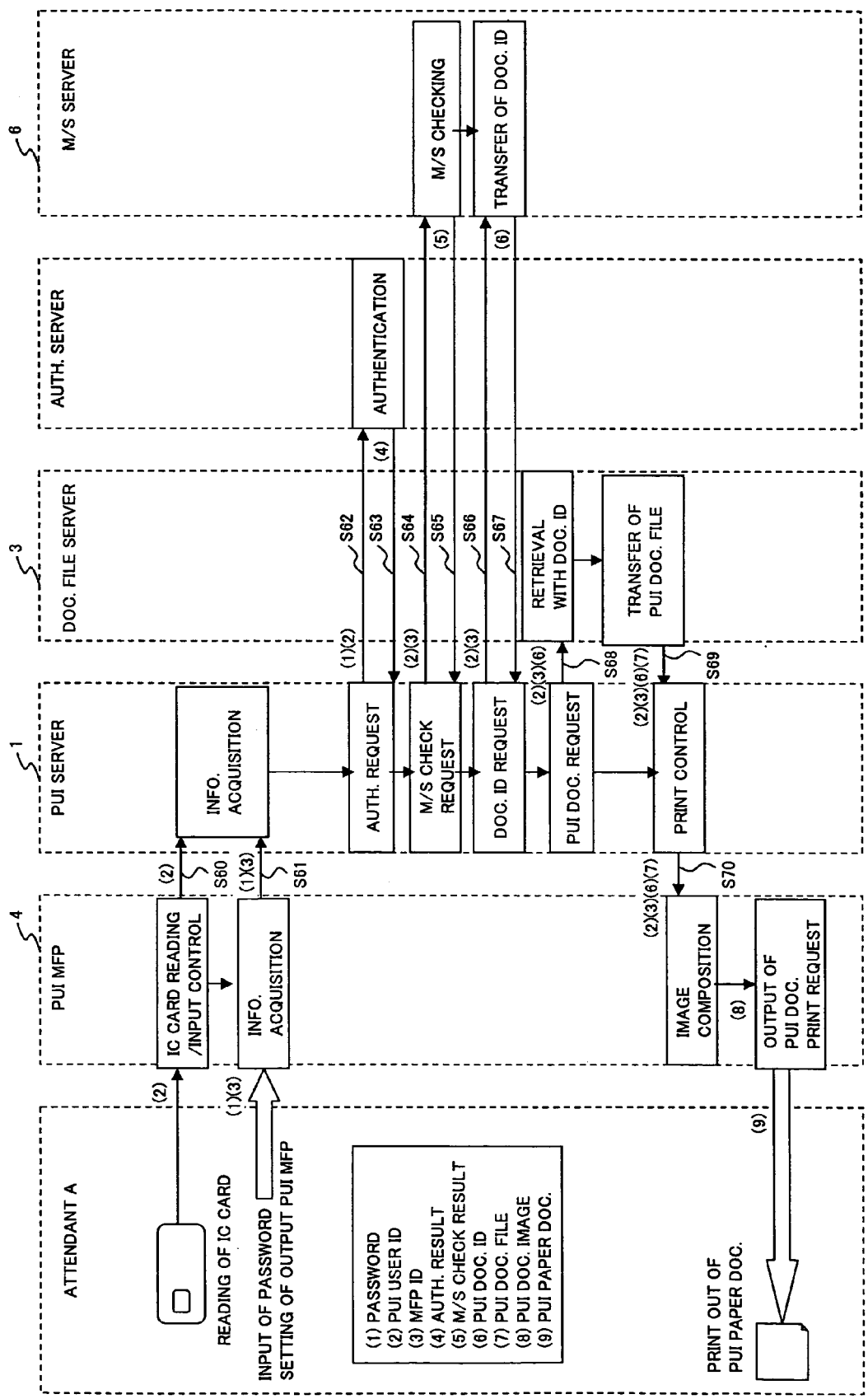
FIG. 28 is a sequence diagram for explaining the procedure of the outputting of the PUI paper document.

Next, an example which outputs the PUI paper document is explained using FIG. 28.

FIG. 28 is a sequence diagram for explaining the procedure of the outputting of the PUI paper document.

In addition, in FIG. 28, each device explains as what carries out functional composition as shown in FIG. 25. However, this does not limit operation of the present invention.

The meeting attendant A that is introduction and the attendant at the meeting needs to make it input and read the integrated circuit card into PUI MFP 4 currently installed in the conference room etc. it is sufficient, MFP-ID of PUI MFP 4 which outputs the password and the paper document through the console panel of PUI MFP 4 etc. is inputted, and the output of the paper document is required.

The IC card reader/input-control unit 28 of PUI MFP 4 will transmit this PUI user ID to the PUI server 1, if the PUI user ID is acquired (step S60 of FIG. 28).

Moreover, the input acquisition/control unit 29 of PUI MFP 4 will transmit this password and MFP-ID to the PUI server 1, if the password, MFP-ID, etc. which are inputted through the console panel are acquired (step S61 of FIG. 28).

The information acquisition/comparison unit 21 of the PUI server 1 which received the password, and the PUI user ID and MFP-ID from PUI MFP 4 in the step S60 and the step S61 pass for example, the PUI user ID and the password to the user authentication unit 22.

The user authentication unit 22 transmits the authentication request containing the PUI user ID and the password to the authentication server (step S62 of FIG. 28).

Next, the processing from the step S63 to the step S70 is the same as the processing from the step S44 to the step S51 in which it explained in FIG. 27.

By performing processing as shown in FIG. 28, the attendant at the meeting can operate PUI MFP 4 currently installed in the conference room, and can do the printing output of the corresponding PUI paper document.

Figure 29:
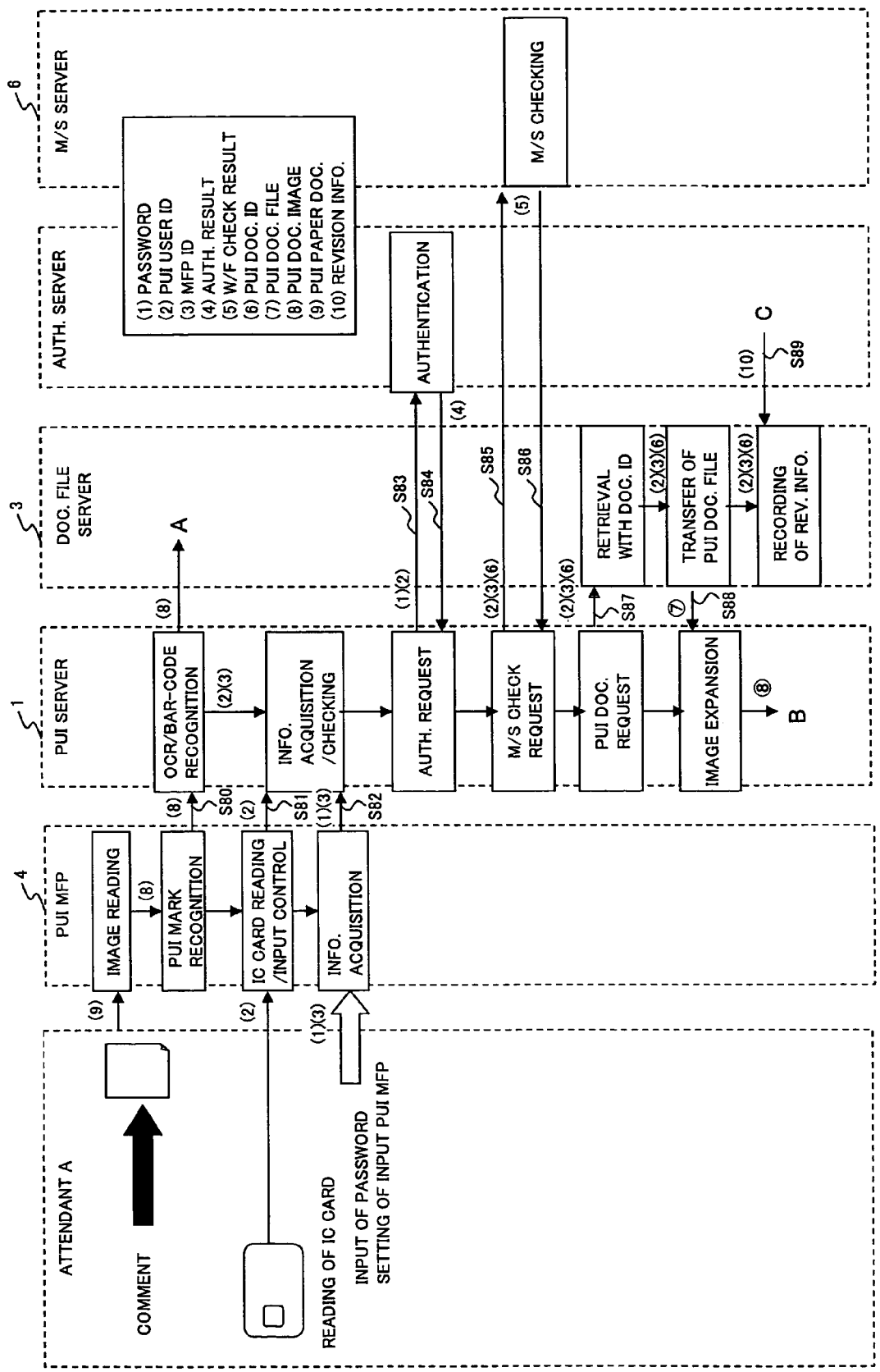
FIG. 29 is a sequence diagram for explaining the procedure of the reading of the PUI paper document.
Figure 30:
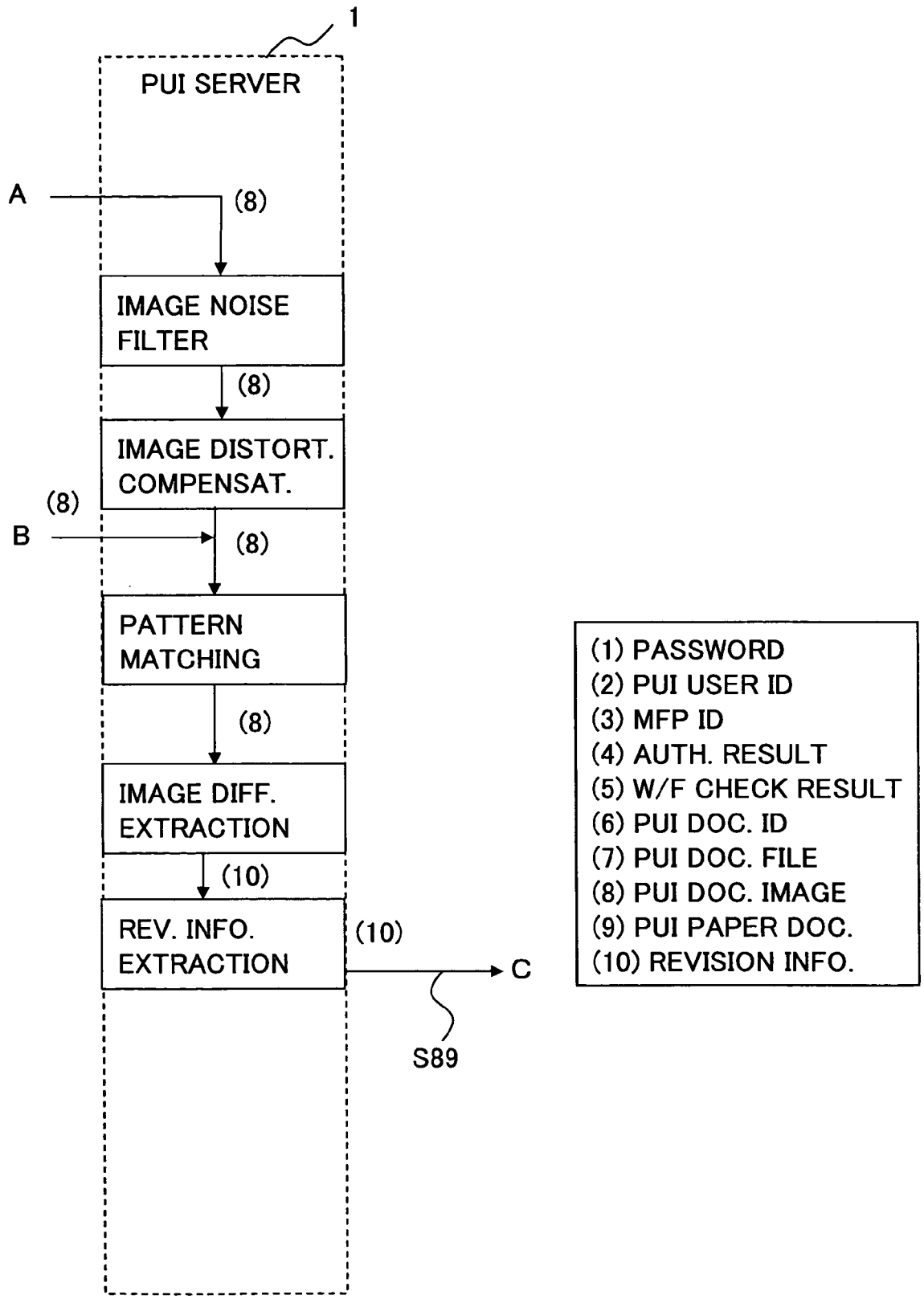
FIG. 30 is a sequence diagram for explaining the procedure of the reading of the PUI paper document.

Next, an example of reading of the PUI paper document is explained using FIG. 29 and FIG. 30.

FIG. 29 is a sequence diagram for explaining the procedure of the reading of the PUI paper document.

Moreover, FIG. 30 is a sequence diagram for explaining the procedure of the reading of the PUI paper document.

In addition, in FIG. 29 and FIG. 30, each device explains as what carries out functional composition as shown in FIG. 26. However, this does not limit operation of the present invention.

The meeting attendant A who has corrected the introduction, the comment, etc. makes the PUI paper document read into PUI MFP 4 currently installed in the conference room.

In this PUI MFP 4, the scanner reading unit 34 reads the PUI paper document, and passes the PUI paper document image to the PUI mark approval unit 35.

From the PUI paper document image provided from the scanner reading unit 34, the PUI mark approval unit 35 recognizes the PUI document ID and/or the PUI user ID as showed FIG. 7 based on position information, font information, mode information, etc. which are defined beforehand, MFP-ID, etc. to be PUI marks, and transmits the approval information and the PUI paper document image concerning approval of the PUI mark to the PUI server 1 (step S80 of FIG. 29).

The PUI server's 1 OCR/bar-code approval unit 36 read the PUI user ID, MFP-ID, and the PUI document ID from the PUI paper document image based on the approval information on the PUI mark and the PUI paper document image which are received.

The OCR/bar-code approval unit 36 passes the PUI user ID and MFP-ID which are read to information acquisition and the comparator 21, as shown in FIG. 26.

Moreover, the OCR/bar-code approval unit 36 passes the read PUI document ID to the meeting schedule collation request unit 43. Moreover, the OCR/bar-code approval unit 36 passes the PUI paper document image to the image noise-filter unit 37 (A of FIG. 29 and FIG. 30).

On the other hand, the meeting attendant A inputs MFP-ID which identifies PUI MFP 4 into which the PUI user ID, the password, and the PUI paper document are made to read by making the integrated circuit card read into PUI MFP 4, or operating the console panel of PUI MFP 4.

The IC card reader/input-control unit 28 of PUI MFP 4 will transmit this PUI user ID to the PUI server 1, if the PUI user ID is acquired (step S81 of FIG. 29).

Moreover, the input acquisition/control unit 29 of PUI MFP 4 will transmit this password and MFP-ID to the PUI server 1, if the password, MFP-ID, etc. which are inputted through the console panel are acquired (step S82 of FIG. 29).

The password and the PUI user ID and the MFP-ID are received by the information acquisition and comparator 21 of the PUI server 1 from PUI MFP 4 in the step S81 and the step S82. For example, by comparing the PUI user ID added to the PUI paper document image passed from OCR/bar-code approval unit 36 with the PUI user ID received in the step S81, and checking whether you are the same PUI user ID. The PUI user ID is compared.

Moreover, the PUI server's 1 information acquisition and comparator 21 compare MFP-ID by comparing MFP-ID which received in the step S82 with MFP-ID added to the PUI paper document image passed from OCR/bar-code approval unit 36, and checking whether it is the same MFP-ID.

If it determines with both being the same as a result of collation, the PUI server's 1 information acquisition and comparator 21 will pass the acquired password, and the PUI user ID and MFP-ID to the PUI server's 1 user authentication unit 22.

The PUI server's 1 user authentication unit 22 transmits the authentication request including the password and the PUI user ID to the authentication server (step S83 of FIG. 29).

Based on the password and the PUI user ID contained in the authentication request which received, the authentication server attests and transmits the authentication result to the PUI server 1 (step S84 of FIG. 29).

The user authentication unit 22 of the PUI server 1 which received the authentication result indicating that authentication is successful from the authentication server passes the PUI user ID and MFP-ID to the meeting schedule collation request unit 43, and requires collation of the meeting schedule.

The PUI server's 1 meeting schedule collation request unit 43 transmits the collation request of the meeting schedule which contains the PUI user ID, MFP-ID, and the PUI document ID based on the request from the user authentication unit 22 to the meeting schedule server 6 (step S85 of FIG. 29).

From the PUI server 1, with reference to the timetable 61, the conference room table 62, and the attendant table 63, the meeting schedule management unit 60 of the meeting schedule server 6 which received the collation request of the meeting schedule compares the meeting schedule, and transmits the collation result of the meeting schedule to the PUI server 1 (step S86 of FIG. 29).

The meeting schedule collation request unit 43 of the PUI server 1 which received the collation result indicating which is the right meeting schedule transmits the acquisition request of the PUI user ID, MFP-ID, and the corresponding PUI document file containing the PUI document ID to the document file server 3 (step S87 of FIG. 29).

The PUI document file management unit 24 of the document file server 3 which received the acquisition request of the corresponding PUI document file containing the PUI document ID, and the PUI user ID and MFP-ID holds the PUI document ID temporarily, hands the PUI document ID to the PUI document file reference unit 25, and demands reference of the PUI document file as the PUI user ID and the MFP-ID.

The PUI document file management unit 24 will transmit this PUI document file to the PUI server 1, if the PUI document file corresponding to the PUI document ID is acquired from the PUI document file reference unit 25 (step S88 of FIG. 29).

The PUI server's 1 image expansion unit 41 expands the received PUI document file in the PUI paper document image, and passes this PUI paper document image to the PUI server's 1 pattern-matching unit 39 (B of FIG. 29 and FIG. 30).

In addition, for example, the original image is included in this PUI paper document image.

Here, the image noise-filter unit 37 of the PUI server 1 to which the PUI paper document image is passed from OCR/bar-code approval unit 36 as shown in FIG. 30 passes the PUI paper document image which removed the image noise from the PUI paper document image, and removed the noise to the image distorted compensation unit 38.

The PUI server's 1 image distorted compensation unit 38 rectifies distortion of the PUI paper document image, and passes the PUI paper document image to the pattern-matching unit 39.

The PUI server's 1 pattern-matching unit 39 performs pattern matching of the PUI paper document image to which revision information passed from the image distorted compensation unit 38, such as the comment by the meeting attendant, is added, and the PUI paper document image of the original received from the PUI document-management server 7.

The PUI server's 1 image the difference the extraction unit 40 extracts the difference of the image based on the result which carried out pattern matching in the pattern-matching unit 39.

Moreover, from the difference of the image exstracted by the image difference extraction unit 40 of the PUI server 1, the revision information which the attendant at the meeting corrected is extracted, and it is transmitted to the document file server 3 (C of FIG. 29 and FIG. 30) (step S89).

As shown in C (step S89) of FIG. 29, the PUI document file management unit 24 of the document file server 3 hands the PUI document ID to the revision information registration unit 33, and demands registration of revision information as the received revision information, and the PUI user ID and the MFP-ID which are held temporarily.

The revision information registration unit 33 which received this request registers revision information, and the PUI user ID and MFP-ID into the PUI document file accumulation unit 26 based on the PUI document ID.

By performing processing as shown in FIG. 29 and FIG. 30, the meeting attendant's revision information can be associated with this meeting attendant's PUI user ID, and it can manage the original document with the association.

Next, a description will be given of other embodiments of the document management method and apparatus of the present invention.

Figure 31:
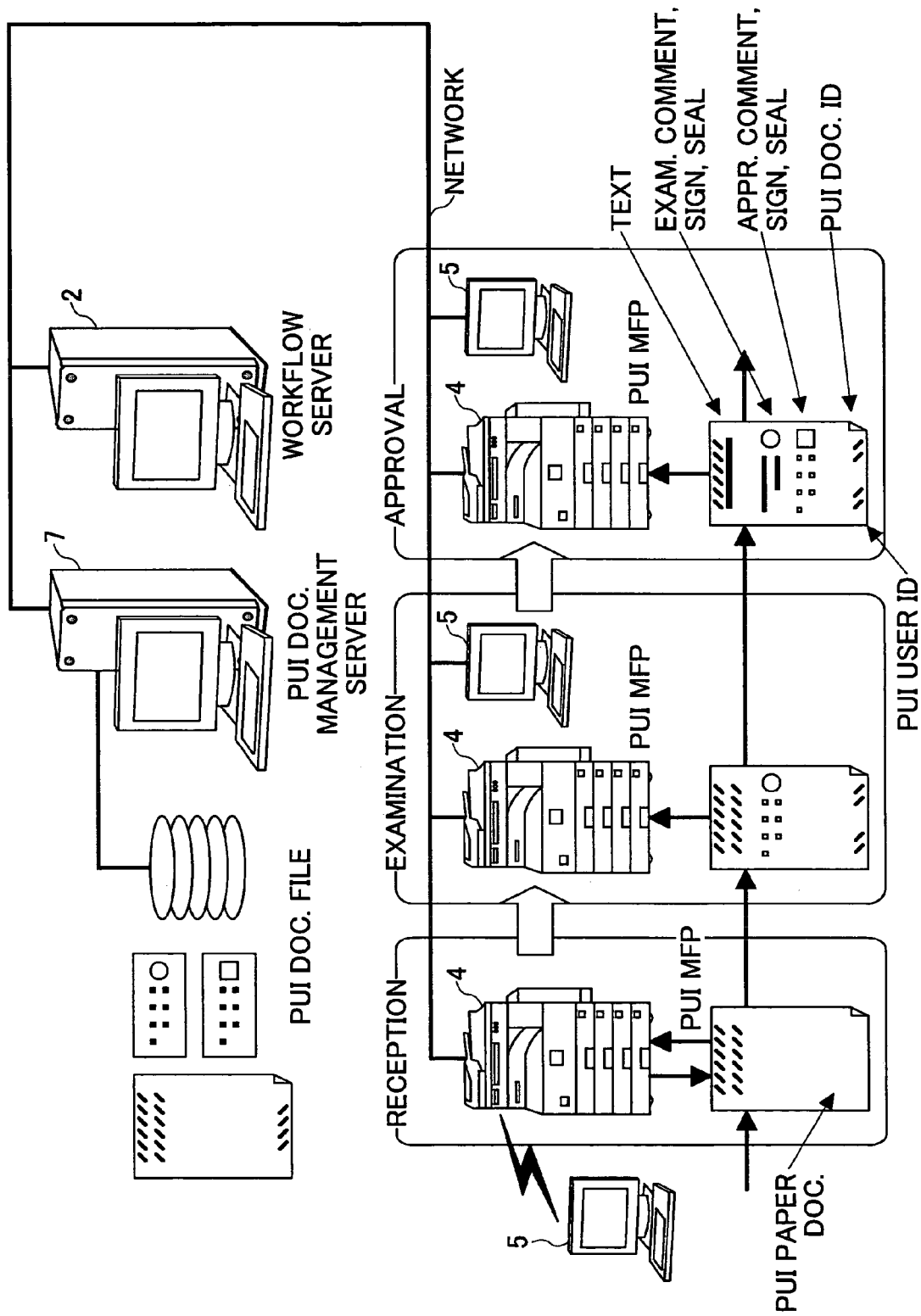
FIG. 31 is a diagram showing the concept of the procedure of examination and approval performed by an embodiment of the PUI electronic workflow system of the invention.

FIG. 31 is a diagram showing the concept of the procedure of examination and approval performed by the PUI electronic workflow system.

As shown in FIG. 31, the PUI electronic workflow system comprises the PUI document-management server 7, the workflow server 2, at least one PUI MFP 4, and at least one client PC 5, which are connected through the network. In the system shown in FIG. 31, the PUI document-management server 7 is provided instead of the PUI server 1 and the document file server 3 in the system of FIG. 1.

The procedure of examination and approval performed by the system of FIG. 31 is essentially the same as that of the system of FIG. 1, and a description thereof will be omitted for the sake of simplicity of description.

Next, another example of the procedure of examination and approval performed by the PUI electronic workflow system will be explained using FIG. 32.

Figure 32:
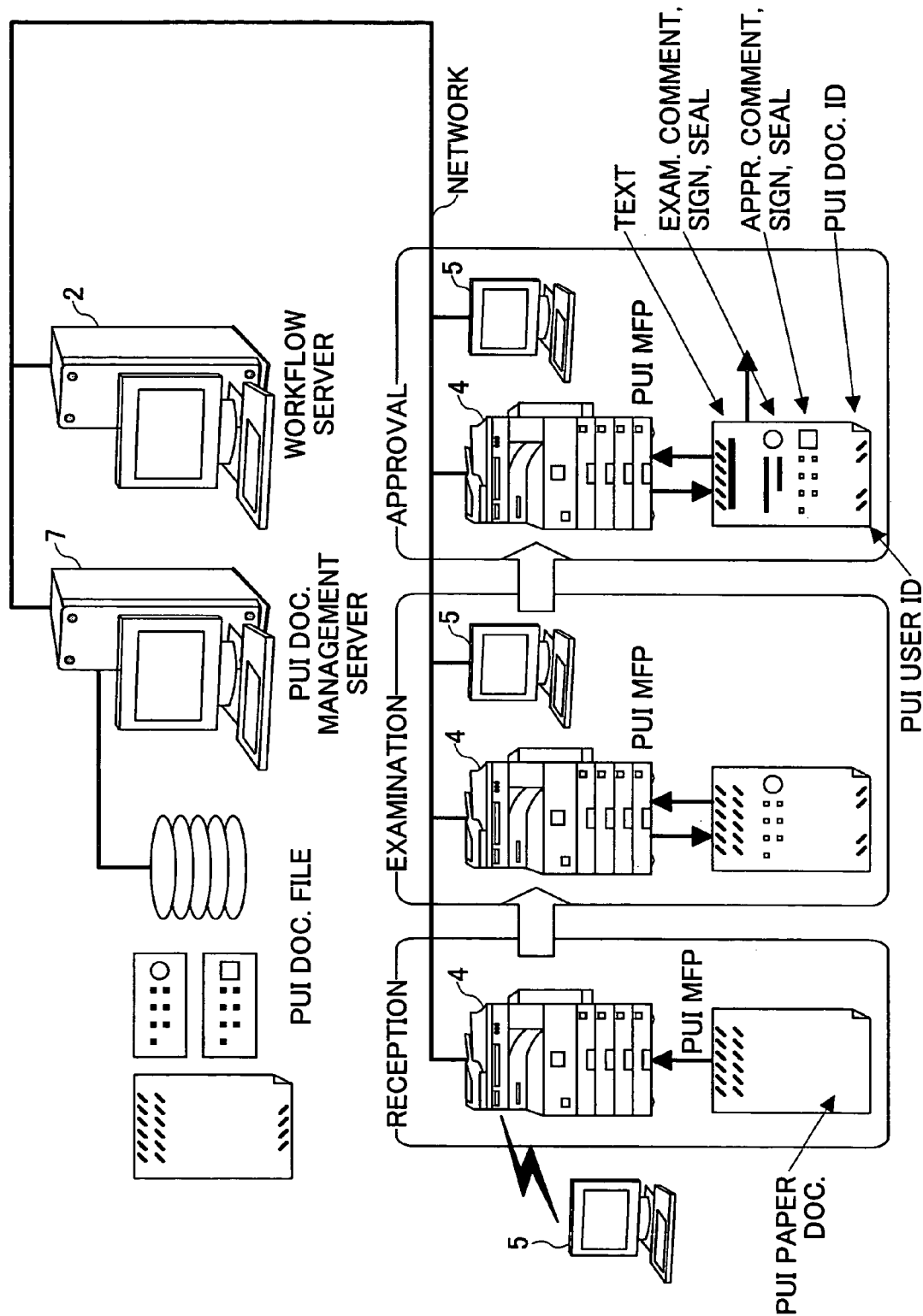
FIG. 32 is a diagram showing the concept of another procedure of the examination and approval performed by the PUI electronic workflow system of the present embodiment.

FIG. 32 is a diagram showing the concept of the procedure of examination and approval performed by the PUI electronic workflow system of the present embodiment.

The composition of the PUI electronic workflow system shown in FIG. 32 is the same as that of the system shown in FIG. 31. In the system shown in FIG. 32, the PUI document-management server 7 is provided instead of the PUI server 1 and the document file server 3 in the system of FIG. 2.

The procedure of examination and approval performed by the system of FIG. 32 is essentially the same as that of the system of FIG. 2, and a description thereof will be omitted for the sake of simplicity of description.

Next, another example of the procedure of examination and approval performed by the PUI electronic workflow system of the present embodiment will be explained using FIG. 33.

Figure 33:
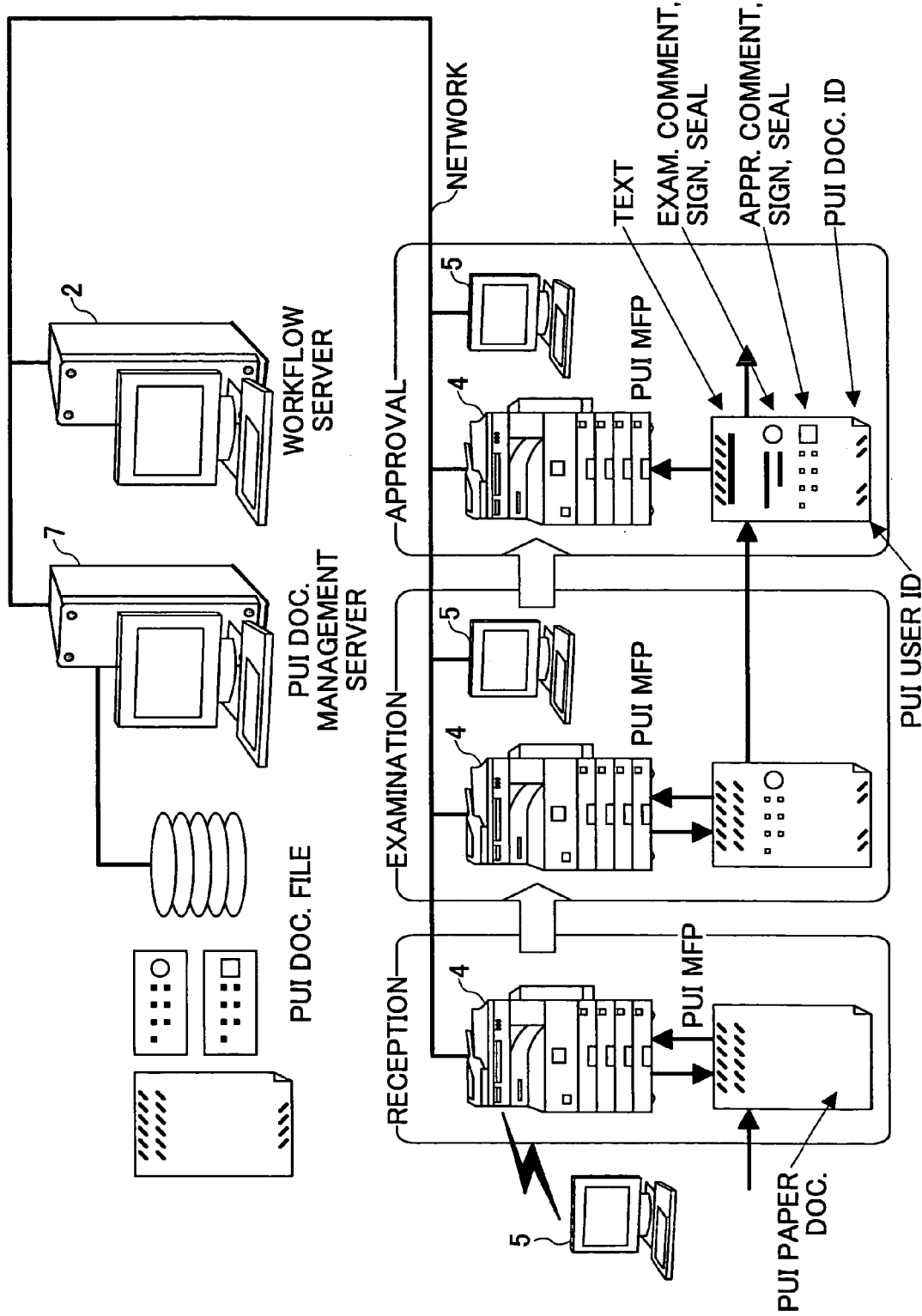
FIG. 33 is a diagram showing the concept of another procedure of the examination and approval performed by the PUI electronic workflow system of the present embodiment.

FIG. 33 is a diagram showing the concept of the procedure of examination and approval performed by the PUI electronic workflow system of the present embodiment.

The composition of the PUI electronic workflow system shown in FIG. 33 is the same as that of the system shown in FIG. 31. In the system shown in FIG. 33, the PUI document-management server 7 is provided instead of the PUI server 1 and the document file server 3 in the system of FIG. 3.

The procedure of examination and approval performed by the system of FIG. 33 is essentially the same as that of the system of FIG. 3, and a description thereof will be omitted for the sake of simplicity of description.

Next, the hardware composition of the PUI document-management server 7 will be explained using FIG. 34.

Figure 34:
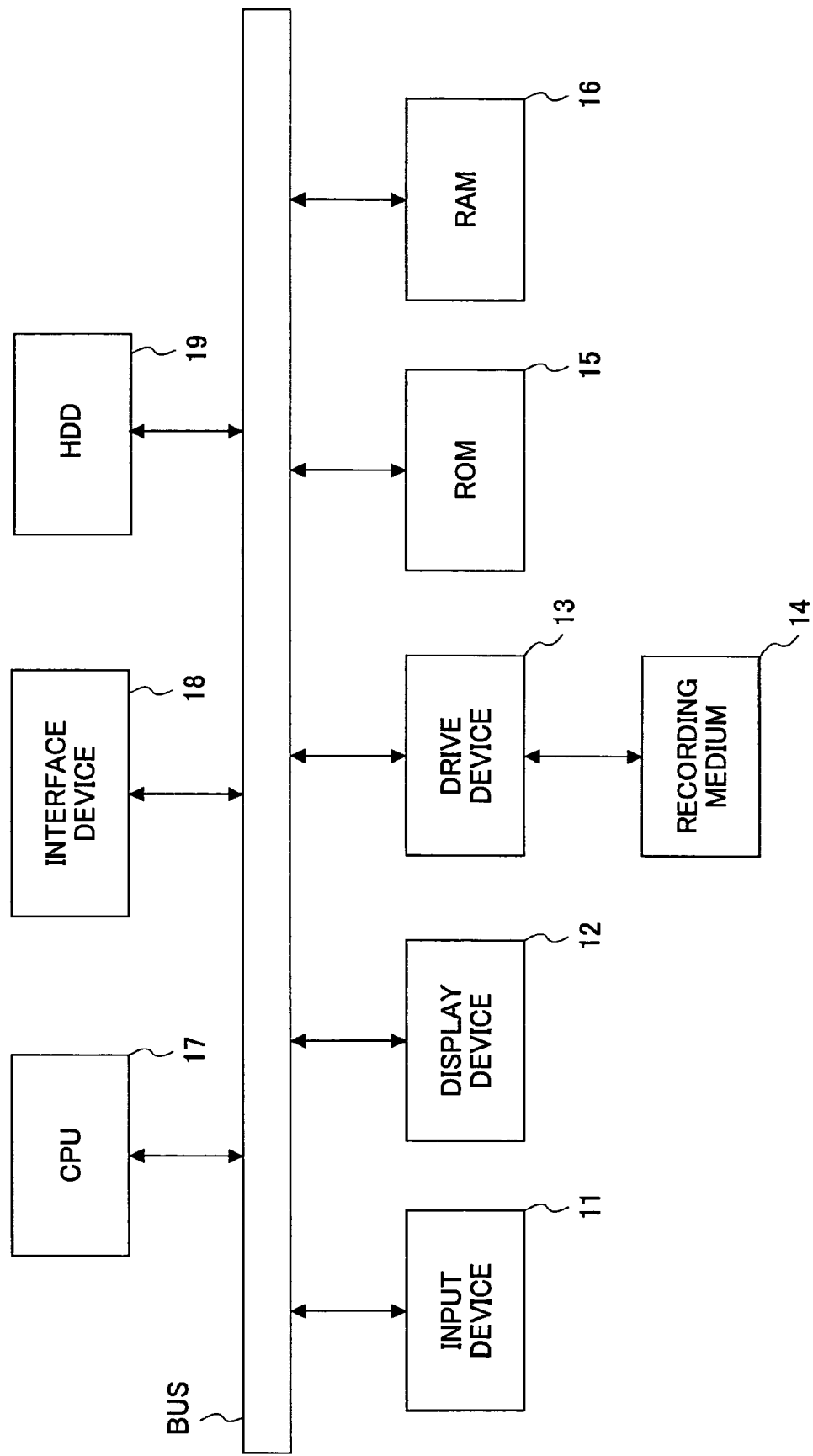
FIG. 34 is a block diagram showing the hardware composition of the PUI document management server in the PUI electronic workflow system of the present embodiment.

FIG. 34 shows an example of the hardware composition of the PUI document management server 7. As shown in FIG. 34, the hardware composition of the PUI document-management server 7 in the present embodiment is essentially the same as the hardware composition of the PUI server 1 in FIG. 4, and a description thereof will be omitted for the sake of simplicity of description.

Next, the hardware composition and functional composition of PUI MFP 4 will be explained using FIG. 35 and FIG. 36, respectively.

Figure 35:
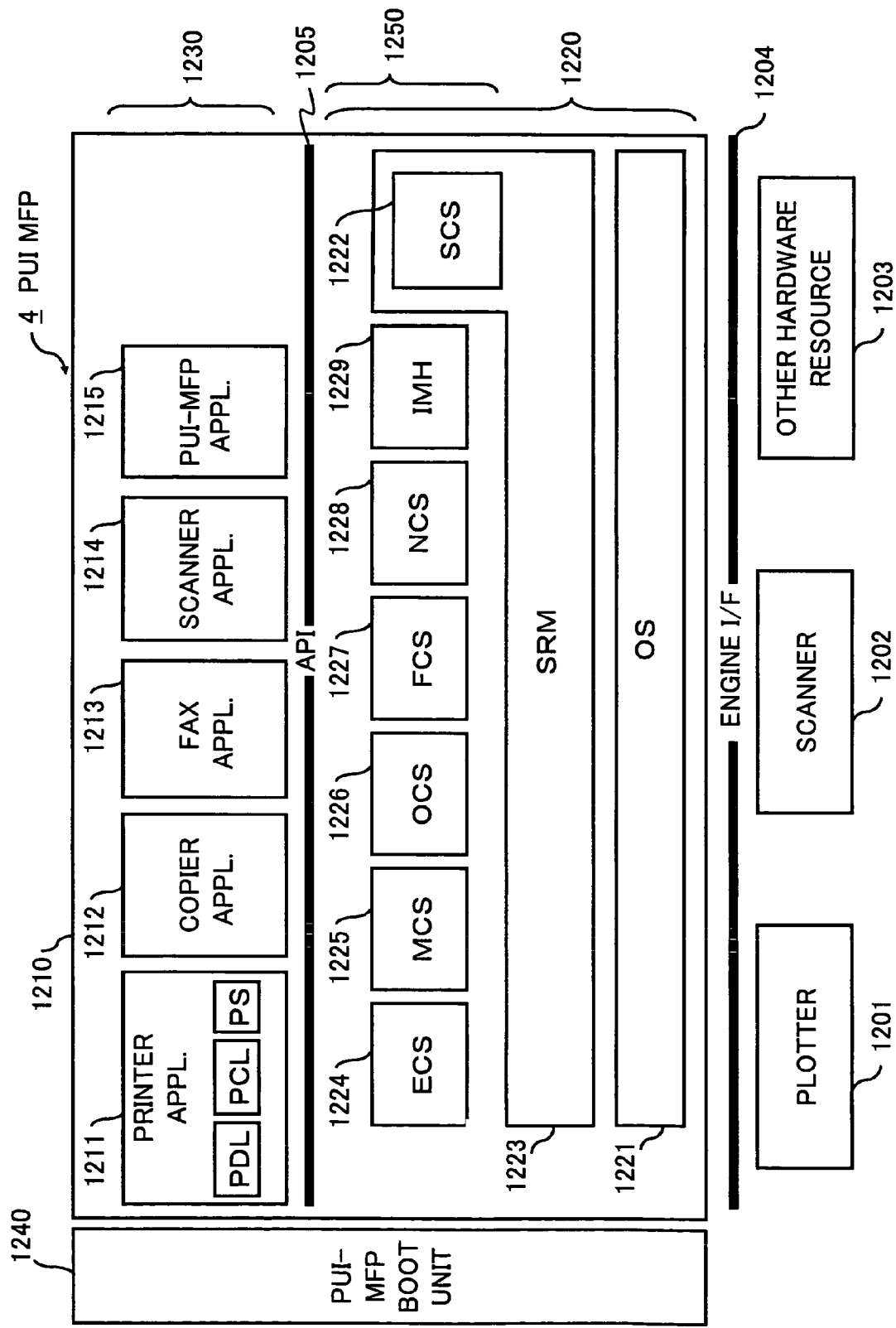
FIG. 35 is a block diagram showing the functional composition of the PUI MFP.

FIG. 35 is a block diagram showing an example of the functional composition of PUI MFP 4. As shown in FIG. 35, the functional composition of PUI MFP 4 in the present embodiment is essentially the same as the functional composition of PUI MFP 4 in FIG. 5, and a description thereof will be omitted for the sake of simplicity of description.

Figure 36:
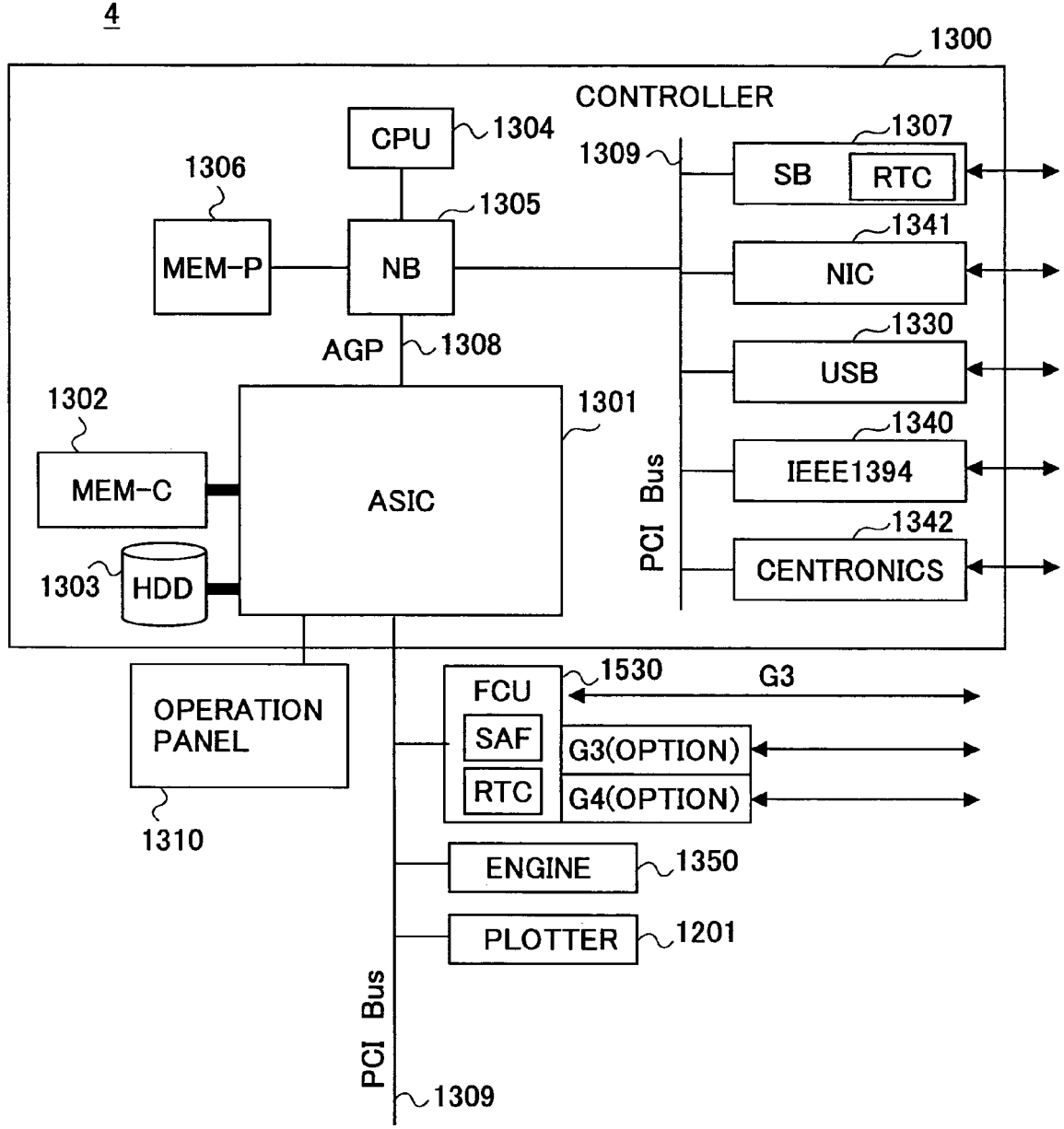
FIG. 36 is a block diagram showing the hardware composition of the PUI MFP.

FIG. 36 is a block diagram showing an example of the hardware composition of PUI MFP 4. As shown in FIG. 36, the hardware composition of PUI MFP 4 in the present embodiment is essentially the same as the functional composition of PUI MFP 4 in FIG. 6, and a description thereof will be omitted for the sake of simplicity of description.

Next, an example of the PUI mark added to the PUI paper document will be explained using FIG. 37.

Figure 37:
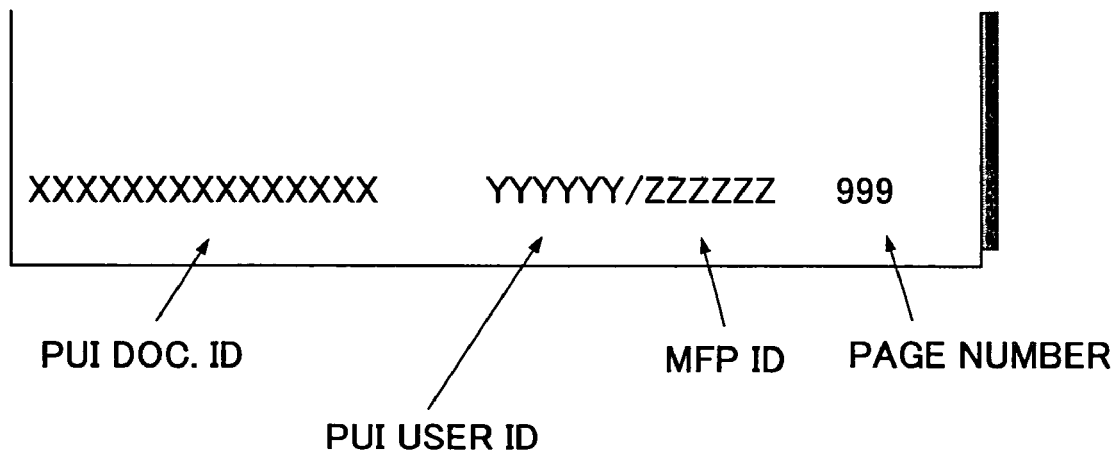
FIG. 37 is a diagram for explaining an example of the PUI mark.

FIG. 37 is a diagram for explaining an example of the PUI mark. As shown in FIG. 37, the PUI mark in the present embodiment is essentially the same as the PUI mark in FIG. 7, and a description thereof will be omitted for the sake of simplicity of description.

Next, an example of the structure of the PUI document file will be explained using FIG. 38.

Figure 38:
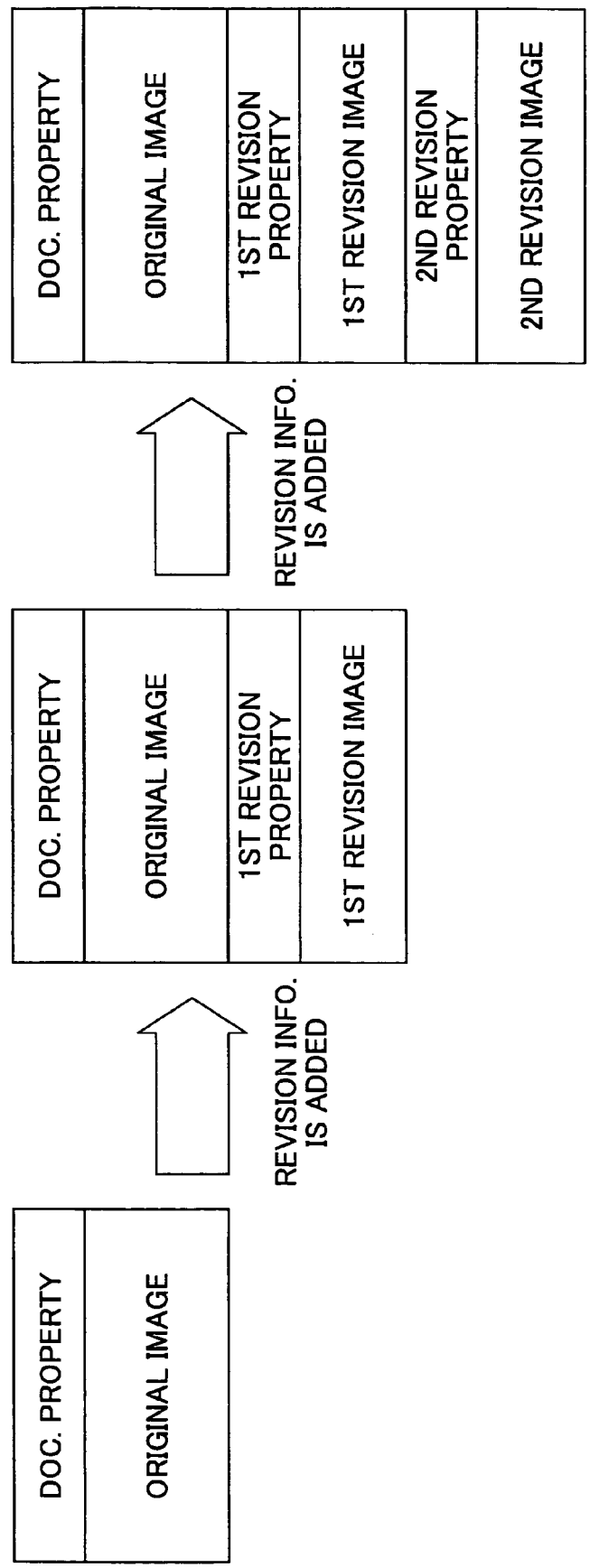
FIG. 38 is a diagram for explaining an example of the structure of the PUI document file.

FIG. 38 is a diagram for explaining an example of the structure of the PUI document file.

As shown in FIG. 38, the PUI document file comprises the document property and the original image, and when revision information is added, the revision property and the revision image are added to the PUI document file.

In addition, the document ID (PUI document ID), the title, the implementer (PUI user ID), the creation date, and the right to access of this PUI document file are contained in document property.

Moreover, the document ID of the document for revision (PUI document ID), the revision ID, the revision ID of parents and the revision person (PUI user ID), and the revision date are contained in the revision property.

For example, the first examination person's revision data are contained in the 1st revision image shown in FIG. 38, and the second examination person's revision data are contained in the 2nd revision image.

Next, another example of the structure of the PUI document file will be explained using FIG. 39.

Figure 39:
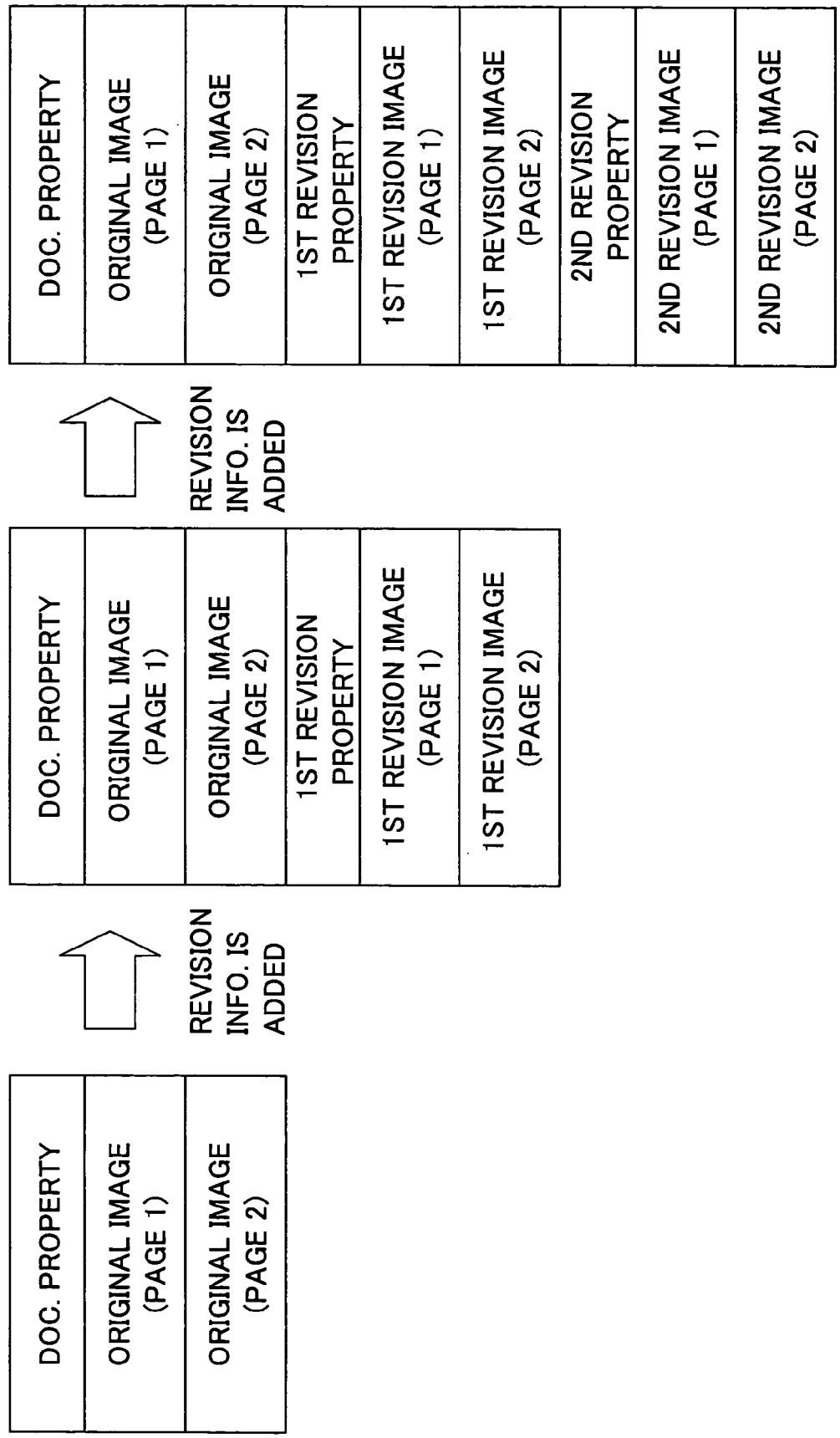
FIG. 39 is a diagram for explaining an example of the structure of the PUI document file.

FIG. 39 is a diagram for explaining the structure of the PUI document file.

The structure of the PUI document file shown in FIG. 39 is the structure where the data of the original image exist for every page, compared with the structure of the PUI document file explained in FIG. 38.

Moreover, the structure of the PUI document file shown in FIG. 39 is the structure where the revision image over the original image for every page exists.

In addition, although only the 2 pages is illustrated in the structure of the PUI document file in FIG. 39 for simplification of explanation, this does not limit operation of the present invention.

Next, another example of the structure of the PUI document file will be explained using FIG. 40.

Figure 40:
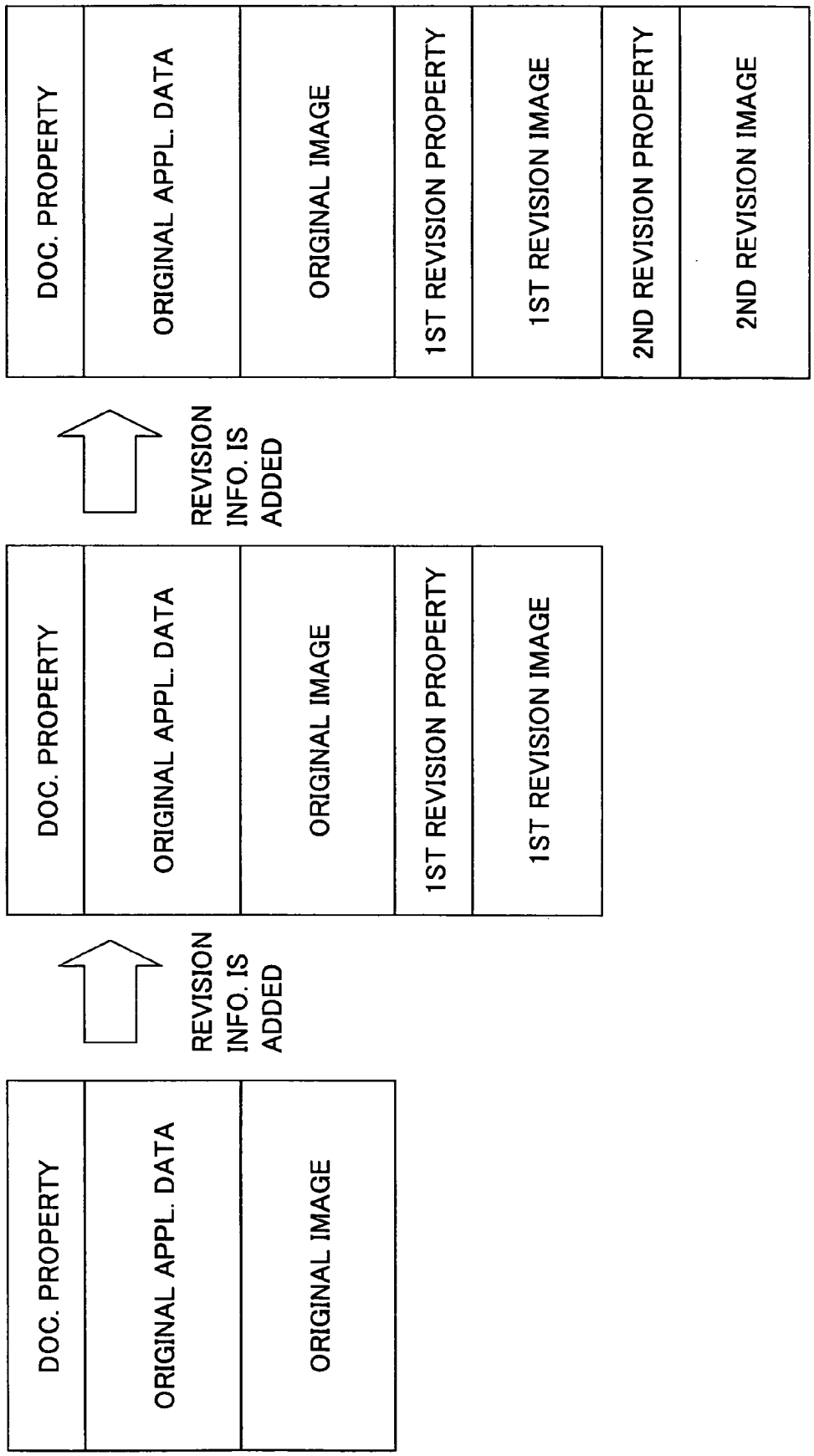
FIG. 40 is a diagram for explaining an example of the structure of the PUI document file.

FIG. 40 is a diagram for explaining an example of the structure of the PUI document file.

The structure of the PUI document file shown in FIG. 40 is the structure of having the data concerning the application file of the original, for example, the data of the text file itself which created the original, compared with the structure of the PUI document file explained in FIG. 38.

As shown in FIG. 40, the application file of the original can be taken out and used from the PUI document file using the predetermined application treating the PUI document file etc. by including the data concerning the application file of the original in the PUI document file.

Next, another example of the structure of the PUI document file will be explained using FIG. 41.

Figure 41:
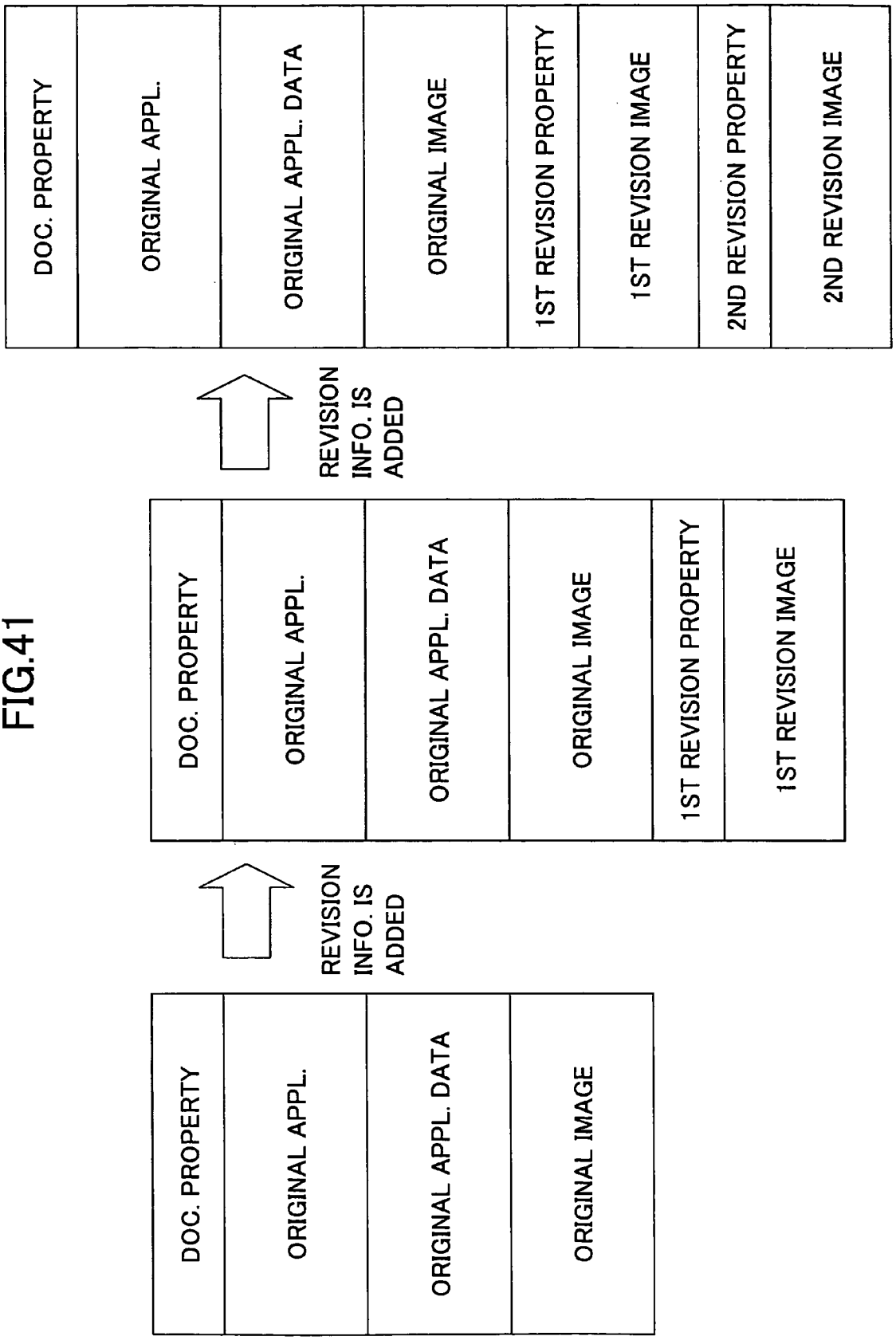
FIG. 41 is a diagram for explaining an example of the structure of the PUI document file.

FIG. 41 is a diagram for explaining the structure of the PUI document file.

Compared with the structure of the PUI document file in FIG. 40, the structure of the PUI document file shown in FIG. 41 is explained, and the program such as the application of the original contains, for example, the Java applet. By including the application of the original in the PUI document file, the application of the original can be started and used using the predetermined application treating the PUI document file etc.

Next, an example of the contraction of the PUI document file is explained using FIG. 42.

FIG. 42 is a diagram for explaining an example of the contraction of the PUI document file.

The PUI document-management server 7 or PUI MFP 4 transmits to the PUI MFP 4 of other places of business by using as the original the PUI document file which performed the contraction to which the revision image is made to reflect in the original image as shown in FIG. 42, and performed this contraction, when the PUI document file needs to be circulated in other places of business etc. as shown in FIG. 3 for example.

The PUI document file can be transmitted by transmitting to other places of business etc. by using the contracted PUI document file as the new original, without applying the load to the network.

In addition, it is possible to be made to consider as new document property to the document property before the contraction reflecting the revision property before the contraction.

As shown in FIG. 38 through FIG. 42, the PUI document file may be accumulated and/or managed by the PUI document file management unit 75 in the form of the compound statement document, and may be accumulated and/or managed in the table of the database.

Next, an example which accumulates and/or manages the original and/or revision information on the PUI document file in the table will be explained using FIG. 43A through FIG. 46.

FIG. 43A and FIG. 43B are diagrams for explaining examples of the tables concerning the original image of the PUI document file.

As shown in FIG. 43A, the PUI document property table includes the document ID, the title, the creation date, the implementer, the right to access, and the file name as an item.

The PUI document ID which identifies the PUI document file concerned is stored in the document ID, for example. In addition, it is possible to make it store the document ID corresponding to the PUI document ID.

The title of the PUI document file concerned is stored in the title. The creation date which created the PUI document file concerned is stored on the creation date. The PUI user ID of the user who has created the PUI document file concerned is stored as the identification of the user. In addition, in FIG. 43A, the user name is stored as it is for simplification of explanation.

The PUI user ID of the user who has permitted access to the PUI document file concerned is stored in the right to access. In addition, in FIG. 43A, the user name etc. is only stored for simplification of explanation. The file name of the PUI document file concerned is stored in the file name.

Moreover, as shown in FIG. 43B, the PUI document original image table includes the document ID, the page number, and the file name as an item.

The PUI document ID which identifies the PUI document file concerned is stored in the document ID, for example. In addition, it is possible to make it store the document ID corresponding to the PUI document ID.

The page number of the PUI document file concerned is stored in the page number. The file name of the PUI document file concerned made to correspond to the page number is stored in the file name.

FIG. 44A and FIG. 44B are diagrams for explaining an example of the table concerning revision information.

As shown in FIG. 44A, the PUI revision property table contains the document ID, the revision ID, the parent revision ID and the revision date, and the revision person as an item.

The PUI document ID which identifies the PUI document file concerned is stored in the document ID, for example. In addition, it is possible to make it store the document ID corresponding to the PUI document ID.

The identifier which identifies revision information is stored in the revision ID. The identification information which identifies parents' revision information is stored in the parent revision ID. The date which extracted revision information is stored on the revision date.

The PUI user ID of the revision person who has corrected the document is stored as the identification of the revision person. In addition, in FIG. 44A, the revision person's name is stored as it is for simplification of explanation.

Figure 45:
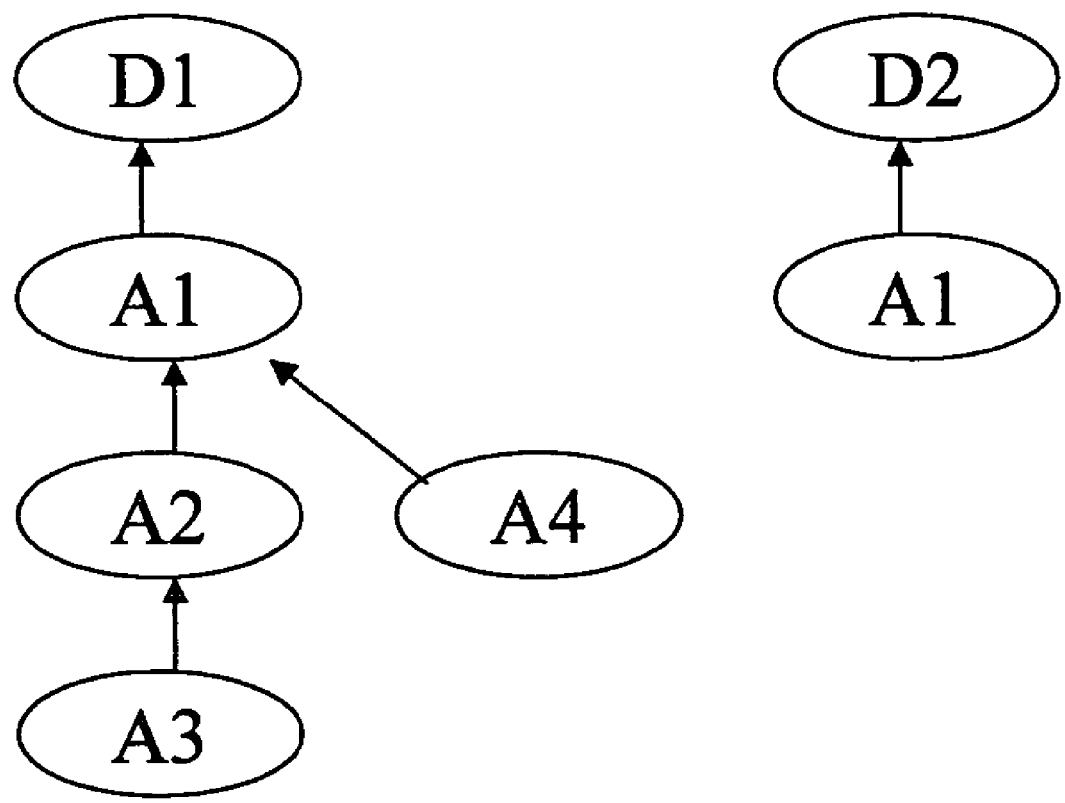
FIG. 45 is a diagram for explaining the relation between the items of the revision information.

By including the document ID, the revision ID, and the parent revision ID in the PUI revision property table, as shown in FIG. 45, the relation between revision information can be expressed.

FIG. 45 is a diagram for explaining the relation between revision information.

For example, it is shown in FIG. 45 that the revision information identified by revision ID A3 is revision to the revision information identified by revision ID A2.

Moreover, as shown in FIG. 44B, the PUI revision image table includes the document ID, the revision ID and the page number, and the file name as an item.

The PUI document ID which identifies the PUI document file concerned is stored in the document ID, for example. In addition, it is possible to make it store the document ID corresponding to the PUI document ID.

The identifier which identifies revision information is stored in the revision ID. The page number of the PUI document file concerned is stored in the page number. The file name of the PUI document file concerned made to correspond to the page number is stored in the file name.

Next, another example of the table concerning the PUI document file will be explained using FIG. 46.

FIG. 46 is a diagram for explaining another example of the table concerning the PUI document file.

As shown in FIG. 46, the PUI document table contains the document ID, the title, the creation date, the implementer, the right to access, and URL as an item.

The PUI document ID which identifies the PUI document file concerned is stored in the document ID, for example. In addition, it is possible to make it store the document ID corresponding to the PUI document ID.

The title of the PUI document file concerned is stored in the title. The creation date which created the PUI document file concerned is stored on the creation date. The PUI user ID of the user who has created the PUI document file concerned is stored as the identification of the user. In addition, in FIG. 46, the user name is stored as it is for simplification of explanation.

The PUI user ID of the user who has permitted access to the PUI document file concerned is stored in the right to access. In addition, in FIG. 46, the user name etc. is only stored for simplification of explanation. URL which shows the place of the PUI document file concerned is stored in URL.

As shown in FIG. 46, the PUI document file can also be accumulated and/or managed on the one table, without dividing into the property table and the image table of the original.

By associating and managing the data of the original concerning the PUI paper document, for example, the original image and document property, the revision data concerning revision, and the attribute information concerning the attribute of these revision data, as explained using FIG. 38 through FIG. 46, the system concerning the PUI paper document and the workflow management system with which two or more workflow persons in charge perform two or more revisions to the same document can be associated, and can be operated.

Next, an example of the external expression of the PUI document file will be explained using FIG. 47.

FIG. 47 is a diagram for explaining an example of the external expression of the PUI document file.

When the PUI document-management server 7 has only the PUI document file management unit 75 which manages the PUI document file and PUI MFP 4 has the renewal unit 73 of the PUI document file which performs the revision image extraction unit 74 which extracts the revision image, renewal of the PUI document file, etc. so that it may mention later for example, the PUI document-management server 7 transmits to PUI MFP 4 based on the request from PUI MFP 4 by the data structure of inputs and outputs as shows the PUI document file in FIG. 47.

Moreover, the PUI document file of the data structure of inputs/outputs as shown in FIG. 47 conversely transmitted from the PUI MFP 4 is received, and it accumulates and/or manages.

For example, to the tag of <original </original>> shown in FIG. 47, the data and/or information concerning the original image of the PUI document file are embedded.

For example, to the tag of <image </image>> in the tag of <original </original>>, the image data concerning the original image of the PUI document file coded base 64 are embedded.

Moreover, to the tag of <propList </propList>> in the tag of <original </original>>, the attribute information concerning the original image of the PUI document file is embedded.

For example, the document ID (PUI document ID) is embedded to the tag of <docId</docId>>.

Moreover, the title of the PUI document file is embedded to the tag of <title </title>>.

Moreover, to the tag of <date </date>>, the creation date which created the PUI document file is embedded.

Moreover, to the tag of <layer </layer>> shown in FIG. 47, the added revision information which is explained in FIG. 38 etc. is embedded.

For example, to the tag of <image </image>> in the tag of <layer </layer>>, the data (revision image data) of the revision image coded base 64 are embedded.

Moreover, to the tag of <propList </propList>> in the tag of <layer </layer>>, the attribute information concerning the revision image data is embedded.

For example, to the tag of <layerId </layerId>>, the revision ID which identifies the revision image data is embedded. Moreover, the date which extracted revision information is embedded to the tag of <date </date>>.

By the data structure of inputs/outputs as shown in FIG. 47, the workflow system and the system concerning PUI which is able to take the affinity can be provided by transmitting and receiving the PUI document file.

Next, the relation between the classes representing the PUI electronic workflow system will be explained using FIG. 48.

The data structure of the present invention for controlling the inputs and outputs of the PUI document concerning the process is described in a meta-language and/or a markup language. Specifically, the data structure of the invention may be described in XML (extensible markup language).

Figure 48:
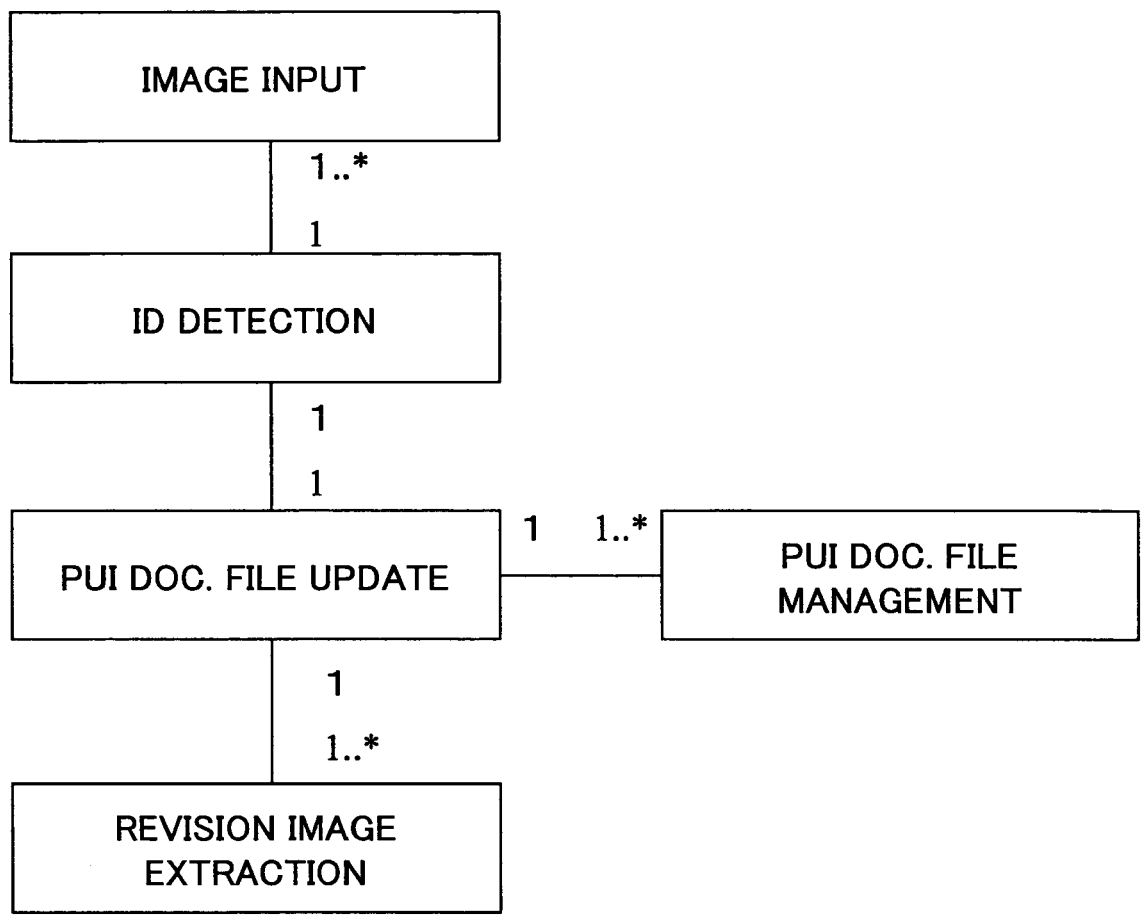
FIG. 48 is a diagram for explaining the relation between the classes representing the PUI electronic workflow system.

FIG. 48 is a diagram for explaining the relation between the classes representing the PUI electronic workflow system.

As shown in FIG. 48, the classes representing the PUI electronic workflow system include the image input class, the ID detection class, the update class of the PUI document file, the revision image extraction class, and the PUI document file management class.

The image input class is the class which defines reading (input) of the PUI paper document to which revision information is added.

The ID detection class is the class which defines detection of ID. In addition, as an ID, there are the PUI document ID, the PUI user ID, the MFP ID, the revision ID, etc., for example.

The update class of the PUI document file is the class which defines renewal of the PUI document file. The revision image extraction class is the class which defines extraction of the revision image. The PUI document file management class is the class which defines management of the PUI document file.

Next, some examples of the method contained in the respective classes will be explained using FIG. 49.

FIG. 49 is a diagram for explaining an example of the method.

As shown in (A) of FIG. 49, the ID detection class has the addImage method. The PUI document ID contained in the image data, the PUI user ID, and when it is contained, the image data read in the image input class and the user name (PUI user ID) which the user inputted using the operation panel 1310 of PUI MFP 4 are called as an argument, and the addImage method detects the revision ID etc., it returns and returns this detected ID as a value.

As shown in (B) of FIG. 49, the update class of the PUI document file has the update method. The update method is called considering the PUI document ID, and/or the revision ID and the image data detected in the addImage method, and the user name as an argument, and calls the getFile method of the PUI document file management class shown in (D) of FIG. 19 by making the PUI document ID and/or the revision ID into the argument.

The getFile method acquires the corresponding PUI document file managed in the PUI document file management class based on the PUI document ID and/or the revision ID, and returns it as a return value. In addition, the user name of the argument of the update method may be the PUI user ID that is detected in the addImage method.

The update method calls the extract method of the revision image extraction class shown in (C) of FIG. 49 by making into the argument the image data passed as the argument, and the image data created based on the PUI document file acquired as a return value of the getFile method.

The extract method extracts the difference of two image data passed as the argument, considers the difference of these image data as the revision image, and returns it as a return value. In addition, the update method calls the extract method as the originalImageData shown in (C) of FIG. 49 in the image data which created based on the PUI document file which acquired the image data passed as the argument as a return value of the getFile method as the targetImageData shown in (C) of FIG. 49.

The update method adds the revision image acquired as a return value of the extract method to the PUI document file acquired as a return value of the getFile method, as shown in FIG. 38.

Moreover, the update method adds the PUI user ID and the revision ID which are passed as an argument to the PUI document file as revision property of the revision image. Moreover, the update method calls the putFile method of the PUI document file management class indicated to be the PUI document file to which the revision image and the revision property are added to (D) of FIG. 49 by making into the argument the PUI document ID passed as the revision ID and an argument.

Based on the given argument, the putFile method associates both the revision ID and the PUI document ID with the PUI document file, and saves them in the PUI document file management class.

Next, an example of the functional composition of the PUI electronic workflow system will be explained using FIG. 50.

Figure 50:
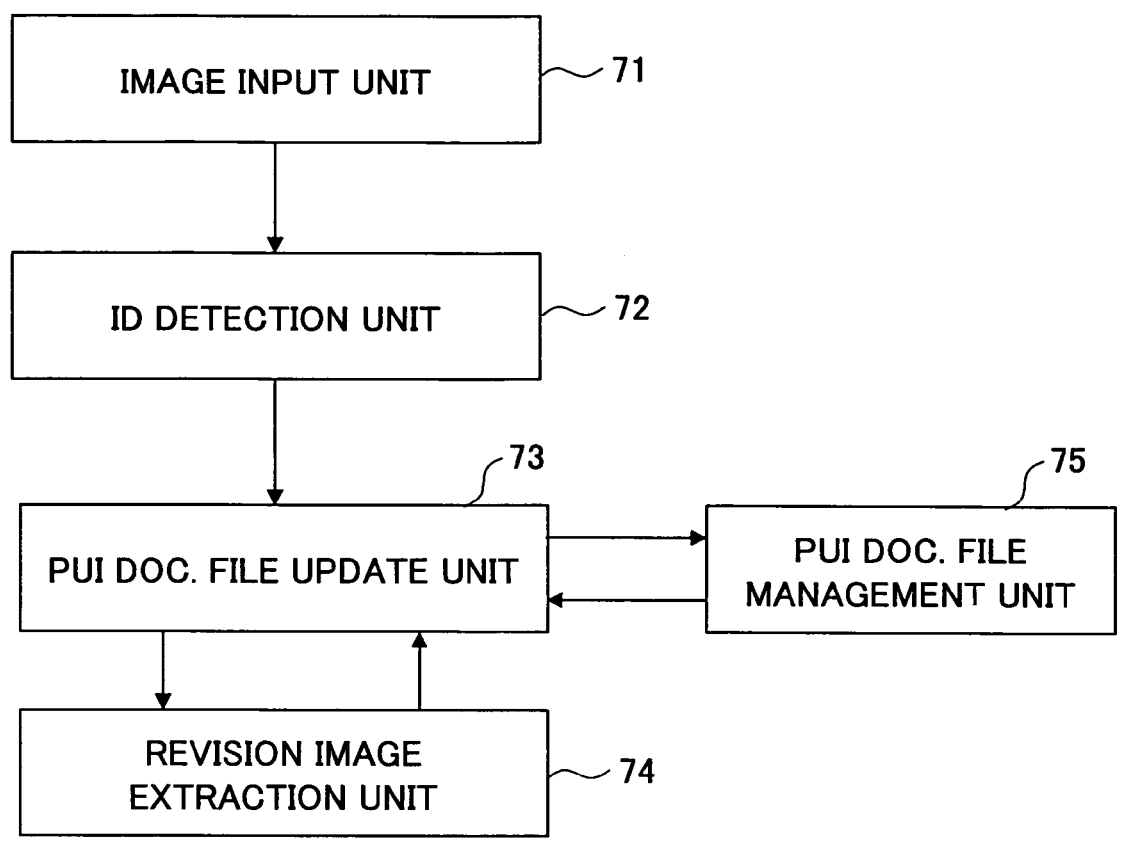
FIG. 50 is a diagram for explaining the functional composition of the PUI electronic workflow system.

FIG. 50 is a diagram for explaining an example of the functional composition of the PUI electronic workflow system.

As shown in FIG. 50, the PUI electronic workflow system has the image input unit 71, the ID detection unit 72, the renewal unit 73 of the PUI document file, the revision image extraction unit 74, and the PUI document file management unit 75.

The image input unit 71 reads the PUI paper document to which revision information etc. is added.

The ID detection unit 72 detects and acquires PUI marks, such as the PUI document ID, the PUI user ID, and the revision ID, from the image data read by the image input unit 71.

The renewal unit 73 of the PUI document file acquires the PUI document file with which the ID detection unit 72 detects and corresponds based on the acquired PUI document ID and/or the revision ID from the PUI document file management unit 75, creates the image data of the newest PUI document file, and passes them to the revision image extraction unit 74 with the image data read in the image input unit 71.

The revision image extraction unit 74 extracts the difference of two passed image data, creates the revision image data, and passes the PUI document file to the renewal unit 73.

The renewal unit 73 of the PUI document file adds the revision image data acquired from the revision image extraction unit 74 at the end of the PUI document file acquired from the PUI document file management unit 75, and the revision property corresponding to these revision image data, and updates the PUI document file managed at the PUI document file management unit 75.

In addition, although it may be made to carry out in the renewal unit 73 of the PUI document file and not being illustrated, the contraction explained in FIG. 42 prepares the contraction unit etc., and it may be made to perform it in this contraction unit.

Next, the functional composition of each device which constitutes the PUI electronic workflow system will be explained using FIG. 51 through FIG. 55.

Figure 51:
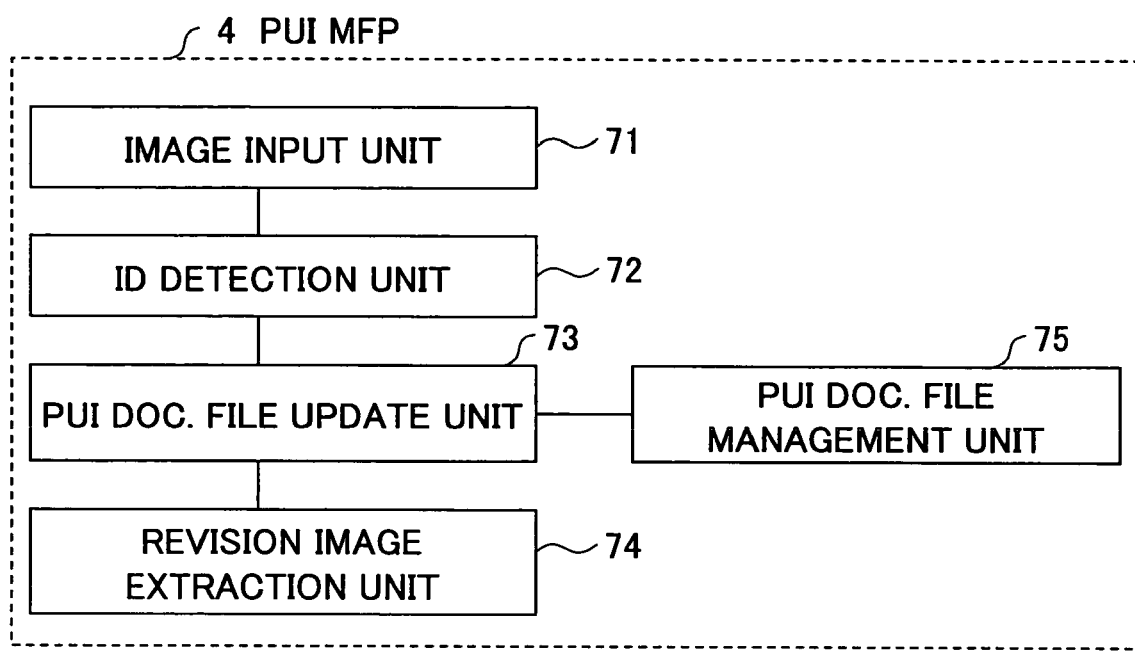
FIG. 51 is a diagram for explaining the functional composition of the PUI electronic workflow system.

FIG. 51 is a diagram for explaining the functional composition of each device which constitutes the PUI electronic workflow system.

In the composition shown in FIG. 51, the MFP 4 is provided to include all the functional composition shown in FIG. 50. In the composition of FIG. 51, for example, the PUI document-management server 7 is unnecessary for the PUI electronic workflow system explained in FIG. 31 to FIG. 33, and the PUI document file is managed by the PUI MFP 4.

Next, another example of the functional composition of each device which constitutes the PUI electronic workflow system will be explained using FIG. 52.

Figure 52:
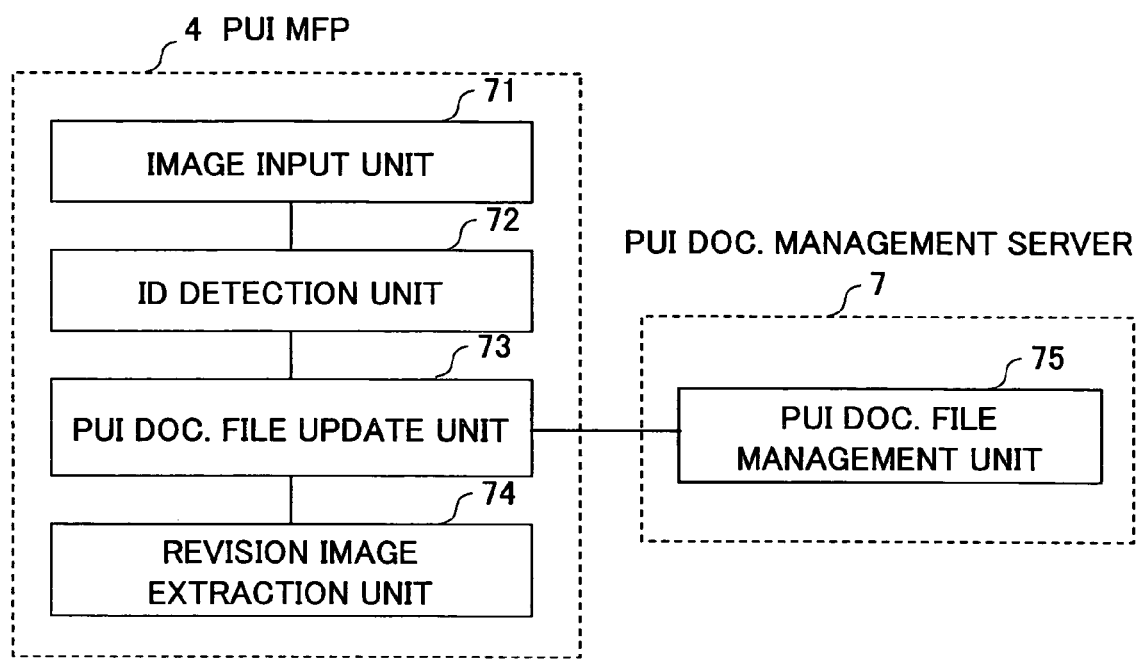
FIG. 52 is a diagram for explaining the functional composition of the PUI electronic workflow system.

FIG. 52 is a diagram for explaining the functional composition of each device which constitutes the PUI electronic workflow system.

The PUI MFP 4 shown in FIG. 52 comprises the image input unit 71, the ID detection unit 72, the renewal unit 73 of the PUI document file, and the revision image extraction unit 74.

Moreover, the PUI document-management server 7 shown in FIG. 52 includes the PUI document file management unit 75. The composition shown in FIG. 52 has the composition that the PUI document file management unit 75 is included in the PUI document-management server 7, when compared with the composition shown in FIG. 51.

By making it composition as shown in FIG. 52, the unitary management of the PUI document file can be carried out in the PUI document-management server 7.

Next, another example of the functional composition of each device which constitutes the PUI electronic workflow system will be explained using FIG. 53.

Figure 53:
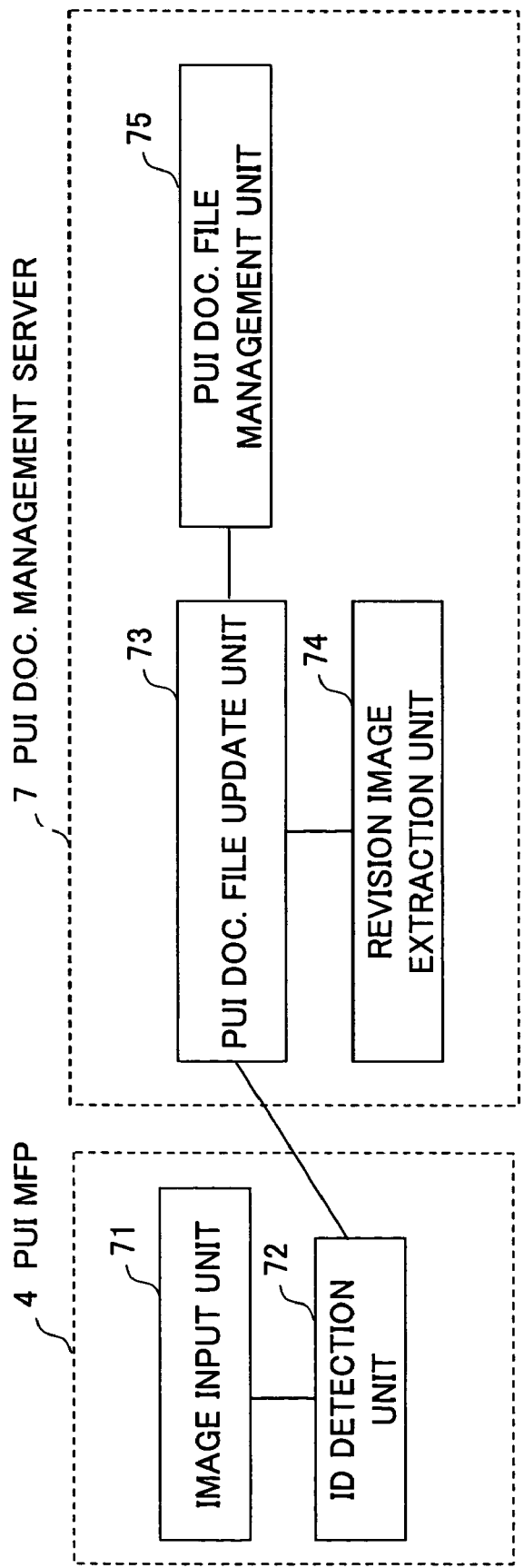
FIG. 53 is a diagram for explaining the functional composition of the PUI electronic workflow system.

FIG. 53 is a diagram for explaining the functional composition of each device which constitutes the PUI electronic workflow system.

The PUI MFP 4 shown in FIG. 53 comprises the image input unit 71 and the ID detection unit 72. Moreover, the PUI document-management server 7 shown in FIG. 53 comprises the renewal unit 73 of the PUI document file, the revision image extraction unit 74, and the PUI document file management unit 75.

The composition shown in FIG. 53 has the composition that the renewal unit 73 of the PUI document file and the revision image extraction unit 74 are contained in the PUI document-management server 7, when compared with the composition shown in FIG. 52.

By making it composition as shown in FIG. 53, extraction of the revision image, renewal of the PUI document file, etc. can summarize the main processings concerning the PUI document file in the PUI document-management server 7, and can be performed.

Next, another example of the functional composition of each device which constitutes the PUI electronic workflow system will be explained using FIG. 54.

Figure 54:
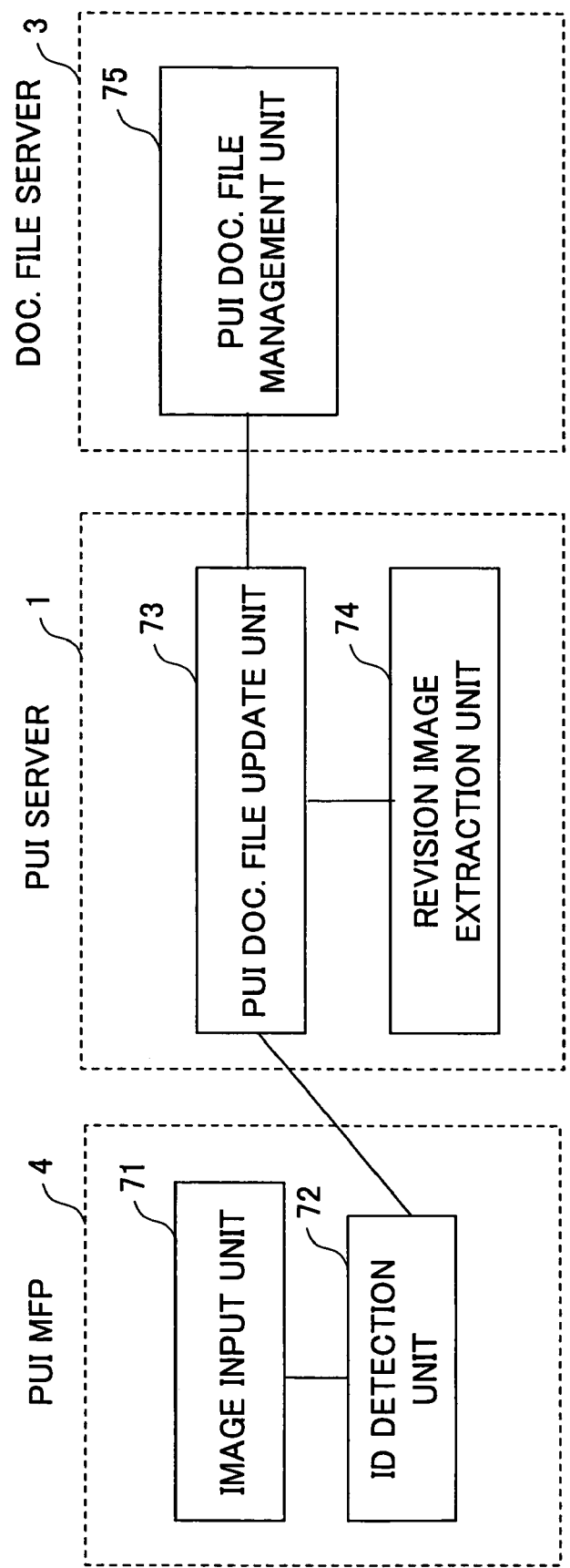
FIG. 54 is a diagram for explaining the functional composition of the PUI electronic workflow system.

FIG. 54 is a diagram for explaining the functional composition of each device which constitutes the PUI electronic workflow system.

The PUI MFP 4 shown in FIG. 54 comprises the image input unit 71 and the ID detection unit 72. Moreover, the PUI server 1 shown in FIG. 54 comprises the renewal unit 73 of the PUI document file, and the revision image extraction unit 74. Moreover, the document file server 3 shown in FIG. 54 comprises the PUI document file management unit 75.

The composition shown in FIG. 54 divides the PUI document-management server 7 into the PUI server 1 and the document file server 3, when compared with the composition shown in FIG. 53.

By making it composition as shown in FIG. 54, management of the PUI document file can be left to the document file server 3, and extraction of the revision image, renewal of the PUI document file, etc. can perform processing concerning the PUI document file efficiently in the PUI server 1.

Next, another example of the functional composition of each device which constitutes the PUI electronic workflow system will be explained using FIG. 55.

Figure 55:
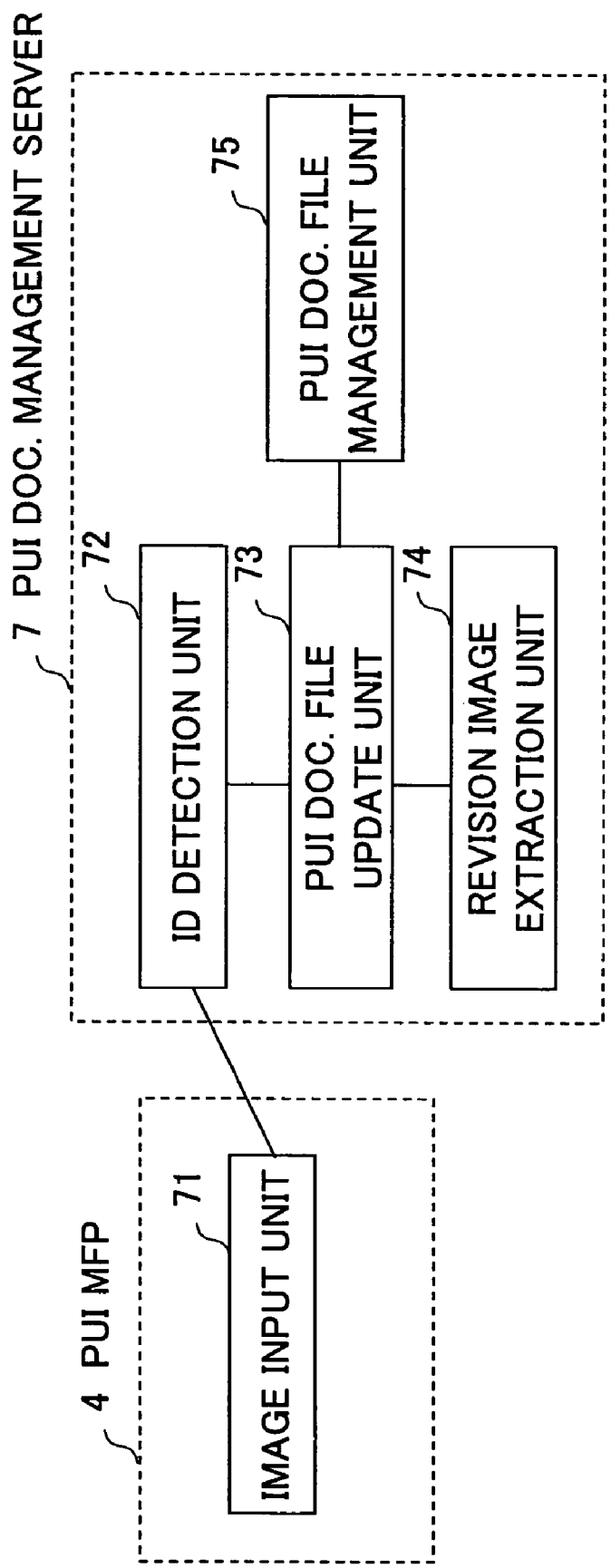
FIG. 55 is a diagram for explaining the functional composition of the PUI electronic workflow system.

FIG. 55 is a diagram for explaining the functional composition of each device which constitutes the PUI electronic workflow system.

The PUI MFP 4 shown in FIG. 55 comprises the image input unit 71. Moreover, the PUI document-management server 7 shown in FIG. 55 comprises the ID detection unit 72, the renewal unit 73 of the PUI document file, the revision image extraction unit 74, and the PUI document file management unit 75.

The composition shown in FIG. 55 has the composition that the PUI document-management server 7 has the ID detection unit 72, when compared with the composition shown in FIG. 53.

By considering as composition as shown in FIG. 55, PUI MFP 4 can transmit the data and/or information which are read to the PUI document-management server 7, and can perform all processings concerning PUI, such as detection of the PUI mark, extraction of the revision image, renewal of the PUI document file, and management of the PUI document file, in the PUI document-management server 7.

Figure 56:
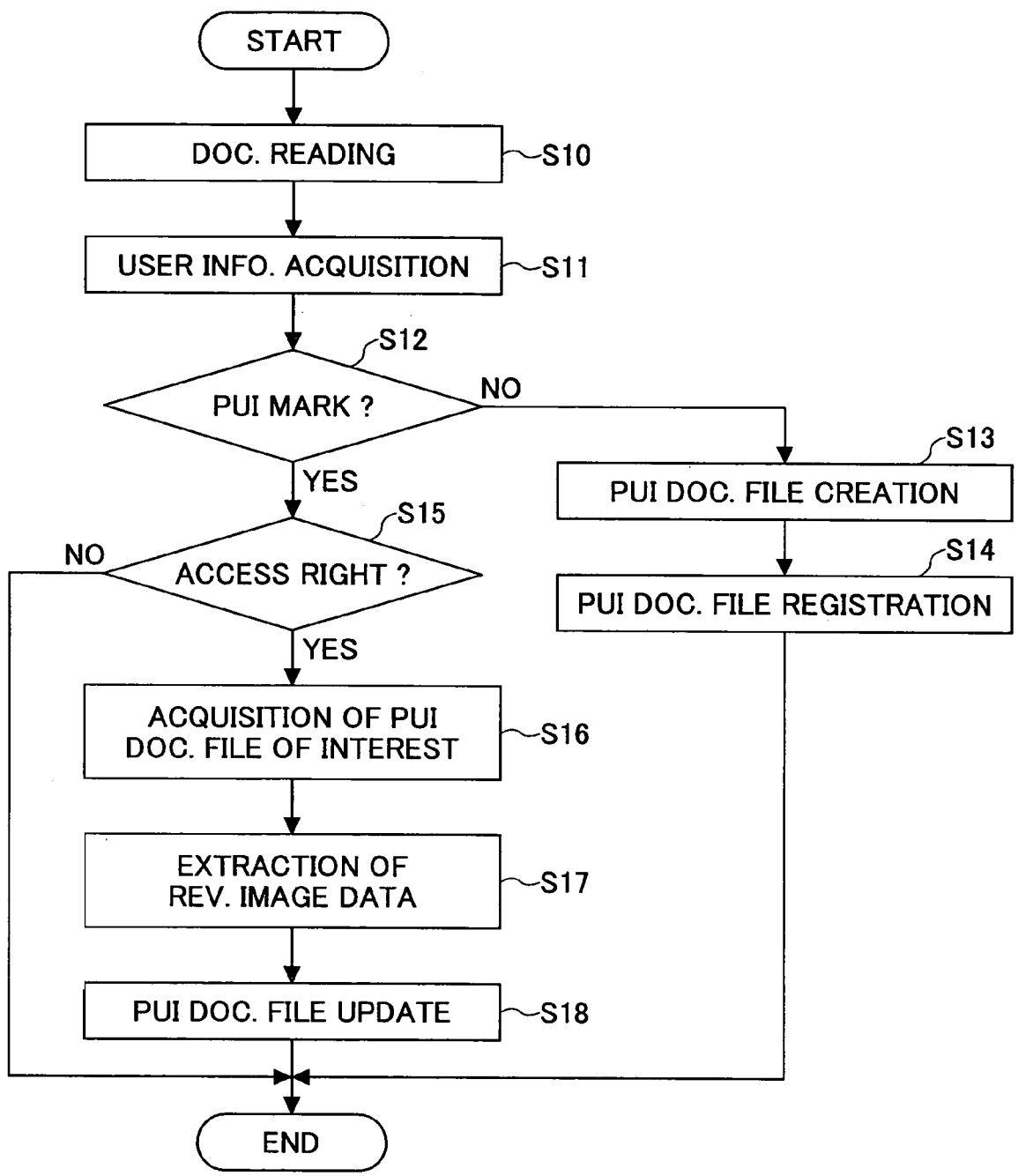
FIG. 56 is a flowchart for explaining the procedure of the processing performed by the PUI electronic workflow system.

Next, an example of processing concerning the PUI electronic workflow system is explained using FIG. 56.

FIG. 56 is a flowchart for explaining an example of the procedure of the processing performed by the PUI electronic workflow system.

At step S10, the image input unit 71 of the PUI electronic workflow system reads the paper document.

Progressing to step S11 following step S10, the image input unit 71 acquires the user information, such as the user name, which is inputted by the user.

Progressing to step S12 following step S11, the ID detection unit 72 determines whether the PUI mark is included in the image data concerning the paper document read at step S10.

If the ID detection unit 72 determines the presence of the PUI mark included (the result of the determination at step S12 is YES), it will progress to step S15. If the ID detection unit 72 determines that the PUI mark is not included (the result of the determination at step S12 is NO), it will progress to step S13.

For example, the ID detection unit 72 reads the information that is added to the position of the image data concerning the paper document read at step S10, and it is determined whether this information is the PUI mark. In this manner, the ID detection unit 72 determines whether the PUI mark is included in the image data concerning the paper document read at step S10.

At step S13, the renewal unit 73 of the PUI document file, or the PUI document file creation unit (not illustrated) which creates the PUI document file, adds the user information acquired at step S11 to the image data concerning the paper document read at step S10 in order to create the new PUI document file.

Progressing to step S14 following step S13, the renewal unit 73 of the PUI document file, or the PUI document file registration unit (not illustrated) which registers the PUI document file, registers the PUI document file created at step S13 into the PUI document file management unit 75.

On the other hand, at step S15, the renewal unit 73 of the PUI document file or the authentication unit (not illustrated) determines whether there is any right to access the corresponding PUI document file for the user that is identified with the PUI user ID contained in the user information acquired at step S11 and/or in the PUI mark read at step S12.

If it is determined that there is no right to access the corresponding PUI document file for the user (the result of the determination at step S15 is NO), the procedure of the processing is ended. If the renewal unit 73 of the PUI document file or the authentication unit determines that there is the right to access the corresponding PUI document file for the user (the result of the determination at step S15 is YES), the control is transferred to step S16.

For example, the renewal unit 73 of the PUI document file or the authentication unit sends a check request of the right to access, containing the user information acquired at step S11 and/or the PUI user ID contained in the PUI mark read at step S12, and the PUI document ID contained in the PUI mark read at step S12, to the PUI document file management unit 75. For example, the renewal unit 73 of the PUI document file or the authentication unit acquires from the PUI document file management unit 75 the check result indicating as to whether there is any right to access the PUI document file corresponding to the PUI document ID for the user identified with the user information and/or the user corresponding to the PUI user ID.

Based on this check result, the renewal unit 73 of the PUI document file or the authentication unit determines at the step S15 whether the user has the right to access the corresponding PUI document file.

At step S16, the renewal unit 73 of the PUI document file acquires the corresponding PUI document file from the PUI document file management unit 75 based on the PUI document ID contained in the PUI mark read at step S12.

Progressing to step S17 following step S16, the revision image extraction unit 74 takes the differences between the image data of the paper document read at step S10 and the image data of the PUI document file acquired at step S16, and extracts the revision image data from the image data differences.

Progressing to step S18 following step S17, the renewal unit 73 of the PUI document file adds the revision property corresponding to the revision image data and the revision image data which are extracted at step S17, to the PUI document file acquired at step S16, in order to update the PUI document file, and stores the newly updated PUI document file into the PUI document file management unit 75.

In addition, the PUI user ID of the user who has performed the revision, and the revision ID which identifies the revision image data are contained in the revision property.

The present invention is not limited to the above-described embodiments, and variations and modifications may be made without departing from the scope of the present invention.

Further, the present application is based on Japanese priority applications No. 2003-181541, filed on Jun. 25, 2003, No. 2003-185135, filed on Jun. 27, 2003, No. 2003-203810, filed on Jul. 30, 2003, No. 2003-204422, filed on Jul. 31, 2003, and No. 2003-204423, filed on Jul. 31, 2003, the entire contents of which are hereby incorporated by reference.

What is claimed is:

1. A document management apparatus for connection through a network to an image forming device, a document file server, and a workflow server, respectively, the document management apparatus comprising:

an information acquisition unit configured to acquire, from the image forming device through the network, image data of a paper document including a signature block at a predetermined position of the paper document, and a user ID that identifies a user who requests the image forming device to read the image data from the paper document;

an extraction unit configured to receive, from the document file server through the network, a document file which is acquired from a document file accumulation unit of the document file server in response to a document file ID that identifies the document file and is included in the image data of the paper document, and transmitted to the document management apparatus by the document file server, to extract revision data that is added to the paper document, based on difference data indicating differences obtained by matching of the image data of the paper document with image data of the document file, and to determine propriety of approval of the revision data based on an item of the extracted revision data corresponding to the predetermined position of the paper document; and a registration unit configured to transmit, to the workflow server through the network, a request of registration of approval information indicating the propriety of approval of the revision data, the request of registration including the approval information, the user ID and the document file ID, wherein the extraction unit is configured to request the document file server to register, into the document file accumulation unit, the document file, the revision data and the user ID that are associated with the document file, by using the document ID contained in the image data of the paper document, and wherein the workflow server is configured to register, in response to the request of registration received from the registration unit, state information indicating a progress of approval of the document file associated with the document ID.

2. The document management apparatus of claim 1 further comprising a revision-data identification information acquisition unit acquiring revision-data identification information that identifies the revision data, from the data of the paper document.

3. The document management apparatus of claim 1 further comprising a paper-document reading unit reading the paper document to which the revision data are added.

4. The document management method of claim 1 wherein the document file is a document file concerning a meeting, and the document management apparatus further comprises a collation-request transmission unit transmitting a request for collation of the meeting, which contains at least user identification information that identifies a user, to a meeting management unit which manages information concerning the meeting.

\* \* \* \* \*